United States Patent
Harrier

(10) Patent No.: US 9,987,807 B2
(45) Date of Patent: Jun. 5, 2018

(54) AUTOMOTIVE REPAIR SYSTEMS INCLUDING HANDHELD EXTRUDER

(71) Applicant: SERVICE KING PAINT & BODY, LLC, Richardson, TX (US)

(72) Inventor: Dustin Harrier, Surprise, AZ (US)

(73) Assignee: SERVICE KING PAINT AND BODY, LLC, Richardson, TX (US)

( * ) Notice: Subject to any disclaimer, the term of this patent is extended or adjusted under 35 U.S.C. 154(b) by 0 days. days.

(21) Appl. No.: 15/630,809

(22) Filed: Jun. 22, 2017

(65) Prior Publication Data
US 2017/0368771 A1 Dec. 28, 2017

Related U.S. Application Data

(60) Provisional application No. 62/353,441, filed on Jun. 22, 2016.

(51) Int. Cl.
*B05C 5/02* (2006.01)
*B29C 65/00* (2006.01)
(Continued)

(52) U.S. Cl.
CPC .......... *B29C 73/12* (2013.01); *B29C 67/0088* (2013.01); *B33Y 50/02* (2014.12);
(Continued)

(58) Field of Classification Search
CPC ........ B29C 65/18; B29C 65/22; B29C 65/48; B29C 65/4815; B29C 65/524;
(Continued)

(56) References Cited

U.S. PATENT DOCUMENTS

| 2,556,609 A | 6/1951 | Arkless |
| 3,112,563 A | 12/1963 | Kamborian et al. |

(Continued)

FOREIGN PATENT DOCUMENTS

| CN | 201751172 U | 2/2011 |
| CN | 104416909 A | 3/2015 |

(Continued)

OTHER PUBLICATIONS

International Search Report and Written Opinion issued from the US/ISA regarding International application No. PCT/US17/38856 dated Nov. 6, 2017, 11 pages.

(Continued)

*Primary Examiner* — Philip C Tucker
*Assistant Examiner* — Brian R Slawski
(74) *Attorney, Agent, or Firm* — Haynes and Boone LLP

(57) ABSTRACT

A repair system that includes a handheld device comprising a first extruder tip having an interior passageway extending between an inlet and a tip outlet, wherein the inlet is configured to receive a solid thermoplastic material and the tip outlet is configured to dispense a fluidic thermoplastic material; a nozzle surrounding the first extruder tip to form an annulus between an interior surface of the nozzle and an exterior surface of the first extruder tip; and a heater that is configured to heat the interior passageway of the first extruder tip such that the solid thermoplastic material becomes the fluidic thermoplastic material. In some embodiments, the repair system also includes a gas source in fluid communication with the annulus such that a skirt-shaped curtain of gas extends from the annulus and in a direction towards the tip outlet of the extruder tip.

38 Claims, 29 Drawing Sheets

(51) Int. Cl.

| | |
|---|---|
| *B29C 65/02* | (2006.01) |
| *B29C 73/00* | (2006.01) |
| *B29C 65/78* | (2006.01) |
| *B29C 47/06* | (2006.01) |
| *B32B 37/00* | (2006.01) |
| *B32B 38/00* | (2006.01) |
| *B32B 43/00* | (2006.01) |
| *B32B 41/00* | (2006.01) |
| *B32B 41/02* | (2006.01) |
| *B65C 9/40* | (2006.01) |
| *B65C 11/04* | (2006.01) |
| *B65H 26/00* | (2006.01) |
| *B67D 7/80* | (2010.01) |
| *G01F 11/00* | (2006.01) |
| *G05G 15/00* | (2006.01) |
| *H05B 3/42* | (2006.01) |
| *B29C 73/12* | (2006.01) |
| *B29C 67/00* | (2017.01) |
| *B33Y 50/02* | (2015.01) |
| *B33Y 80/00* | (2015.01) |
| *B29K 101/12* | (2006.01) |
| *B29L 31/30* | (2006.01) |
| *B29C 65/18* | (2006.01) |
| *B05C 17/005* | (2006.01) |
| *B29C 73/02* | (2006.01) |
| *B29C 65/52* | (2006.01) |
| *B29C 65/48* | (2006.01) |

(52) U.S. Cl.
CPC .......... *B33Y 80/00* (2014.12); *B05C 17/0053* (2013.01); *B05C 17/00546* (2013.01); *B29C 65/18* (2013.01); *B29C 65/4815* (2013.01); *B29C 65/525* (2013.01); *B29C 66/71* (2013.01); *B29C 66/861* (2013.01); *B29C 66/9121* (2013.01); *B29C 66/9141* (2013.01); *B29C 73/025* (2013.01); *B29K 2101/12* (2013.01); *B29L 2031/3055* (2013.01)

(58) Field of Classification Search
CPC ..... B29C 65/525; B29C 65/54; B29C 65/542; B29C 66/00; B29C 66/71; B29C 66/7392; B29C 66/861; B29C 66/87; B29C 66/90; B29C 66/91; B29C 66/9121; B29C 66/9141; B29C 73/02; B29C 73/025; B05C 17/005; B05C 17/00506; B05C 17/00523; B05C 17/00526; B05C 17/0053; B05C 17/00546; B05C 17/002; B05C 5/001
USPC .......... 156/60, 64, 94, 98, 166, 242, 244.11, 156/244.16, 244.21, 277, 285, 293, 308.2, 156/309.6, 324, 349, 350, 351, 352, 356, 156/361, 367, 368, 378, 384, 385, 386, 156/433, 500, 538, 578, 579; 222/1, 222/146.1, 146.5; 219/221, 227, 229, 219/231, 241
See application file for complete search history.

(56) References Cited

U.S. PATENT DOCUMENTS

| | | | |
|---|---|---|---|
| 3,662,927 A * | 5/1972 | Cocks | B05C 17/002 |
| | | | 219/421 |
| 3,951,308 A * | 4/1976 | Thirtle | A43D 25/18 |
| | | | 215/DIG. 1 |
| 4,289,257 A | 9/1981 | Herb et al. | |
| 4,335,677 A | 6/1982 | Nagata et al. | |
| 4,669,661 A | 6/1987 | Otto | |
| 4,822,671 A | 4/1989 | Carper et al. | |
| 5,230,130 A | 7/1993 | Bishop | |
| 5,375,766 A | 12/1994 | Sweeney | |
| 5,433,038 A | 7/1995 | Dupuy | |
| 5,584,419 A | 12/1996 | Lasko | |
| 5,779,103 A | 7/1998 | Massena | |
| 6,431,409 B1 | 8/2002 | Gehde et al. | |
| 7,063,811 B2 | 6/2006 | Brozenick et al. | |
| 7,905,267 B2 | 3/2011 | Arnold | |
| 7,950,186 B2 | 5/2011 | Gross et al. | |
| 8,070,204 B2 | 12/2011 | Mourou | |
| 8,235,444 B2 | 8/2012 | Eidt et al. | |
| 2003/0205566 A1 * | 11/2003 | Evanyk | B05C 17/0053 |
| | | | 219/221 |
| 2006/0144860 A1 | 7/2006 | O'Keefe, Jr. et al. | |
| 2006/0191957 A1 * | 8/2006 | Axinte | B05C 17/00526 |
| | | | 222/146.5 |
| 2008/0023485 A1 | 1/2008 | Raines et al. | |
| 2009/0021053 A1 | 1/2009 | Harberts et al. | |
| 2011/0233802 A1 | 9/2011 | Estrate | |
| 2012/0034373 A1 | 2/2012 | Liddell et al. | |
| 2014/0116525 A1 | 5/2014 | Bondeson et al. | |
| 2015/0001768 A1 | 1/2015 | Kia et al. | |
| 2015/0021942 A1 | 1/2015 | Evans | |
| 2015/0047167 A1 | 2/2015 | Gonzalez | |
| 2015/0059958 A1 | 3/2015 | Wang | |
| 2015/0331402 A1 | 11/2015 | Lin et al. | |
| 2016/0039157 A1 | 2/2016 | Huang et al. | |
| 2016/0121585 A1 | 5/2016 | Jennings et al. | |
| 2016/0167307 A1 | 6/2016 | Eramian et al. | |
| 2016/0176084 A1 | 6/2016 | Altonen et al. | |
| 2016/0221278 A1 | 8/2016 | Herrmann et al. | |

FOREIGN PATENT DOCUMENTS

| | | | |
|---|---|---|---|
| CN | 104881513 A | 9/2015 | |
| CN | 205097539 U | 3/2016 | |
| DE | 19836313 A1 | 2/2000 | |
| DE | 102013112933 A1 | 5/2015 | |
| FR | 2694518 A1 | 2/1994 | |
| WO | WO 2015/049088 | 4/2015 | |
| WO | WO 2015150336 A1 * | 10/2015 | ............ B29C 65/40 |

OTHER PUBLICATIONS

"Hinged Tab Repair", Polyvance, Jan. 4, 2016 [retrieved Aug. 28, 2017]; retrieved from Internet <https://web.archive.org/web/20160104184827/http://polyvance.com:80/HingedTab01.php>.
International Search Report and Written Opinion issued from the US/ISA regarding International application No. PCT/US17/38861 dated Nov. 6, 2017, 13 pages.

* cited by examiner

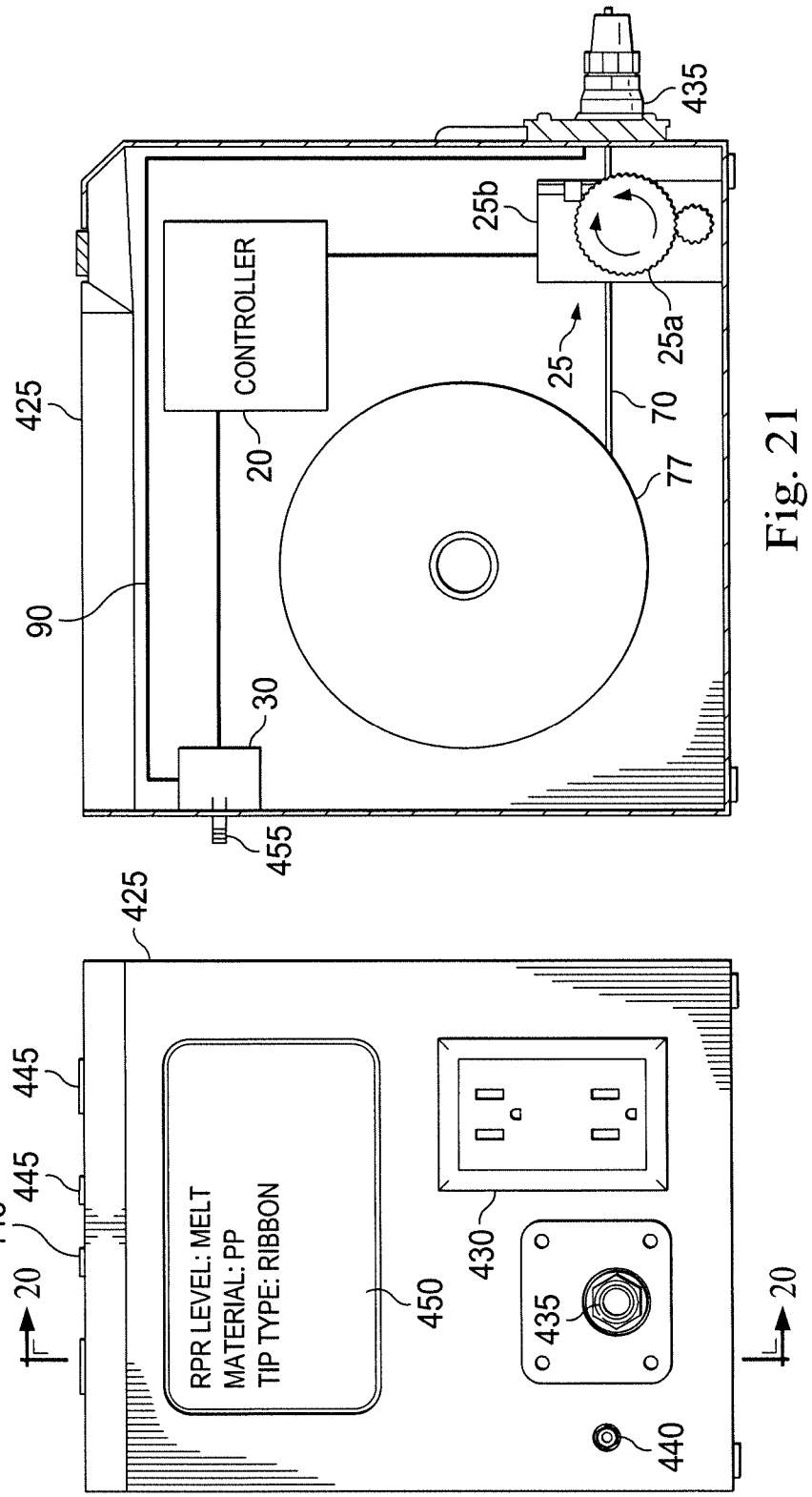

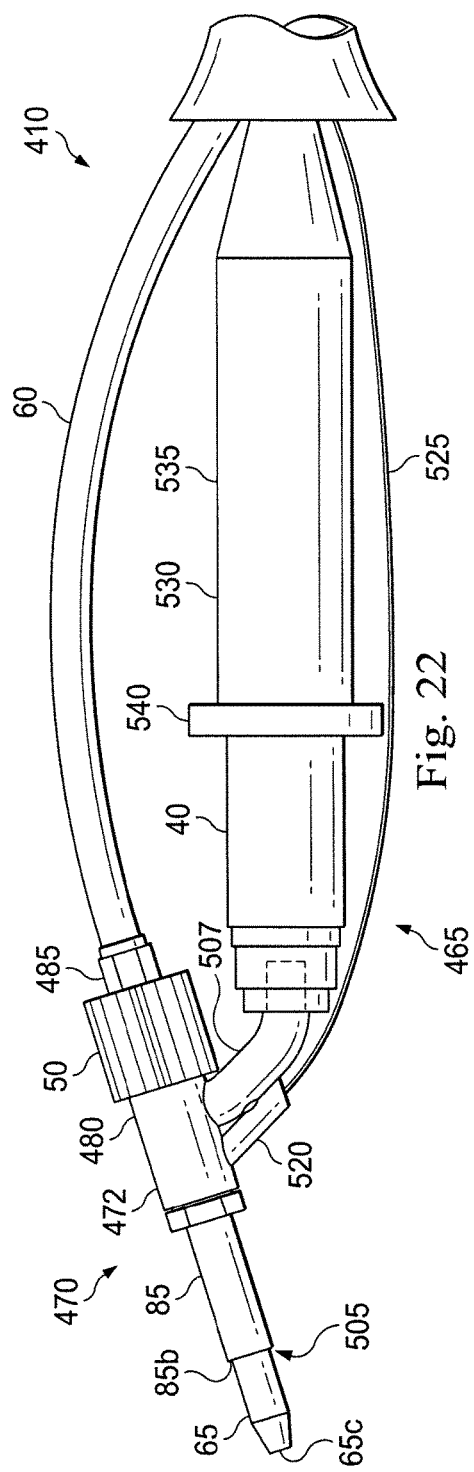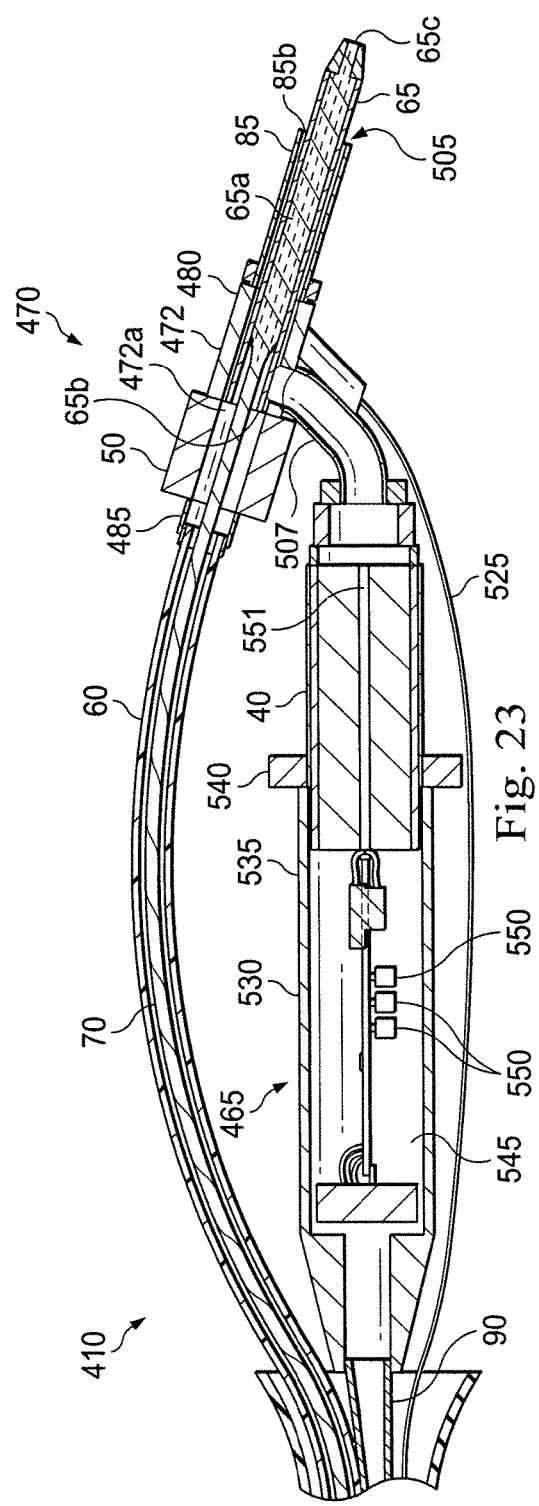

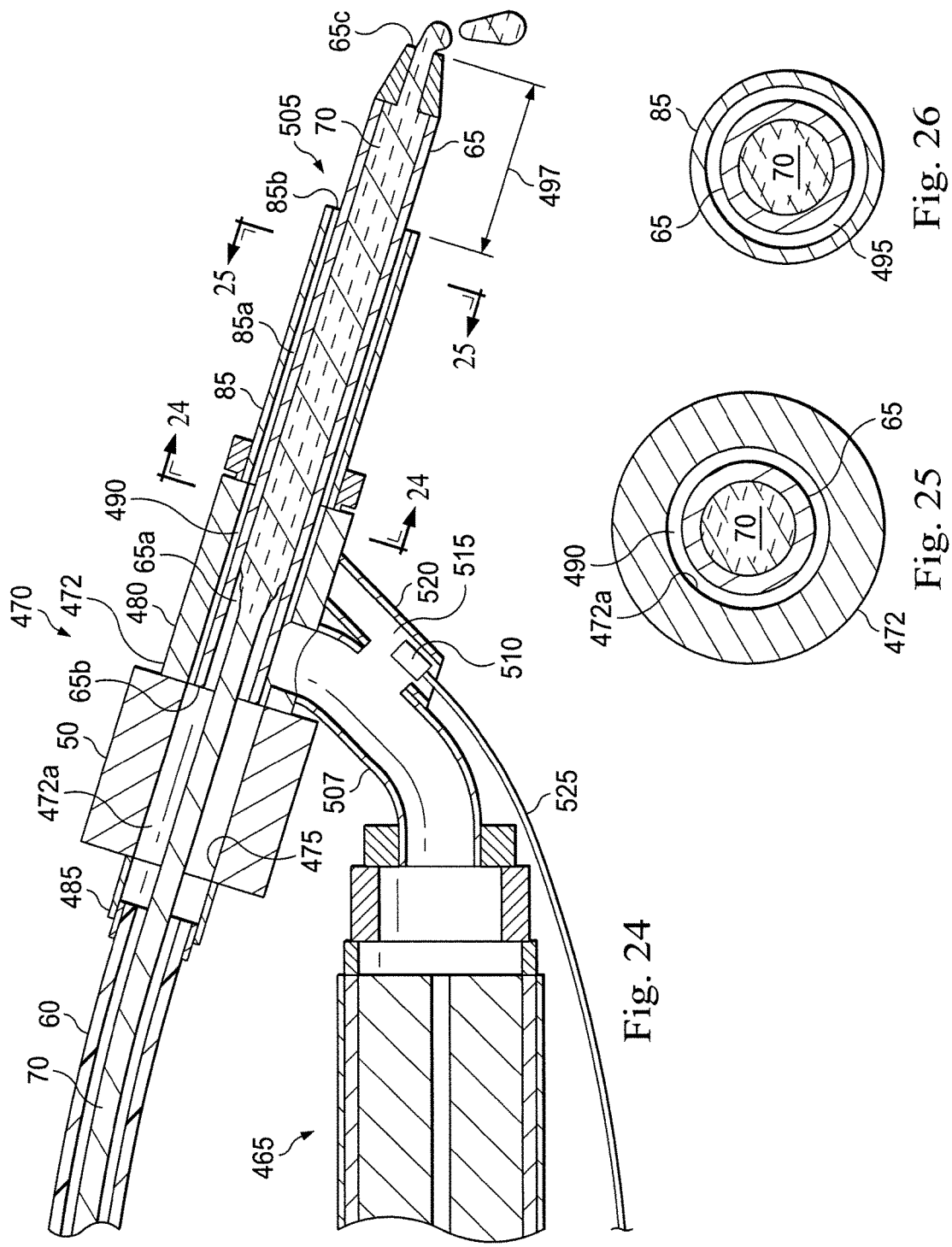

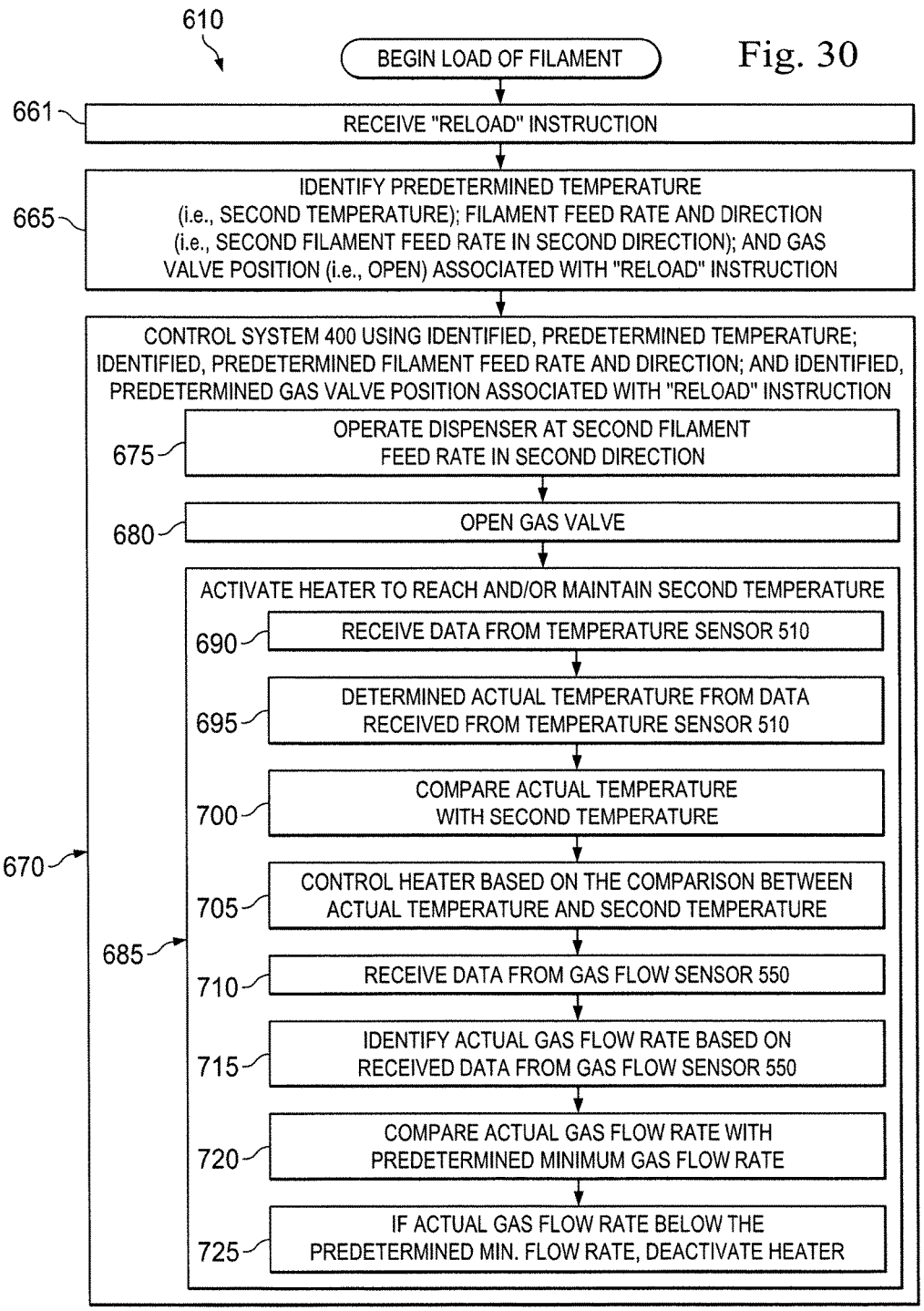

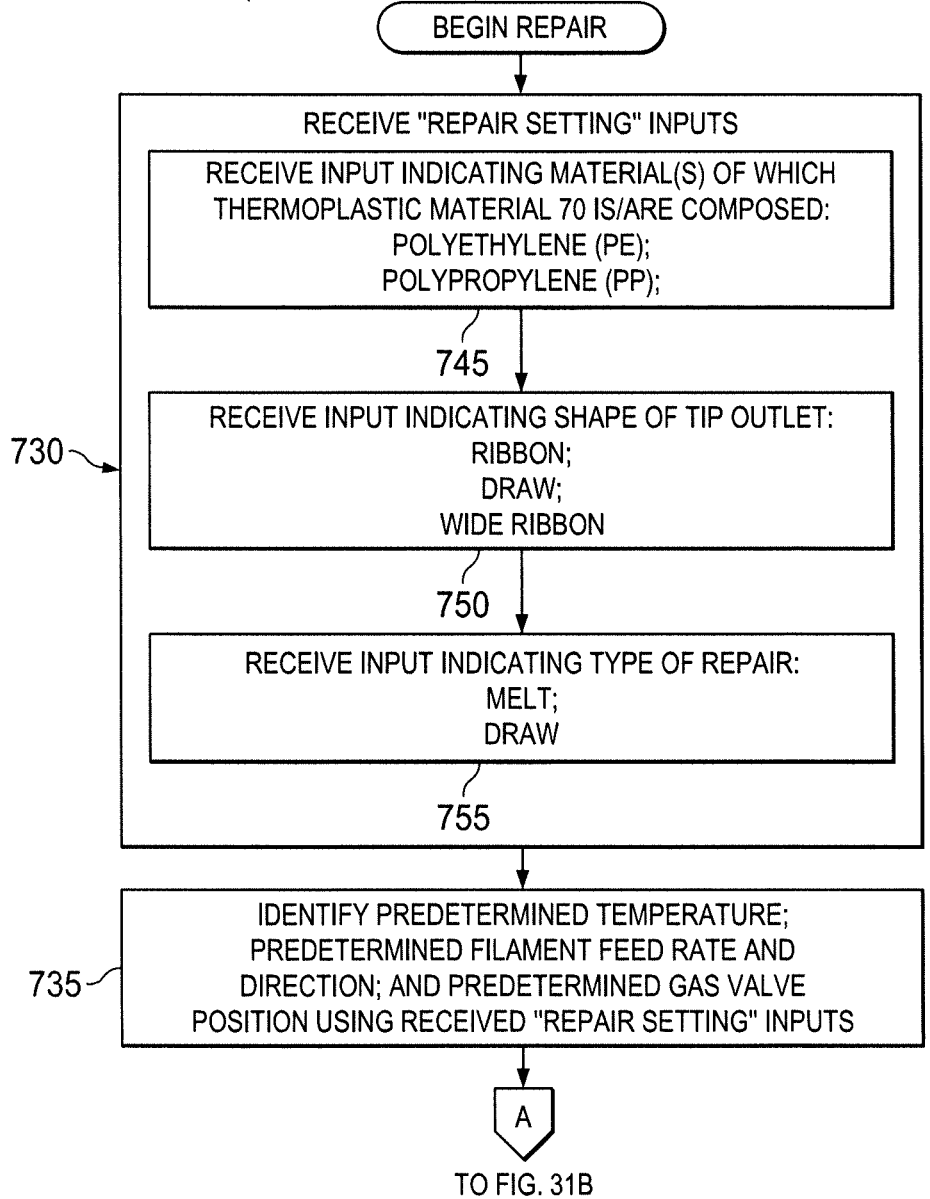

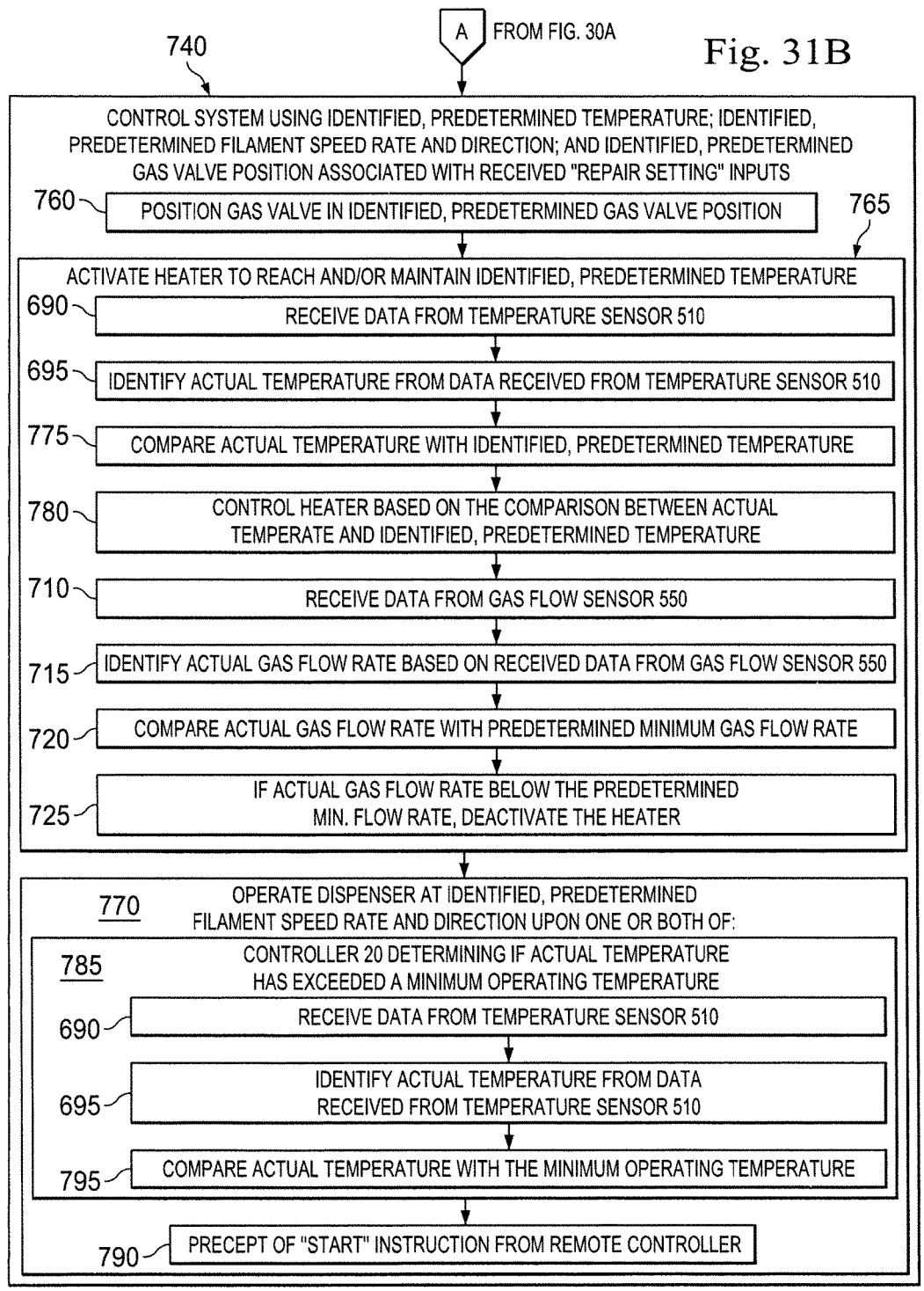

| INPUT FOR TYPE OF TIP | INPUT FOR TYPE OF THERMOPLASTIC MATERIAL | INPUT FOR TYPE OF REPAIR | OUTPUT: (GAS VALVE POSITION; TEMPERATURE; FILAMENT FEED RATE mm/sec) |
|---|---|---|---|
| RIBBON | PP | MELT | (OPEN; 500; 3) |
| RIBBON | PP | DRAW | (OPEN; 475; 2) |
| RIBBON | PE | MELT | (OPEN; 450; 3) |
| RIBBON | PE | DRAW | (OPEN; 400; 2) |
| WIDE RIBBON | PP | MELT | (OPEN; 500; 4) |
| WIDE RIBBON | PP | DRAW | (OPEN; 475; 3) |
| WIDE RIBBON | PE | MELT | (OPEN; 450; 4) |
| WIDE RIBBON | PE | DRAW | (OPEN; 400; 3) |
| DRAW | PP | MELT | (OPEN; 450; 1) |
| - | - | - | - |
| - | - | - | - |

AUTOMOTIVE REPAIR SYSTEMS INCLUDING HANDHELD EXTRUDER

CROSS-REFERENCE TO RELATED APPLICATIONS

This application is related to U.S. patent application Ser. No. 15/630,749, filed Jun. 22, 2017, the entire disclosure of which is hereby incorporated herein by reference.

This application is related to U.S. patent application Ser. No. 29/608,536, filed Jun. 22, 2017, the entire disclosure of which is hereby incorporated herein by reference.

This application is related to U.S. patent application Ser. No. 29/608,552, filed Jun. 22, 2017, the entire disclosure of which is hereby incorporated herein by reference.

This application is related to U.S. patent application Ser. No. 29/608,569, filed Jun. 22, 2017, the entire disclosure of which is hereby incorporated herein by reference.

TECHNICAL FIELD

The present disclosure relates in general to automotive repair systems, including an automotive repair system that couples a three-dimensional (3D) printed attachment part to a damaged automotive part to repair the damaged automotive part.

BACKGROUND

In many cases, if only a portion of an automotive part is damaged, repair of that portion requires replacement of the entire automotive part. As a result, automotive repair processes with respect to the automotive part are not flexible, requiring the same replacement procedure to be followed regardless of the degree to which the automotive part is damaged. Moreover, such a replacement procedure is expensive because the entire automotive part must be purchased. The replacement procedure may also be very time consuming, increasing "shop time," especially when the entire automotive part must be ordered or otherwise obtained from an external source. Therefore, what is needed is a system, method, or apparatus that address one or more of the foregoing issues, and/or other issue(s).

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 20 is a side view of the mobile unit of FIG. 19, according to exemplary embodiment of the present disclosure;

FIG. 21 is a sectional view of the mobile unit of FIG. 19, according to exemplary embodiment of the present disclosure;

FIG. 22 is a side view of the handheld device of FIG. 19, according to exemplary embodiment of the present disclosure;

FIG. 23 is a sectional view of the handheld device of FIG. 19, according to exemplary embodiment of the present disclosure;

FIG. 24 is an enlarged view of a portion of the handheld device of FIG. 23, according to exemplary embodiment of the present disclosure;

FIG. 25 is a cross-sectional view of a portion of the handheld device of FIG. 19, according to exemplary embodiment of the present disclosure;

FIG. 26 is a cross-sectional view of another portion of the handheld device of FIG. 19, according to exemplary embodiment of the present disclosure;

FIG. 30 is a flow chart illustration of another step of the method of FIG. 28, according to an exemplary embodiment of the present disclosure;

FIGS. 31A and 31B together form a flow chart illustration of another step of the method of FIG. 28, according to an exemplary embodiment of the present disclosure;

FIG. 32 is an illustration look-up table, according to an exemplary embodiment of the present disclosure;

DETAILED DESCRIPTION

Figure 1:
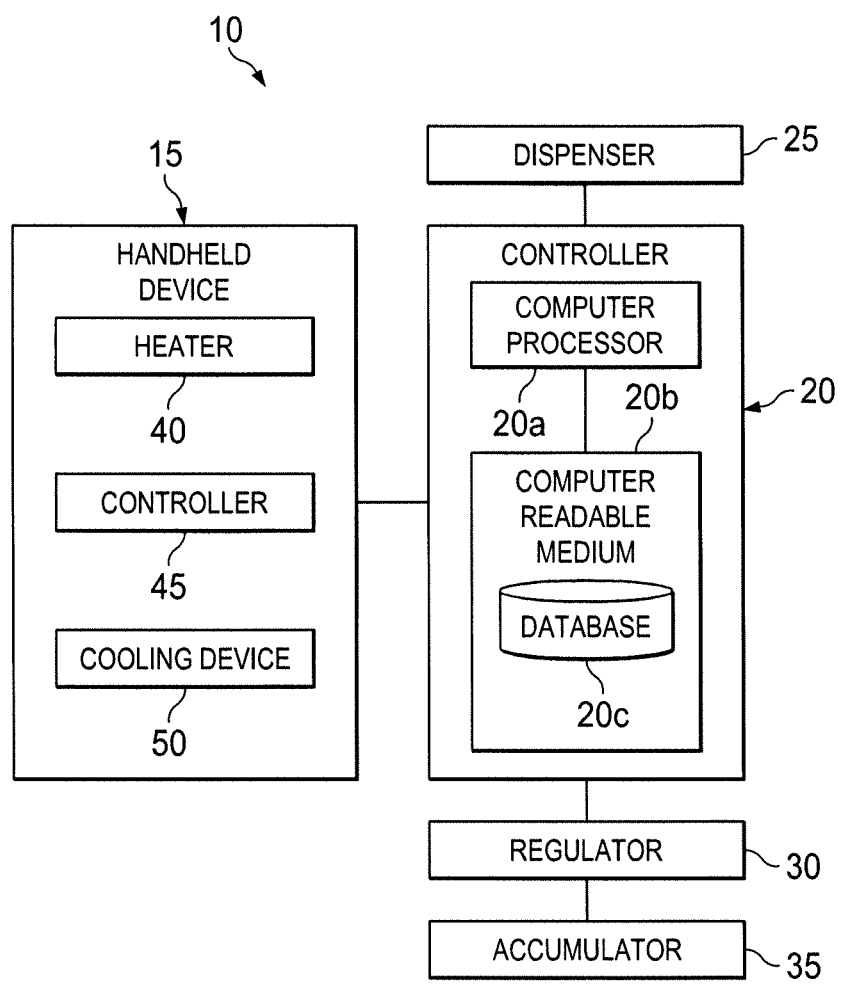
FIG. 1 is a diagrammatic illustration of a system according to an embodiment of the present disclosure.

In an exemplary embodiment, as illustrated in FIG. 1, an automotive repair system is generally referred to by the reference numeral 10. As will be described in further detail below, the automotive repair system 10 may be used in whole or in part with several exemplary embodiments of methods and/or systems for repairing automotive parts, including methods and/or systems that employ three-dimensional (3D) printing and/or three-dimensionally printed parts such as, for example, three-dimensionally printed portions of automotive part, connector tabs, attachment parts, etc. As shown in FIG. 1, the automotive repair system 10 includes a handheld device 15 and a controller 20 in communication therewith. A dispenser 25 and a regulator 30 are each in communication with the controller 20. In an exemplary embodiment, the controller 20 includes a computer processor 20a and a computer readable medium 20b operably coupled thereto. Instructions accessible to, and executable by, the computer processor 20a are stored on the computer readable medium 20b. A database 20c is also stored in the computer readable medium 20b. The controller 20 includes, or is operably coupled to, an input device and an output device. The input device and the output device include a graphical display, which, in several exemplary embodiments, is in the form of, or includes, one or more digital displays. In an exemplary embodiment, the output device includes a graphical display, a printer, a plotter, and/or any combination thereof. In an exemplary embodiment, the input device is the output device, and the output device is the input device. The system 10 further includes an accumulator 35 that is operably coupled to, and in communication with, the regulator 30. The handheld device 15 further includes a heater 40, a controller 45, and a cooling device 50.

Figure 2:
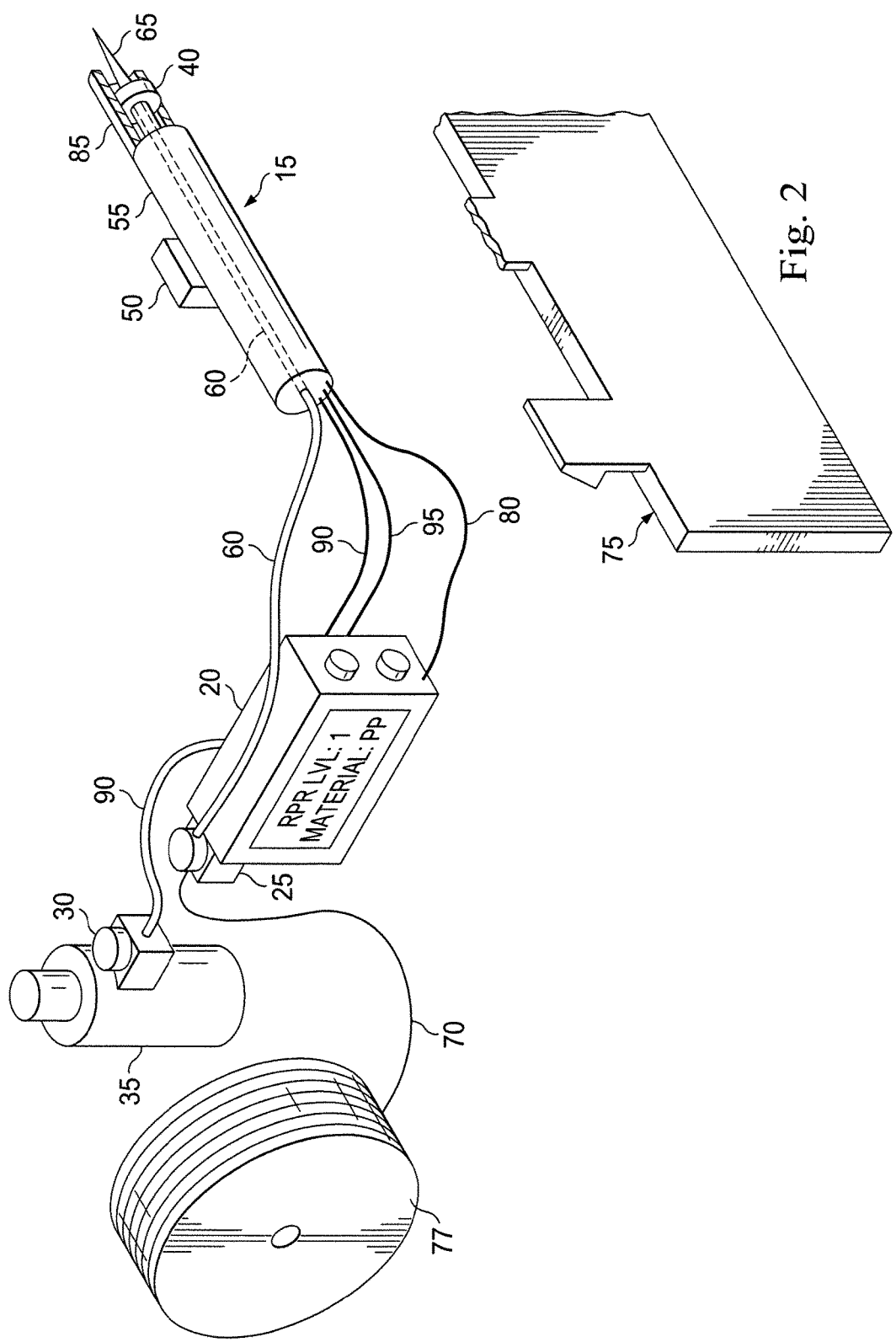
FIG. 2 is a diagrammatic illustration of an exemplary embodiment of the system of FIG. 1 and an automotive part, according to an exemplary embodiment of the present disclosure.

In an exemplary embodiment, as illustrated in FIG. 2 with continued reference to FIG. 1, the handheld device 15 has a body 55 in which a conduit 60 extends. The conduit 60 is in fluid communication with, or fluidically coupled to, an extruder tip 65 that is configured to apply a thermoplastic material 70 to an automotive part 75 to repair the automotive part 75. While the thermoplastic material 70 is shown stored on a spool 77, the thermoplastic material 70 may be stored in any variety of ways. The conduit 60 may be formed from one or more tubulars, sheaths, tubing, pipes, or the like; passageways formed within the body 55; or combination thereof. Generally, the conduit 60 is configured to convey the thermoplastic material 70. In an exemplary embodiment, the conduit 60 or at least portion of the conduit 60 is thermally conductive or otherwise configured to heat the thermoplastic material 70 conveyed within the conduit 60. Using the heater 40, the thermoplastic material 70 is heated to, or above, a temperature corresponding to the melting point of the thermoplastic material 70 and transitions to a fluidic thermoplastic material 70. The heater 40 heats the conduit 60 and/or the thermoplastic material 70 via conduction, convenient, or radiation. In an exemplary embodiment, the heater 40 forms a portion of the conduit 60 such that the thermoplastic material 70 flows through the heater 40. The heater 40 may be an electric resistance heater, radiation heater, or the like. The heater 40 is operably coupled to the controller 20 and/or the controller 45 such that one or both of the controller 20 and the controller 45 activates the heater 40 and controls the temperature to which the conduit 60 and/or the thermoplastic material 70 is heated. The fluidic thermoplastic material 70 is conveyed through the conduit 60 and through an opening formed in the extruder tip 65. In one embodiment, the handheld device 15 further includes a valve that is operably coupled to one or both of the controller 20 and the controller 45, with the valve configured to stop, start, or otherwise control the flow of the fluidic thermoplastic material 70 through the conduit 60 and/or the extruder tip 65. As shown, the handheld device 15, and thus the controller 45, is operably coupled to the controller 20 via a control cord 80. Alternatively, the handheld device 15 and thus the controller 45 may be in wireless communication with the controller 20. In an exemplary embodiment, the controller 45 is an on off switch. The opening of the extruder tip 65 may form any variety of different sized shapes such as a circle, rectangle, other parallelogram, oval, etc. The handheld device 15 is configured to couple to and release the extruder tip 65 so that any variety of different extruder tips may be coupled to the handheld device 15. For example, the extruder tip 65 may be coupled to the handheld device 15 via corresponding internal and external threads. The handheld device 15 further includes a nozzle 85 that at least partially surrounds the extruder tip 65 or otherwise is configured to direct a gas towards the extruder tip 65 and/or the fluidic thermoplastic material 70 that exits the opening in the extruder tip 65. The handheld device 15 further includes a conduit 90 that is fluidically coupled to, and in communication with, the nozzle 85 and the regulator 30 that regulates the flow of the gas through the conduit 90 when activated. The conduit 90 is formed from one or more tubulars, tubing, pipes, or the like; passageways formed within the body 55; or combination thereof. The handheld device 15 is coupled to or includes an electrical power source. As shown, an electrical cord 95 couples the handheld device 15 to the controller 20, which includes a power source. However, the electrical power source may be a battery that is located within the handheld device 15 or the like. In an exemplary embodiment, the regulator 30 is operably coupled to the accumulator 35, and the controller 20 is operably coupled to, and in communication with, the regulator 30 to control the flow rate at which a gas is released from the accumulator 35. In an exemplary embodiment, the gas is nitrogen. However, the gas may be any variety of gas and is not limited to nitrogen. The controller 20 is also operably coupled to, and in communication with, the dispenser 25. The dispenser 25 is configured to convey the thermoplastic material 70 into the conduit 60. In an exemplary embodiment, the dispenser 25 is or includes a stepper motor. When the thermoplastic material 70 is a thermoplastic filament or tube having a consistent circumference, the flow rate at which the thermoplastic material 70 is conveyed through the conduit 60 is based on the speed at which the filament is conveyed or fed into the conduit 60.

Figure 3A:
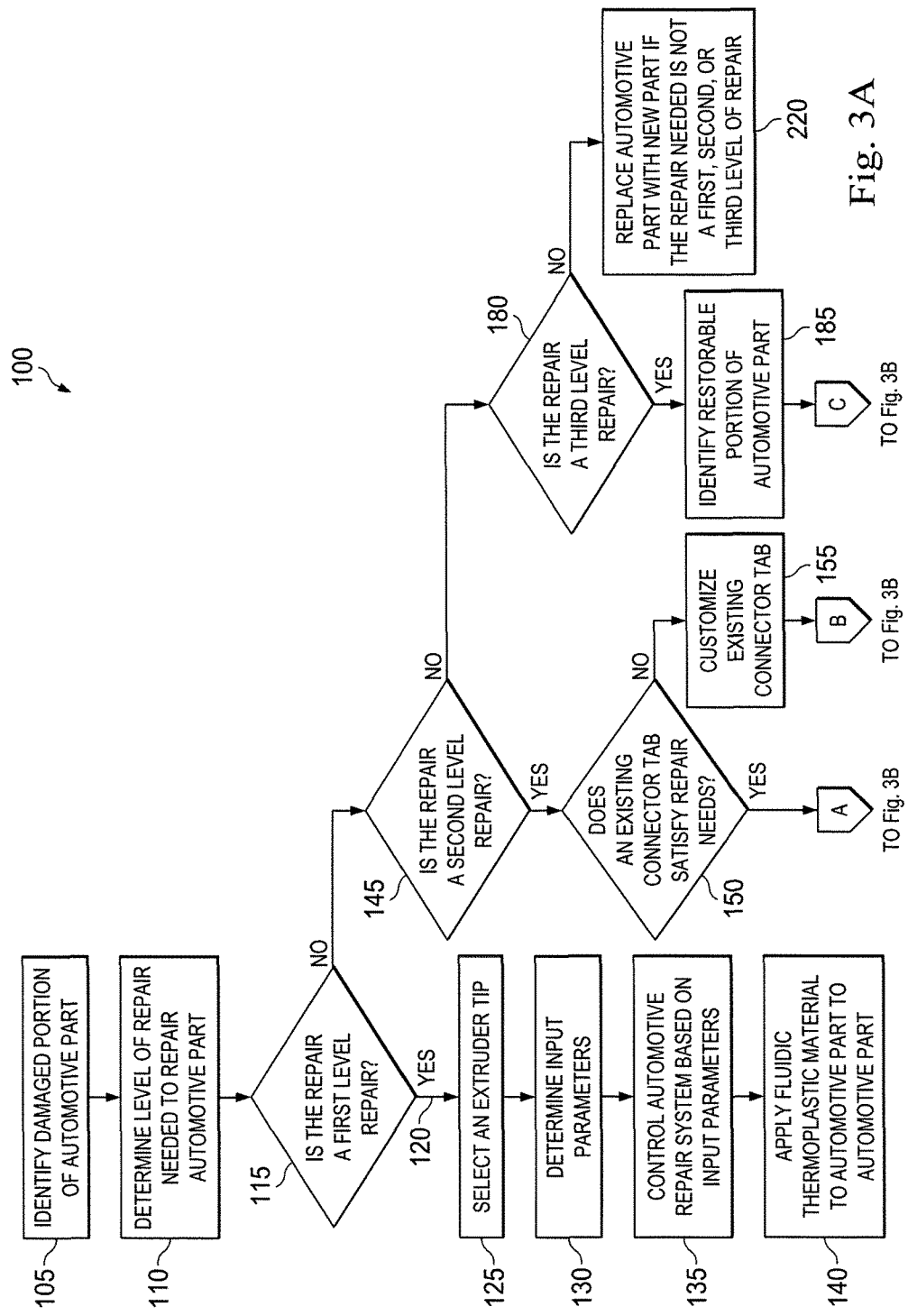
FIGS. 3A and 3B together form a flow chart illustration of a method of operating the system of FIG. 2, according to an exemplary embodiment of the present disclosure.
Figure 3B:
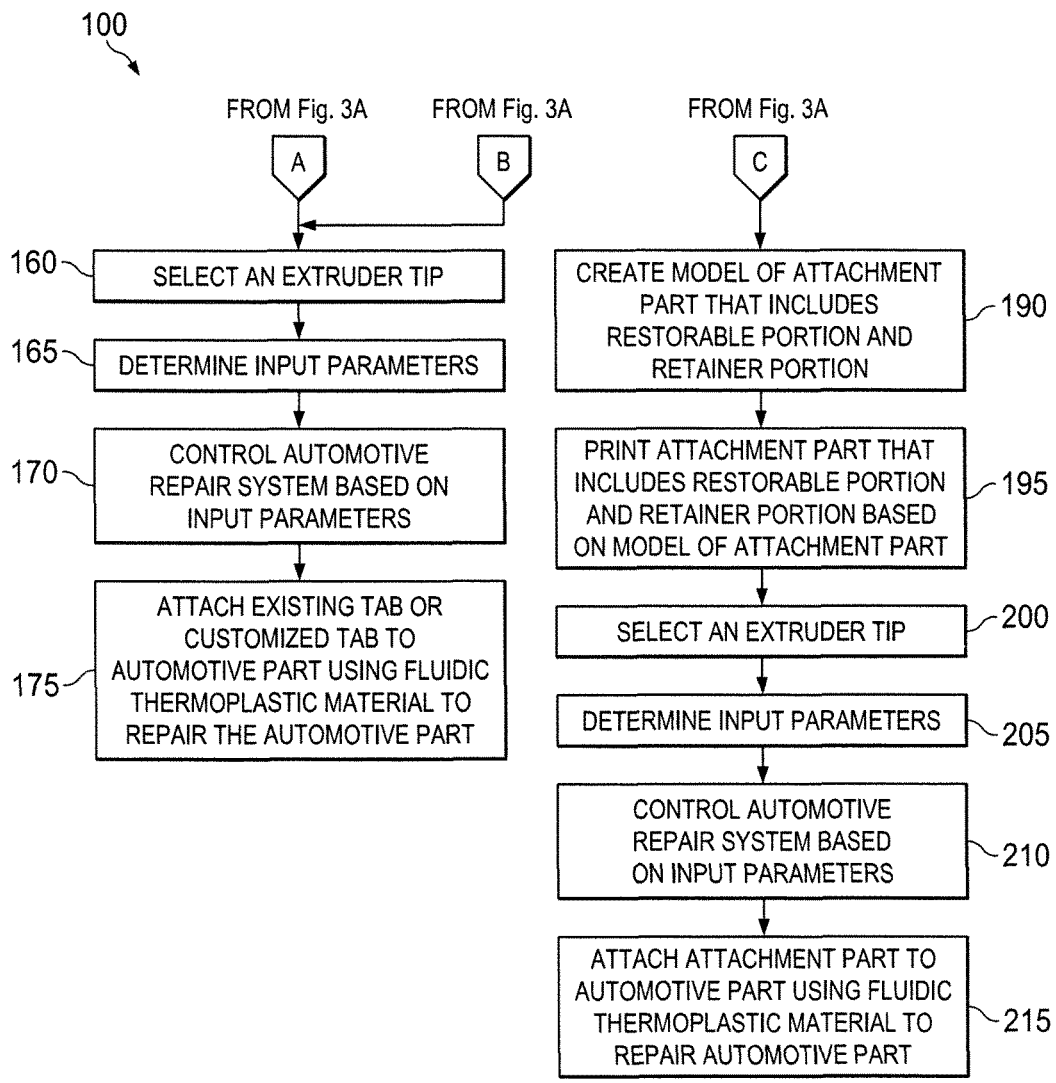

In one or more exemplary embodiments, as illustrated in FIGS. 3A and 3B with continuing reference to FIGS. 1-2, a method of operating the system 10 is generally referred to by the reference numeral 100. In several exemplary embodiments, the method 100 is performed to repair the damaged automotive part 75. The method 100 includes identifying a damaged portion of the automotive part 75 at step 105, determining a level of repair needed to repair the damaged portion of the automotive part 75 at step 110, and determining whether the repair needed is the first level of repair at step 115. If it is determined that the first level of repair is needed at the step 115, then the method 100 further comprises selecting an extruder tip at step 125, determining input parameters at step 130, controlling the automotive repair system 10 based on the input parameters at step 135, and applying the fluidic thermoplastic material 70 to the automotive part 75 to repair the automotive part 75 at step 140. Returning to the step 115, and if it is determined that the needed repair is not the first level of repair, then the method 100 further comprises determining whether the needed repair is a second level of repair at step 145. If it is determined that the needed repair is the second level of repair at the step 145, then the method 100 further comprises determining whether an existing connector tab satisfies the current repair needs at step 150. If it is determined that an existing tab does not satisfy the current repair needs at the step 150, then the method 100 further comprises customizing an existing connector tab at step 155. Returning to the step 150, if it is determined that the existing tab does satisfy the current repair needs, then the next step is the step 160. After completing the steps 150 and 155, the method 100 further comprises selecting an extruder tip at the step 160, determining input parameters at step 165, controlling the automotive repair system 10 based on the input parameters at step 170, and attaching the existing tab or the customized tab to the automotive part 75 using the fluidic thermoplastic material 70 to repair the automotive part 75 at step 175. Returning to the step 145, and if it is determined that the needed repair is not the second level of repair, then the method 100 further comprises determining whether a third level of repair is needed at step 180. If it is determined that the third level of repair is needed at step 180, then the method 100 further comprises identifying a restorable portion of the automotive part 75 at step 185, creating a model of an attachment part that includes the restorable portion and a retainer portion at step 190, printing the attachment part that includes the restorable portion and the retainer portion based on the model of the attachment portion at step 195, selecting an extruder tip at step 200, determining input parameters at step 205, controlling the automotive repair system 10 based on the input parameters at step 210, and attaching the attachment part to the automotive part 75 using the fluidic thermoplastic material 70 to repair the automotive part 75 at step 215. Returning to the step 180, and if it is determined that the third level of repair is not needed at the step 180, then the method 100 further comprises replacing the automotive part 75 with a new part when the repair needed is not the first level, the second level, or the third level of repair at step 220.

Figure 4:
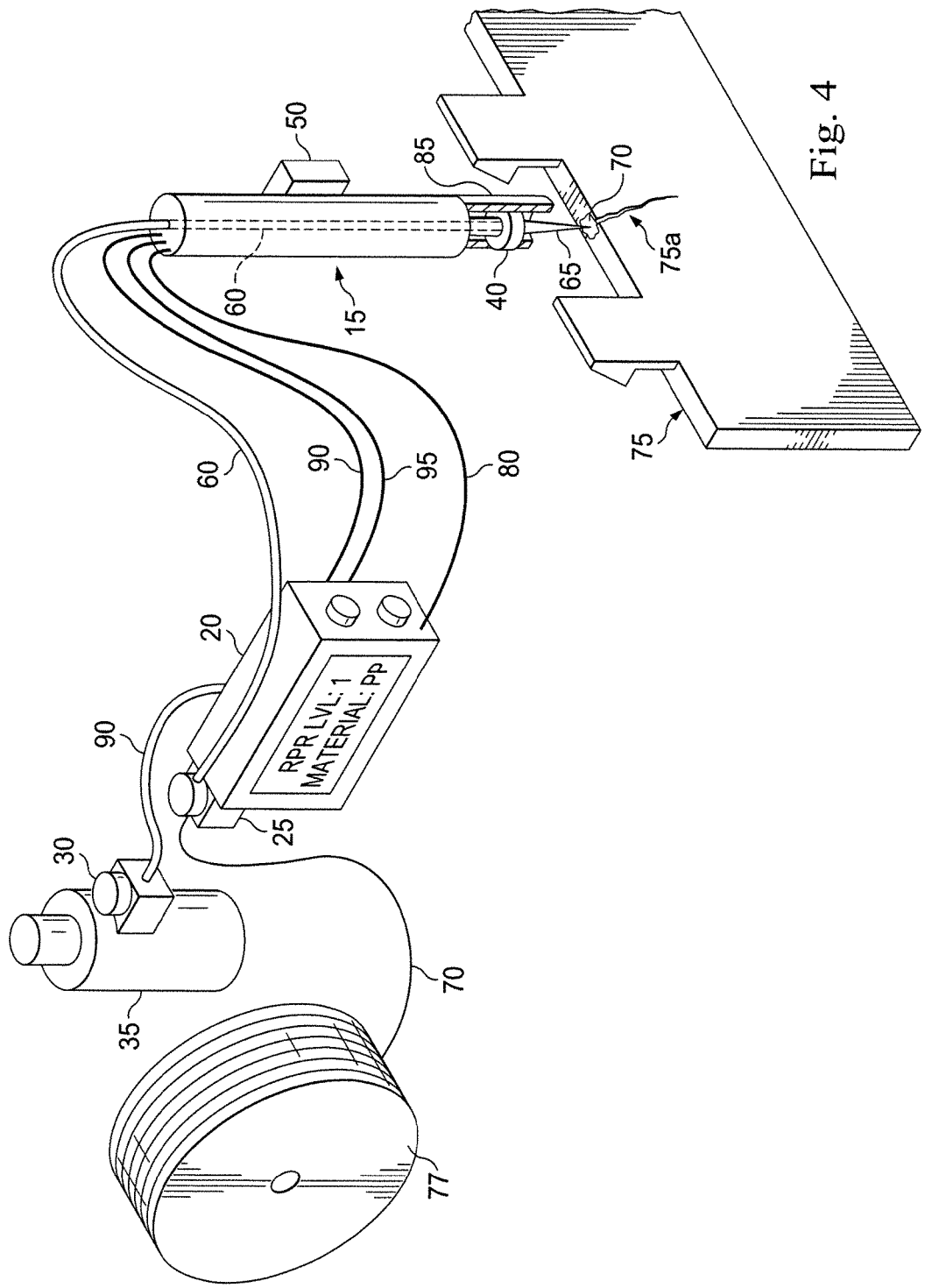
FIG. 4 is a diagrammatic illustration of the system of FIG. 2 during the execution of a step of the method of FIGS. 3A and 3B, according to an exemplary embodiment of the present disclosure.

As illustrated in FIG. 4, the step 105 includes identifying a damaged portion 75a of the automotive part 75 or inspecting the automotive part 75. As shown, the damaged portion 75a includes a portion having a tear in a body of the automotive part 75. However, the damaged portion 75a may include a portion having a scratch in the body of the automotive part 75, a portion missing from the body of the automotive part 75, and the like.

At the step 110, the level of repair needed to repair the damaged portion 75a of the automotive part 75 is determined. Generally, the first level of repair is a repair in which the thermoplastic material 70 replaces a missing portion of the automotive part 75 that was associated with the damaged portion 75a of the automotive part 75, such as a tear, a scratch, etc. However, the first level of repair is also a repair that joins together two separate sections of the automotive part 75 that were previously joined together. The second level of repair is a repair in which the thermoplastic material 70 attaches the existing connector tab or the customized connector tab, which is the missing portion of the automotive part 75, to the automotive part to repair the automotive part 75. The third level of repair is a repair in which the thermoplastic material 70 attaches the attachment part to the automotive part 75 to repair the automotive part 75, with attachment part including the restorable portion of the automotive part and the first retainer portion. The level of repair needed to repair the automotive part 75 may be determined by an automotive repair specialist or by scanning the automotive part using a computer system.

At the step 115, it is determined whether the needed repair is first level of repair. If a first level of repair is needed, then the next step is selecting an appropriate extruder tip 65 at the step 125. A plurality of extruder tips may be available, each having different opening shapes and gauges, or sizes. For example, an extruder tip may be round and highly tapered, which is often suitable for applying fluidic thermoplastic material to form structures or connectors shaped like a rivet or a nail. Alternatively, another extruder tip may be smaller for more intricate repairs and yet another extruder tip may have an opening that is generally rectangular and between about 13-15 millimeters wide and about 1 millimeter tall to repair large cracks or stitch cracks in the automotive part 75 together. Thus, for a first level of repair, the appropriate extruder tip 65 may have a generally rectangular opening such that the fluidic thermoplastic material 70 exits the extruder tip in a ribbon-like shape. At the step 130, the input parameters are determined. The input parameters are inputs associated with the expected repair. The input parameters may any one or more of parameters indicating material(s) of which the thermoplastic material 70 is composed (i.e., polypropylene, polyethylene); the level of repair (i.e., the first level, the second level, or the third level); the circumference of the thermoplastic material filament that is being conveyed through the conduit 60; the melting point of the thermoplastic material 70; and the type of extruder tip 65. The input parameters may be determined by an automotive specialist or by the computer system.

Figure 5:
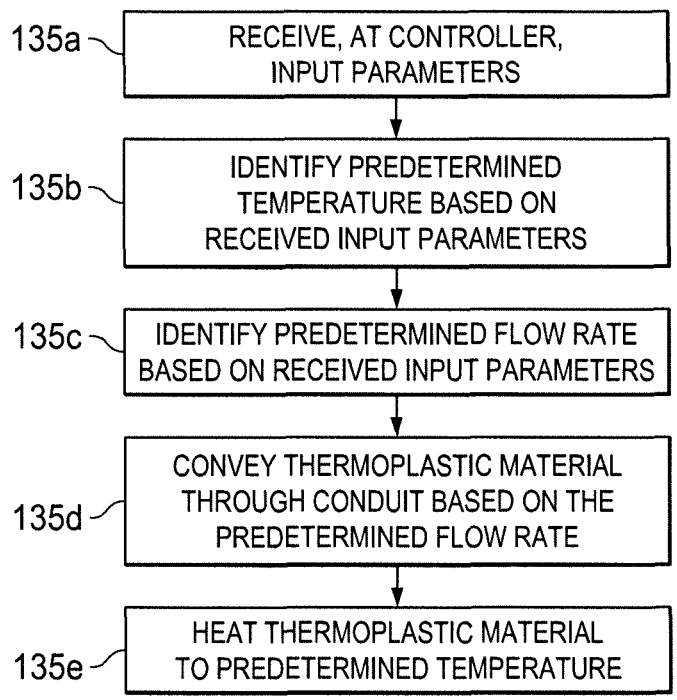
FIG. 5 is a flow chart illustration of a step of the method of FIGS. 3A and 3B, according to an exemplary embodiment of the present disclosure.

In an exemplary embodiment, and as illustrated in FIG. 5, the step 135 of controlling the automotive repair system 10 based on the input parameters comprises substeps of receiving, at the controller 20, input parameters at step 135a; identifying a predetermined temperature to which the thermoplastic material 70 is heated based on the received input parameters at step 135b; identifying a predetermined flow rate at which the thermoplastic material 70 is to be conveyed through the conduit 60 of a handheld device 15 based on the received input parameters at step 135c; conveying the thermoplastic material 70 through the conduit 60 using the predetermined flow rate at step 135d; and heating the thermoplastic material 70 to the predetermined temperature at step 135e. At the step 135a, the input parameters may be received at the controller 20 from the automotive specialist using the input device. In response to receiving the input parameters, the controller 20 identifies the predetermined temperature and identifies the predetermined flow rate at which the thermoplastic material 70 is to be conveyed through the conduit 60. The controller 20 then activates the heater 40 to heat the thermoplastic material 70 and/or the conduit 60 to the predetermined temperature and activates the dispenser 25 to convey the thermoplastic material 70 through the conduit 60 at the predetermined flow rate. For example and looking again to FIG. 4, the controller 20 has received input parameters indicating that the level of repair needed is the first level of repair and the material(s) of which the thermoplastic material 70 is composed is polypropylene ("PP"). In response, the controller 20 identifies a predetermined flow rate at which the PP thermoplastic material 70 should be conveyed through the conduit 60 and instructs the dispenser 25 to convey the PP thermoplastic material 70 through the conduit 60 at the predetermined flow rate. Additionally, the controller 20 identifies a predetermined temperature to which the PP thermoplastic material 70 should be heated so that the PP thermoplastic material 70 becomes a fluidic PP thermoplastic material 70 and instructs the heater 40 to heat at least a portion of the thermoplastic material 70 and/or the conduit 60 to the predetermined temperature. In an exemplary embodiment, the automotive specialist may change, or fine tune, the flow rate of the thermoplastic material 70 and the temperature to which the thermoplastic material 70 is heated using the input device of the controller 20.

At the step 140, the fluidic thermoplastic material 70 is applied to the damaged portion 75a of the automotive part 75. That is, after the input parameters are received and the system 10 is adjusted based on the input parameters, the automotive specialist picks up the handheld device 15, with the specialist's hand, and places the extruder tip 65 near or on the damaged portion 75a of the automotive part 75. This application allows for a consistent application of the fluidic thermoplastic material 70 to the automotive part 75 and avoids a trial-and-error approach by the automotive specialist to heat the thermoplastic material 70 to the predetermined temperature and maintain that temperature as necessary during the repair of the automotive part 75. Through use of the controller 45, the automotive specialist can easily stop, start, or otherwise control the flow of fluidic thermoplastic material 70 through the valve and therefore, the extruder tip 65. The cooling device 50, which in an exemplary embodiment is the nozzle 85 when the nozzle is dispersing the gas, cools the fluidic thermoplastic material 70 when needed to prevent the thermoplastic material 70 from burning. When the cooling device 50 is the nozzle 85 dispersing the gas, the gas also prevents or at least discourages exposing the fluidic thermoplastic material 70 to oxygen or other impurities. Reducing or avoiding the exposure of the thermoplastic material 70 to the oxygen or other impurities strengths a bond formed between the thermoplastic material 70 and the automotive part 75. In an exemplary embodiment, the nozzle 85 includes a gas diffuser or includes a gas diffuser. However, in other embodiments, the cooling device 50 is a fan or the like. Once applied to the automotive part 75, the fluidic thermoplastic material 70 cools to become a hardened thermoplastic material. As shown in FIG. 4, the fluidic thermoplastic material 70 is applied to a tear in the body of the automotive part 75 to stitch, sew, or otherwise repair the tear. Thus, the fluidic thermoplastic material 70 is applied to the automotive part 75 and hardens to form a missing piece of the automotive part 75 or join together two portions of the automotive part 75.

Figure 6:
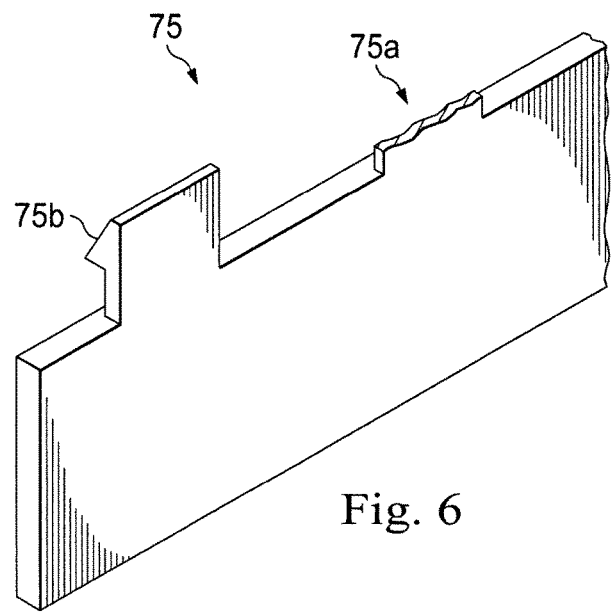
FIG. 6 is a diagrammatic illustration of the automotive part of FIG. 2 during the execution of a step of the method of FIGS. 3A and 3B, according to an exemplary embodiment of the present disclosure.
Figure 7:
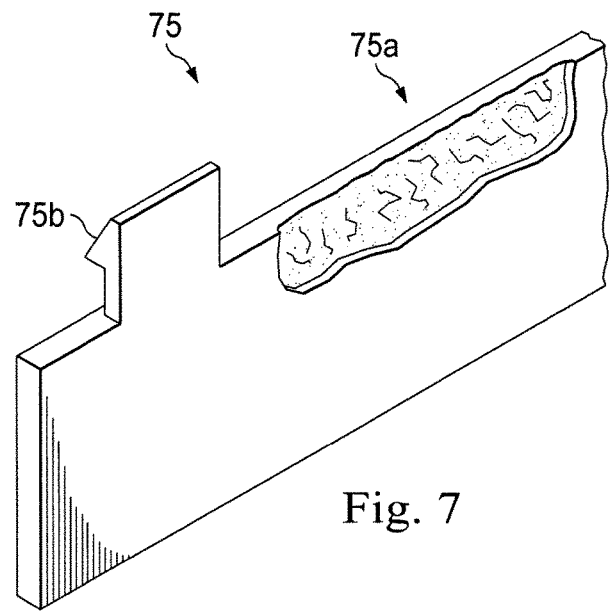
FIG. 7 is another diagrammatic illustration of the automotive part of FIG. 2 during the execution of a step of the method of FIGS. 3A and 3B, according to an exemplary embodiment of the present disclosure.

Returning to the step 115, when it is determined that the level of repair needed is not the first level of repair, then the next step is the step 145. At the step 145, it is determined whether the needed repair is the second level of repair. For example, and referring to FIG. 6, the damaged portion 75a of the automotive part 75 is missing a connector that is identical to the connector 75b. Often, when a second level of repair is needed, an area surrounding the damaged portion 75a of the automotive part 75 is prepped to receive the connector tab or the customized connector tab. This may include removing additional material from the automotive part 75 via sanding, cutting, etc. FIG. 7 illustrates the automotive part 75 when the automotive part 75 is prepped to receive the connector tab or the customized connector tab, according to an exemplary embodiment.

Figure 8:
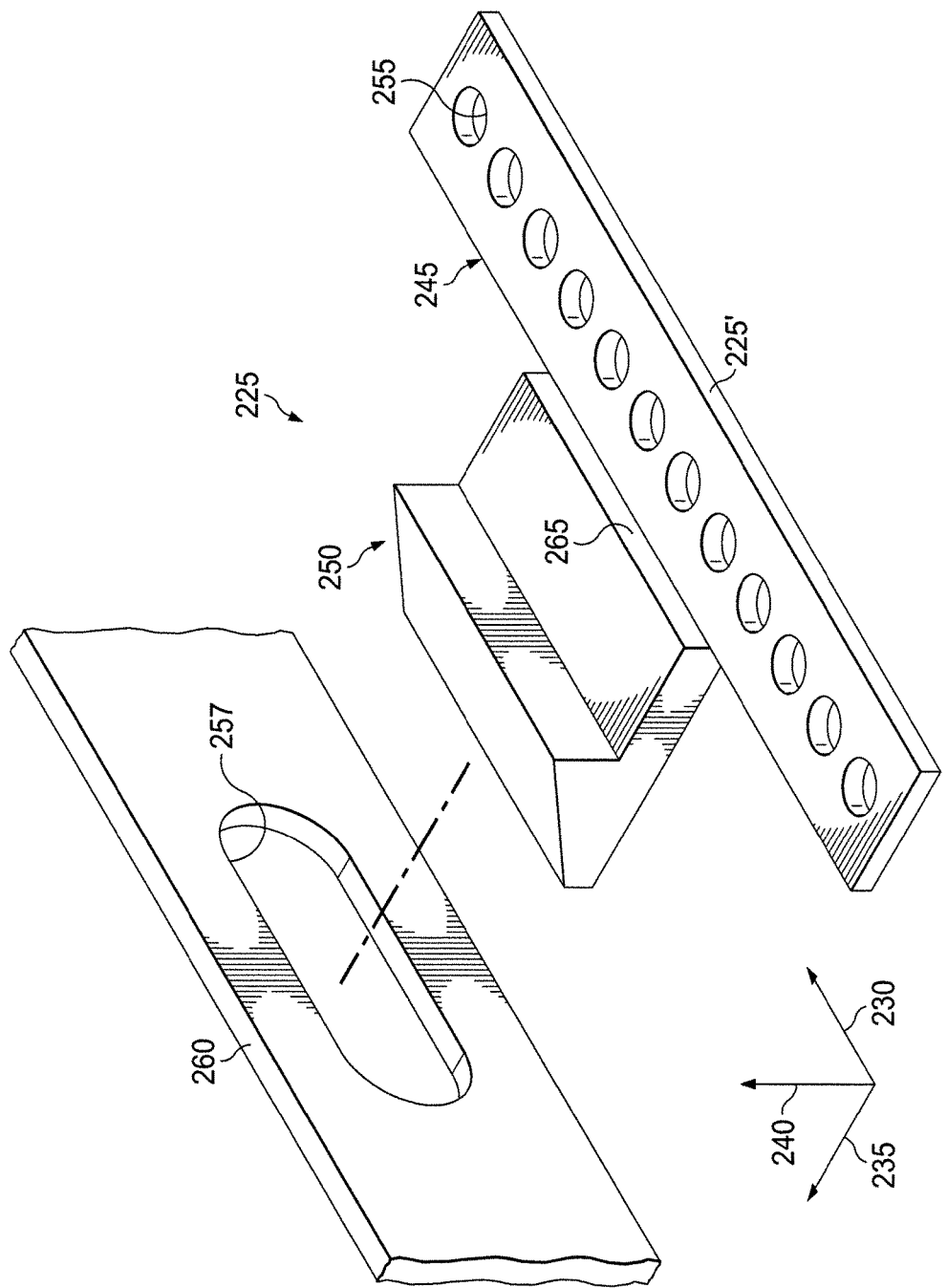
FIG. 8 is a diagrammatic illustration of a connector tab, according to exemplary embodiment of the present disclosure.

At the step 150, it is determined whether an existing connector tab, such as an existing connector tab 225 as shown in FIG. 8, satisfies the repair needs. The existing connector tab 225 has a length measured along a direction indicated by the numeral 230 in FIG. 8; a width measured along a direction indicated by the numeral 235 in FIG. 8; and a height measured along a direction indicated by the numeral 240 in FIG. 8. Generally, the existing connector tab 225 forms a retainer portion 245 and a coupler portion 250. In an exemplary embodiment, the retainer portion 245 acts as a "footer" for the existing connector tab 225. In an exemplary embodiment, a plurality of holes 255 are formed through the retainer portion 245, with the plurality of holes 255 being configured to receive the thermoplastic material 70 to secure the retainer portion 245 to the automotive part 75. In an exemplary embodiment, the retainer portion 245 has a first length. In an exemplary embodiment, the coupler portion 250 corresponds with a coupler 257 formed in another automotive part 260. Generally, the coupler portion 250 is configured to operably engage the coupler 257 of the automotive part 260. In an exemplary embodiment the coupler portion 250 is a male coupler or snap insert and the coupler 257 is a female coupler. However, the coupler portion 250 may form a hole or female coupler. The retainer portion 245 has a height that is less than the height of the coupler portion 250 to form a shoulder 265 at the intersection of the retainer portion 245 and the coupler portion 250. The step 150 may include determining whether the first length of the retainer portion 245 is sized to attach to the automotive part 75. If the first length of the retainer portion 245 is too long or the existing connector tab 225 otherwise does not satisfy the repair needs, then the next step is the step 155.

At the step 155, the existing connector tab 225 may be customized by trimming the retainer portion 245 to a second length that is shorter than the first length to form a customized connector tab 225'. However, the existing tab 225 may be altered in any variety of ways to form the customized connector tab 225', such as reducing the length of the coupler portion 250 and the like.

At the step 160, the extruder tip 65 is selected. The step 160 is substantially similar to the step 125. Therefore, additional details will not be provided here. At step 165, the input parameters are determined. The step 165 is substantially similar to the step 130 except that one of the input parameters is that a second level of repair is needed instead of the first level of repair, which may alter the flow rate at which the thermoplastic material 70 is conveyed through the conduit 60, among other parameters. For example, the flow rate associated with a second level of repair may be greater than the flow rate associated with a first level of repair. Additionally, the step 170 of controlling the automotive repair system 10 based on the input parameters is substantially similar to the step 135 and therefore, additional details will not be provided here.

Figure 9:
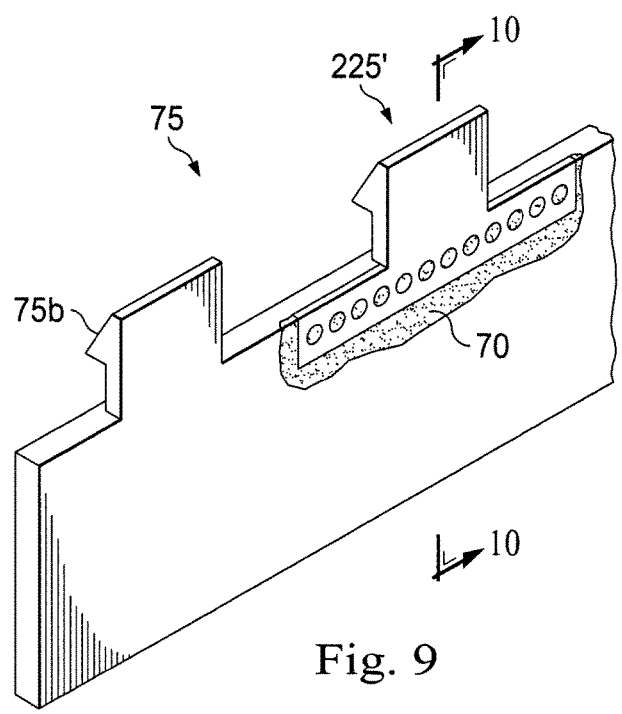
FIG. 9 is a diagrammatic illustration of a customized connector tab attached to the automotive part of FIG. 6 during the execution of a step of the method of FIGS. 3A and 3B, according to exemplary embodiment of the present disclosure.
Figure 10:
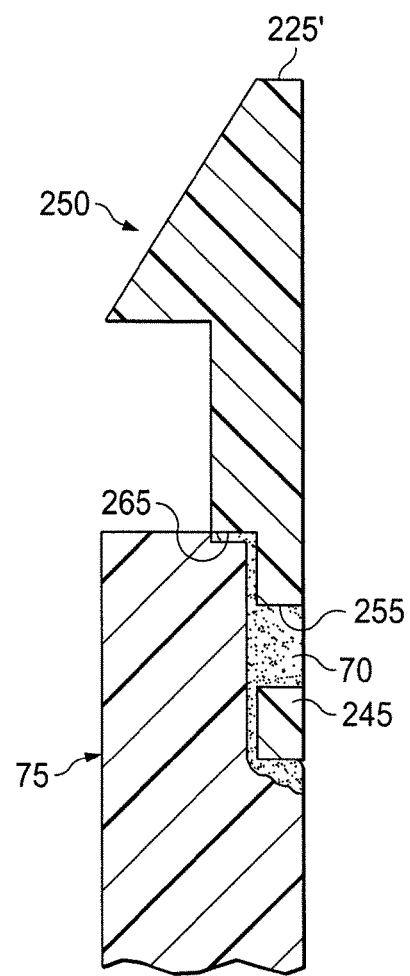
FIG. 10 is a sectional view of the customized connector tab and the automotive part of FIG. 9, according to exemplary embodiment of the present disclosure.

At the step 175, the connector tab 225 or the customized connector tab 225' is attached to the automotive part 75 using the fluidic thermoplastic material 70. The step 175 is similar to the step 140. However, the automotive specialist stitches or sews the customized connector tab 225' to the automotive part 75 by directing the fluidic thermoplastic material 70 into the plurality of holes 255. Using the automotive repair system 10, the automotive specialist is capable of placing the customized connector tab 225' in the desired position with one hand and then applying the thermoplastic material 70 to the customized connector tab 225' with his or her other hand. As shown in FIGS. 9 and 10, the customized connector tab 225' is attached to the automotive part 75 such that the coupler portion 250 extends away from the automotive part 75 and the retainer portion 245 is coupled to the automotive part 75 via the thermoplastic material 70. The plurality of holes 255 retains the thermoplastic material 70 and provides additional surface area to which the thermoplastic material 70 is applied onto. The shoulder 265 encourages proper alignment of the customized connector tab 225' with the automotive part 75 as the shoulder 265 engages with a corresponding shoulder or edge of the automotive part 75. The thermoplastic material 70 is sandwiched between the automotive part 75 and the retainer portion 245 as well as accommodated within the plurality of holes 255. The customized connector tab 225' is attached to replace the missing piece of the automotive part 75 to repair the automotive part 75.

Figure 11:
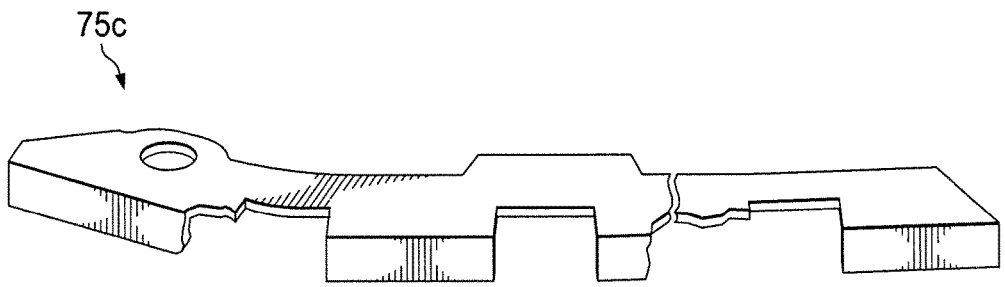
FIG. 11 is a diagrammatic illustration of a portion of a damaged automotive part, according to an exemplary embodiment of the present disclosure.
Figure 12:
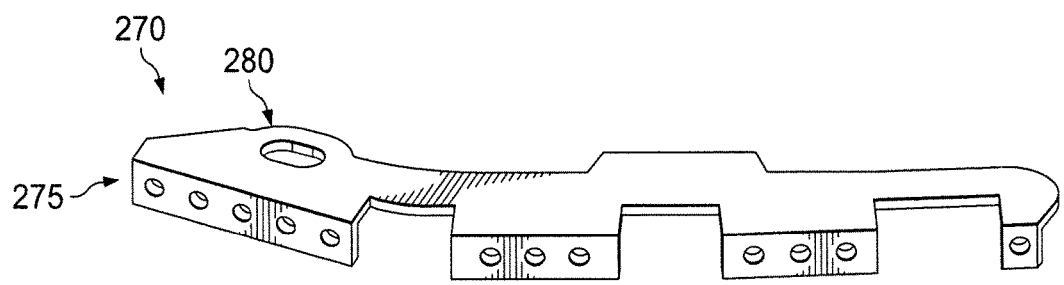
FIG. 12 is a diagrammatic illustration of an attachment part, according to an exemplary embodiment of the present disclosure.
Figure 13:
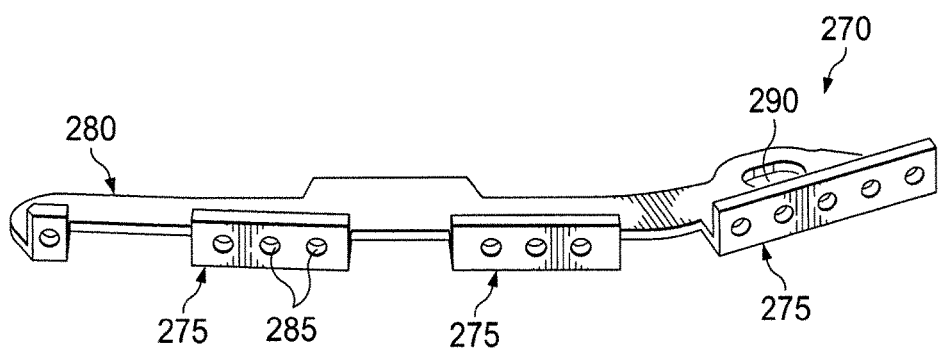
FIG. 13 is another diagrammatic illustration of the attachment part of FIG. 12, according to an exemplary embodiment of the present disclosure.

Returning to the step 145, and when it is determined that the level of repair needed is not the second level of repair, the next step is the step 180. At the step 180, it is determined whether the third level of repair is needed to repair the damaged portion 75a of the automotive part 75. An example of when the level of repair needed is a third level of repair is illustrated in FIG. 11. FIG. 11 illustrates a damaged attachment portion 75c that has broken away or otherwise been removed from the automotive part 75. The first and the second level of repair may not sufficiently repair the damaged attachment portion 75c. Thus, a third level of repair is needed so that the thermoplastic material 70 attaches, to the automotive part 75, an attachment part 270 (shown in FIGS. 12 and 13) to replace the damaged attachment portion 75c. When it is determined at the step 180 that the third level of repair is needed, then the next step is the step 185. At the step 185, a restorable portion of the automotive part 75 is identified. Generally, the restorable portion is a portion of the automotive part 75 that has detached from the automotive part 75, such as the damaged attachment portion 75c.

Figure 14:
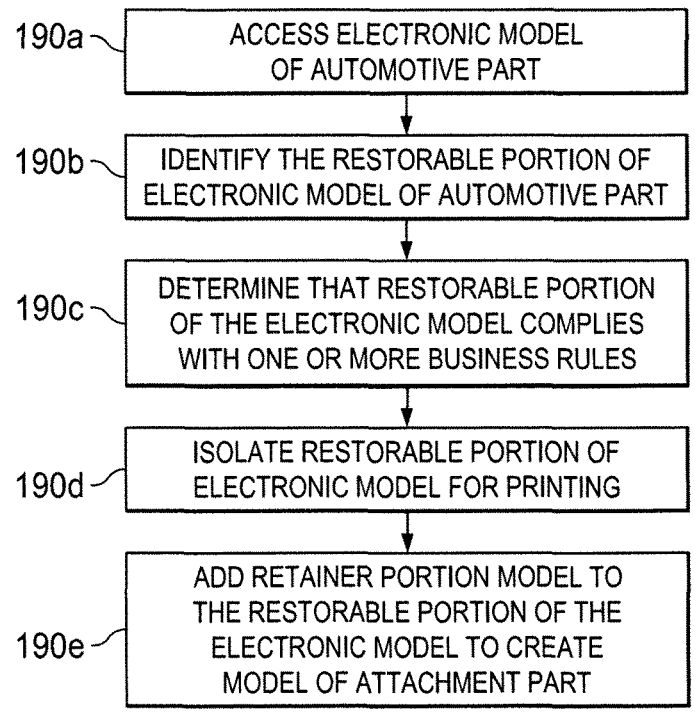
FIG. 14 is a flow chart illustration of a step of the method of FIGS. 3A and 3B, according to an exemplary embodiment of the present disclosure.
Figure 15:
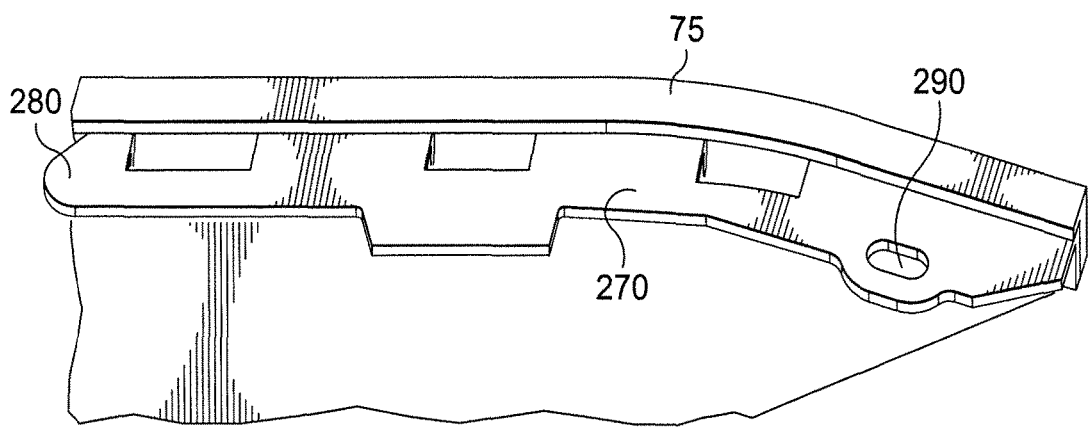
FIG. 15 is a diagrammatic illustration of the attachment part of FIG. 12 and a damaged automotive part, according to an exemplary embodiment of the present disclosure.

At the step 190, a model of the attachment part 270 is created. In an exemplary embodiment, the step 190 comprises one of more substeps, as illustrated in FIG. 14, that include accessing an electronic model of the automotive part 75 at step 190a, identifying the restorable portion of the electronic model of the automotive part at step 190b, determining whether the restorable portion of the electronic model complies with one or more business rules at step 190c, isolating the restorable portion of the electronic model for printing at step 190d, and adding a retainer portion model to the restorable portion of the electronic model to create the model of the attachment part 270 at step 190e. Generally, the electronic model of the automotive part is accessed using a computer system, 3-D modeling software and files, such as sterolithography software and files. Determining whether the restorable portion of the electronic model complies with one or more business rules may include determining whether the volume associated with the restorable portion of the model exceeds a predetermined percentage of the total volume of the automotive part 75; whether the restorable portion of the model is categorized as a "do not print" portion; whether the restorable portion of the model exceeds printing capabilities, etc. In an exemplary embodiment, the step 190c may be executed by an automotive specialist or by a computer system. At the step 195, the attachment part 270 is printed or otherwise manufactured via additive manufacturing, based on the model of the attachment part. In an exemplary embodiment and referring back to FIGS. 12 and 13, the attachment part 270 includes at least one retainer portion 275 configured to attach to the automotive part 75. The retainer portion(s) 275 forms a plurality of holes 285 configured to receive the thermoplastic material 70 to secure the retainer portion(s) 275 to the automotive part 75. The attachment part 270 also includes a restorable portion 280 that defines a shape corresponding to a portion of the automotive part 75. The restorable portion 280 may also form a coupler 290 that operably couples with another coupler on a second automotive part (not shown). Sections of the restorable portion 280 may be offset from the retainer portion(s) 275 such that, when attached to the automotive part, the offsets form female couplers. In an exemplary embodiment, the retainer portion 275 extends in a plane that is generally perpendicular to a plane in which the restorable portion 280 extends; as a result, when the retainer portion 275 is attached to the automotive part 75, the restorable portion 280 cantilevers outwardly from the automotive part 75.

Figure 16:
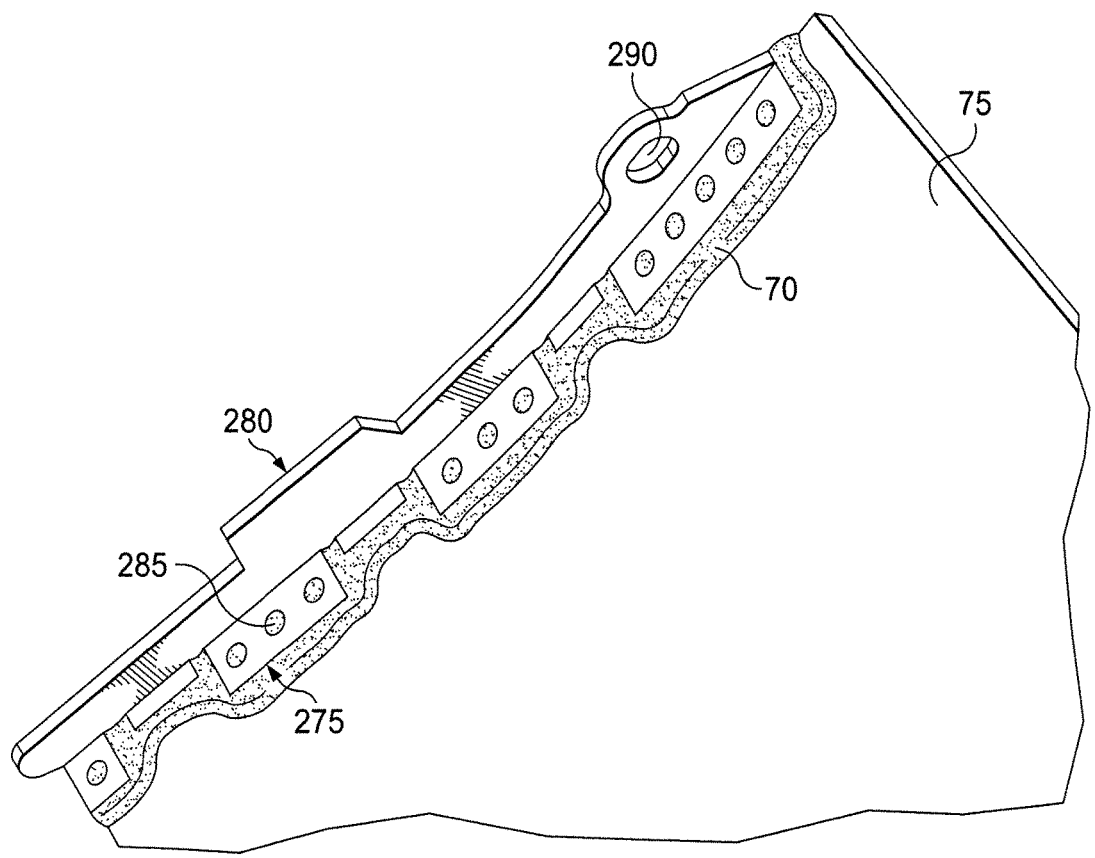
FIG. 16 is a diagrammatic illustration of the attachment part of FIG. 12 and the damaged automotive part of FIG. 15 during the execution of a step of the method of FIGS. 3A and 3B, according to an exemplary embodiment of the present disclosure.
Figure 17:
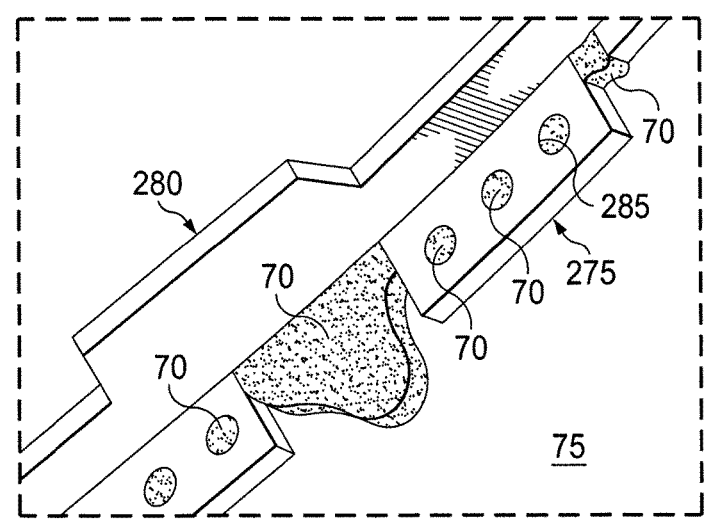
FIG. 17 is another diagrammatic illustration of the attachment part of FIG. 12 and the damaged automotive part of FIG. 15 during the execution of a step of the method of FIGS. 3A and 3B, according to exemplary embodiment of the present disclosure.

At the step 200, the extruder tip 65 is selected. The step 200 is substantially similar to the step 125. Therefore, additional details will not be provided here. At step 205, the input parameters are determined. The step 205 is substantially similar to the step 130 except that one of the input parameters is that a third level of repair, instead of the first level of repair, is needed. Additionally, the step 210 of controlling the automotive repair system 10 based on the input parameters is substantially similar to the step 135 and therefore, additional details will not be provided here. The step 215 of attaching the attachment part to automotive part 75 using the fluidic thermoplastic material 70 is substantially similar to the step 175. However, the retainer portion(s) 275 are spaced and shaped such that each couple to the automotive part 75, as shown in FIGS. 16 and 17. The thermoplastic material 70 is sandwiched between the retainer portion(s) 275 and the automotive part 75 and is also accommodated in the plurality of holes 285.

Returning to the step 180, and when the level of repair needed is not the third level, then the next step is the step 220. At the step 220, and if the repair needed is not the first, second, or third level of repair, then the automotive part 75 is replaced with a new automotive part.

Figure 18:
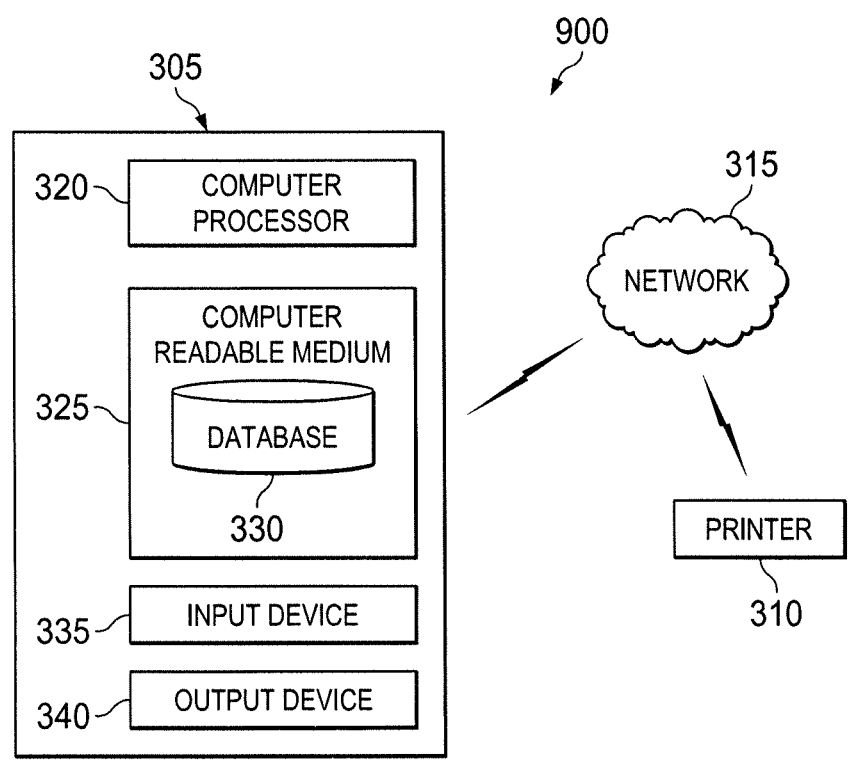
FIG. 18 illustrates an additive manufacturing system, according to an exemplary embodiment of the present disclosure.

In an exemplary embodiment and as shown in FIG. 18, a printing system 300 includes one or more computers 305 and a printer 310 that are operably coupled together, and in communication via a network 315. In one or more exemplary embodiments, the attachment part 270 and/or the existing connector tab 225 may be manufactured using the printing system 300. In one or more exemplary embodiments, the one or more computers 305 include a computer processor 320 and a computer readable medium 325 operably coupled thereto. In one or more exemplary embodiments, the computer processor 320 includes one or more processors. Instructions accessible to, and executable by, the computer processor 320 are stored on the computer readable medium 325. A database 330 is also stored in the computer readable medium 325. In one or more exemplary embodiments, the computer 305 also includes an input device 335 and an output device 340. In one or more exemplary embodiments, web browser software is stored in the computer readable medium 325. In one or more exemplary embodiments, three dimensional modeling software is stored in the computer readable medium. In one or more exemplary embodiments, software involving finite element analysis and the optimization of the automotive connector tab 225 and/or the automotive attachment part 270 is stored in the computer readable medium 325. In one or more exemplary embodiments, any one or more constraints are entered in the input device 385 such that the software aids in the design on the automotive connector tab 225 and/or the automotive attachment part 270. In one or more exemplary embodiments, the input device 335 is a keyboard, mouse, or other device coupled to the computer 305 that sends instructions to the computer 305. In one or more exemplary embodiments, the input device 335 and the output device 340 include a graphical display, which, in several exemplary embodiments, is in the form of, or includes, one or more digital displays.

In one or more exemplary embodiments, the printer 310 is a three-dimensional printer. In one or more exemplary embodiments, the printer 310 includes a layer deposition mechanism for depositing material in successive adjacent layers; and a bonding mechanism for selectively bonding one or more materials deposited in each layer. In one or more exemplary embodiments, the printer 310 is arranged to form a unitary printed body by depositing and selectively bonding a plurality of layers of material one on top of the other. In one or more exemplary embodiments, the printer 310 is arranged to deposit and selectively bond two or more different materials in each layer, and wherein the bonding mechanism includes a first device for bonding a first material in each layer and a second device, different from the first device, for bonding a second material in each layer. In one or more exemplary embodiments, the first device is an ink jet printer for selectively applying a solvent, activator or adhesive onto a deposited layer of material. In one or more exemplary embodiments, the second device is a laser for selectively sintering material in a deposited layer of material. In one or more exemplary embodiments, the layer deposition means includes a device for selectively depositing at least the first and second materials in each layer. In one or more exemplary embodiments, any one of the two or more different materials may be Acrylonitrile-Butadiene-Styrene or ABS plastic, Polylactic acid or PLA, polyamide, aluminum, glass filled polyamide, sterolithography materials, silver, titanium, steel, wax, photopolymers, polycarbonate, and a variety of other materials. In one or more exemplary embodiments, the printer 310 may involve fused deposition modeling, selective laser sintering, and/or multi jet modeling. In operation, the computer processor 320 executes a plurality of instructions stored on the computer readable medium 325. As a result, the computer 305 communicates with the printer 310, causing the printer 310 to manufacture the automotive connector tab 225 and/or the automotive attachment part 270 or at least a portion thereof. In one or more exemplary embodiments, manufacturing the automotive connector tab 225 and automotive attachment part 270 using the system 300 results in an integrally formed automotive connector tab 225 and/or an integrally formed automotive attachment part 270.

During operation of the system 300, the computer processor 320 executes the plurality of instructions that causes the manufacture of the automotive connector tab 225 and/or the automotive attachment part 270 using additive manufacturing. Thus, the automotive connector tab 225 and/or the automotive attachment part 270 are at least partially manufactured using an additive manufacturing process. Manufacturing the automotive connector tab 225 and/or the automotive attachment part 270 via injection molding processes often is time consuming and expensive. Thus, with additive manufacturing, custom automotive repair parts, such as the attachment part 270 may be created on-demand resulting on custom repair of the automotive part 75. In one or more exemplary embodiments, the use of three-dimensional, or additive, manufacturing to manufacture automotive repair parts or portions thereof, such as the automotive connector tab 225 and/or the automotive attachment part 270, will allow increased flexibility in repair of automotive parts and will decrease the time required to repair the automotive part 75.

In an exemplary embodiment, each of the automotive connector tab 225; the automotive attachment part 270; the thermoplastic material 70; and the automotive part 75 comprises a polypropylene material, a polyethylene material, an Acrylonitrile-Butadiene-Styrene or ABS plastic, Polylactic acid or PLA, thermoplastic olefins (TPOs), polycarbonates, polyesters, polyurethanes, or polyamides, or blends of these with, for instance, glass fibers, etc. Generally, each of the automotive connector tab 225; the automotive attachment part 270; the thermoplastic material 70; and the automotive part 75 may be composed of a metal material, a non-metal material, or any plastic material. In an exemplary embodiment, the composition of the automotive connector tab 225 and/or the automotive attachment part 270 is dependent upon the composition of the automotive part 75 and/or the thermoplastic material 70. Additionally, the selection of the thermoplastic material 70 is dependent upon the composition of the automotive connector tab 225, the automotive attachment part 270, and/or the automotive part 75. For example, when the automotive part 75 is composed of a polypropylene material, the attachment part 270 may be printed using a polypropylene material and the thermoplastic material may be composed of a polypropylene. Thus, when the same material is used for the attachment part 270, the automotive part 75, and the thermoplastic material 70, the execution of the method 100 effectively welds the attachment part 270 to the automotive part 75 using the thermoplastic material 70.

In an exemplary embodiment, the automotive repair system 10 and/or execution of the method 100 provides a consistent and quick method of repair for the damaged automotive part 75. For example, local environmental factors (i.e., humidity and oxygen content in a repair shop) have reduced effects on the method 100 and the ultimate repair of the automotive part 75 when compared to conventional methods of repair involving two-part epoxies and the like. Thus, bonds created—using the thermoplastic material 70—between the attachment part 270 and/or the connector tab 225 and the automotive part 75 are more consistent than conventional methods of repair. Additionally, repairing the automotive part 75 instead of replacing the automotive part 75 can reduce the overall "shop time" (i.e., the amount of time during which the car is in the shop for repairs) by hours or days because the wait for a replacement part is no longer required.

Moreover, the ability to create the attachment part 270, using the method 100, increases the flexibility and scope of feasible repairs for the automotive part 75. That is, the method 100 allows for the repair of automotive parts that were previously, using the conventional methods of repair, irreparable. Thus, the method 100 prevents a new part from being purchased to replace the automotive part 75, which would be discarded. Therefore, the use of the automotive repair system 10 and/or the execution of the method 100 results in less wasted materials (i.e., the discarded damaged parts) compared to conventional methods of automotive repair. Moreover, the handheld device 15 increases the automotive specialist's mobility and only requires one hand to disperse and heat the thermoplastic material 70. This greatly increases the speed and accuracy of the repair when compared to a filament-and-rod method, and reduces the number of man-hours required for a repair when compared with conventional methods of automotive repair. Moreover, when the attachment part 270 and/or the connector tab 225 is composed of the same material as the thermoplastic material 70 and is attached to the automotive part 75 using the thermoplastic material 70, the bond between the attachment part 270 and/or the connector tab 225 is stronger than the bond resulting from conventional automotive repairs. Thus, the tensile strength associated with the now-repaired damaged portion 75a of the automotive part 75 is greater than the tensile strength of the automotive part prior to being damaged. Additionally, during the execution of the method 100 and during use of the system 10, the fluidic thermoplastic material 70 may be applied directly to the attachment part 270, the connector tab 225, and/or the automotive part 75. Thus, the use of adhesion promoters (among other products and steps) is reduced or avoided. Thus, use of the system 10 and/or execution of the method 100 reduces the materials (and cost) needed to complete the repair; reduces the carbon footprint associated with completing the repair; and reduces the time required to complete the repair.

The system 10 and/or the method 100 may be altered in a variety of ways. For example, while the handheld device 15 is shown in FIGS. 2 and 4 as being remote from the controller 20, the dispenser 25, the regulator 30, and the accumulator 35, the handheld device 15 may include the controller 20, the dispenser 25, the regulator 30, and the accumulator 35. Additionally, the handheld device 15 may include another dispenser that is substantially similar to the dispenser 25 such that the dispenser 25 pushes the thermoplastic material 70 through the conduit 60 while the dispenser located in the handheld device 15 pulls the thermoplastic material 70 through the conduit 60. Additionally, while the conduit 60 as shown in FIG. 2 extends from the dispenser 25 and through the handheld device 15 to the extruder tip 65, the thermoplastic material 70 may be conveyed through any variety of channels or passageways formed within the handheld device to the extruder tip 65. While the conduit 60 is shown extending through the body 55 of the handheld device 15 in FIG. 2, in other embodiments the conduit 60 does not extend through the body 55. Instead, the conduit 60 may be coupled to the body 55 or may be simply coupled to the extruder tip 65. Additionally, the amount of gas released by the regulator 30 may be based on the input parameters such that, in response to receiving the input parameters, the controller 20 identifies a predetermined amount of the gas to be released. The controller 20 may then activate the regulator 30 to release the predetermined amount of the gas such that the predetermined amount of gas is released towards and/or around the extruder tip 65. In another embodiment, the handheld device 15 may be wirelessly coupled to the controller 20 via a network. In an exemplary embodiment, the method 100 is automated using a computer system. For example, the automotive part 75 may be reviewed or inspected using a computer system, which also determines the level of repair needed to repair the part, creates the attachment part, and even attaches the attachment part. In an exemplary embodiment, the determined input parameters at the steps 130, 165, and 205 are the same. In an exemplary embodiment, the system 10 may be controlled in the same manner regardless of whether the level of repair needed is the second level of repair or the third level of repair. That is, the input parameters associated with the first level of repair, the second level of repair, or the third level of repair may result in the same predetermined temperature to which the thermoplastic material 70 is heated and/or the same predetermined flow rate at which the thermoplastic material 70 is conveyed through the conduit 60. In an exemplary embodiment, the automotive repair system 10 and/or the method 100 is not limited to automotive repair. For example and in one embodiment, the automotive repair system 10 and/or the method 100 is used to repair a damaged part or portion of an aircraft, a toy, a watercraft, or another type of mechanical and electrical system, such as industrial equipment, etc. In an exemplary embodiment, the system 10 and/or the method 100 results in a repair or replacement of a cap, a lid, a housing, a portion of a housing, or any other portion of an automotive part that is damaged or missing.

Figure 19:
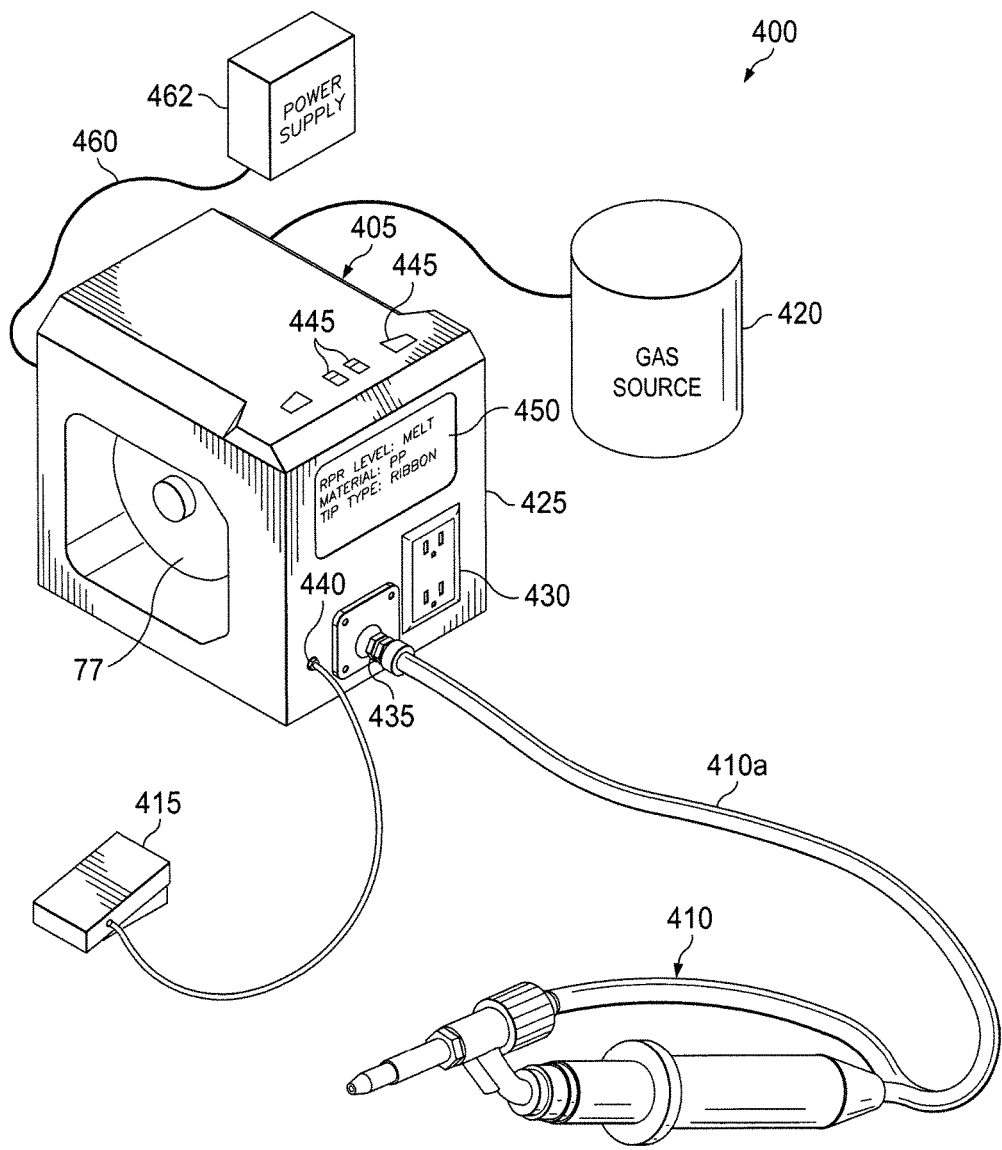
FIG. 19 is a diagrammatic illustration of another exemplary embodiment of the system of FIG. 1, according to an exemplary embodiment of the present disclosure, the system having a mobile unit and a handheld device.

As illustrated in FIGS. 19-21, another embodiment of the repair system 10 is generally referred to by the reference numeral 400. Generally, the repair system 400 includes a mobile unit 405 operably coupled to a handheld device 410, a remote controller 415, and a gas source 420, which may include, or be, the accumulator 35. The mobile unit 405 includes a housing 425 that houses the spool 77 of the solid thermoplastic material 70, which is also referred to as filament. In some embodiments, the mobile unit 405 also includes the dispenser 25, the controller 20, and the regulator 30. Moreover, the mobile unit 405 includes a power supply outlet 430 exposed on an exterior of the housing 425, a handheld dispenser connection 435, a remote controller connection 440, input buttons 445, a graphical user interface 450, a gas connection 455 to the gas source 420, and a power cord 460 that operably couples to a power supply 462. The remote controller connection 440 is operably coupled to each of the controller 20 and the remote controller 415. The power supply outlet 430 is operably coupled to the power cord 460 and the power supply 462 and provides convenient access to an electrical outlet for the user of the mobile unit 405. For example, a soldering iron may be powered via the power supply outlet 430. The gas connection 455 is configured to place the gas source 420 in communication with the regulator 30 or gas valve, which may be a gas solenoid valve. The controller 20 is in communication with and controls the operation of the regulator 30 to selectively allow a gas to flow thorough the regulator 30 and to the handheld dispenser connection 435. The controller 20 is in communication with the dispenser 25 to control the flow of the thermoplastic 70 from the spool 77 and to the handheld device 410 via the connection 435 and the conduit 60. The remote controller 415 as shown in FIG. 19 is a pedal that is actuated by a user's foot and thus is a pedal controller. However, the remote controller 415 may be another type of remote actuation device, such as a trigger located on the handheld device 410 or elsewhere. In some embodiments, instructions or inputs may be received by the controller 20 via depression of the pedal of the remote controller 415. While the remote controller 415 is physically coupled to the mobile unit 405 and the controller 20 via the remote controller connection 440 in FIG. 19, the remote controller 415 is in wireless communication with the controller 20 in some embodiments.

In an exemplary embodiment, and as illustrated in FIGS. 22-26 with continued reference to FIGS. 19-21, the handheld device 410 has a body 465 and a head 470 that is coupled to the body 465. Generally, the body 465 includes the heater 40 and a graspable surface while the filament 70 is conveyed through and heated in the head 470. The handheld device 410 is another embodiment of the handheld device 15.

The head 470 includes a housing 472 to which the tip 65 is detachably coupled. The extruder tip has an interior passageway 65a extending between an inlet 65b and a tip outlet 65c. The housing 472 may include any one of the cooling device 50, a tubular 480, and the nozzle 85, and generally forms an interior passageway 472a through which the filament 70 is conveyed. In some embodiments, the cooling device 50 forms a portion of the interior passageway 472a. The portion of the interior passageway 472a formed by the cooling device 50 is in fluid communication with the interior passageway 65a of the tip 65 such that the solid thermoplastic material 70 passes through the portion of the interior passageway 472a formed by the cooling device 50 and into an inlet 65b. The head 470 also includes a quick connection 485 that couples and decouples the conduit 60 to the housing 472. While the cooling device 50 depicted in FIGS. 22-24 is an air-cooled heat sink that cools a portion of tip 65, the tubular 480, the quick connection 485, and/or the conduit 60, the cooling device 50 may be any variety of heat sinks, such as a water-cooled heat sink, or other liquid and/or gas heat sinks. The solid thermoplastic material 70 or filament is conveyed through the conduit 60, the interior passageway 472a, and the interior passageway 65a of the tip 65 prior to exiting via the tip outlet 65c of the tip 65 as a fluidic thermoplastic material. At least a portion of the housing 472, such as the tubular 480, is disposed around at least a portion of tip 65 to form an annulus 490 between the exterior surface of the tip 65 and the interior surface of the tubular 480. In some embodiments, the annulus 490 is fluidically isolated from the interior passageway 65a of the tip 65. The nozzle 85 is a tubular forming a passageway 85a and has an end surface 85b. The nozzle 85 surrounds the tip 65 to form an annulus 495 between an interior surface of the nozzle 85 and an exterior surface of the tip 65. In some instances, the nozzle 85 is concentrically disposed about the tip 65. Generally, at least a portion of the tip 65 extends within the passageway 85a of the nozzle 85 and another portion of the tip 65 extends beyond the end surface 85b of the nozzle such that the tip outlet 65c is spaced from the end surface 85b of the nozzle 85 by an offset dimension 497. Moreover, the exterior surface of the tip 65 and the end surface 85b of the nozzle define a shoulder 505, with the end surface 85b of the nozzle 85 being radially spaced from the exterior surface of the tip 65 by the annulus 495. The dimension 497 is generally a dimension that is twice the thickness of a part that is to be repaired, such as the part 75. For example, if the thickness of the part 75 is approximately 6 millimeters, the tip 65 is attached to the housing 472 such that the dimension 497 is approximately 12 millimeters. To change the dimension 497, the position of the tip 65 may be moved relative to the nozzle 85 and/or the tip 65 may be detached from the housing 472 and another tip having a different length than the tip 65 may be attached to the housing 472. The tip 65 is detachably coupled to the housing 472 in a variety of ways, such as a friction fit, using threaded connection, etc. In some embodiments, the tip 65 is approximately 2.5 inches long.

The annuli 490 and 495 are in fluid communication with each other and in fluid communication with a conduit 507 that extends between the head 470 and the body 465. A heat sensor 510 is accommodated within the conduit 507 or in a chamber 515 that is in fluid communication with the conduit 507 and that is formed in a housing 520 coupled to the head 470. However, the heat sensor 510 can be located anywhere within or along the body 465 or the head 470 to sense the temperature of a gas that enters, or is already within, the annulus 500 or the annulus 495. As shown, the heat sensor 510 is coupled to the controller 20 via a cable 525. However, the heat sensor 510 can also be in wireless communication with the controller 20 in some embodiments.

Generally, the body 465 includes a housing 530 that may include any one or more of a graspable handle portion 535, the heater 40, and a guard or stop 540 positioned between the handle portion 535 and the heater 40. The housing 530 forms an interior passageway 545 that is in fluid communication with the conduit 90, an interior passageway 551 of the heater 40, and the conduit 507 such that the gas from the gas source 420 is conveyed through the conduit 90, the interior passageways 545 and 551, and the conduit 507 to the annuli 490 and 495. However, in some embodiments, the heater 40 does not form the interior passageway 551 and the heater 40 is merely located within the interior passageway 545. One or more flow sensors 550 is positioned in the interior passageway 545 to sense and/or measure the flow of the gas through the interior passageway 545. The flow sensor 550 is in communication with or operably coupled to the controller 20. In some embodiments, the exterior of the handle portion 535 is formed with a heat resistant material. In some embodiments, the guard or stop 540 prevents or discourages a user from contacting an exterior surface of the heater 40 and/or the portion of the housing 530 in which the heater 40 extends. In some embodiments, the heater 40 is a 1200 w ceramic variable resister. In some embodiments, the flow sensor 550 is an infrared flow meter.

Figure 27:
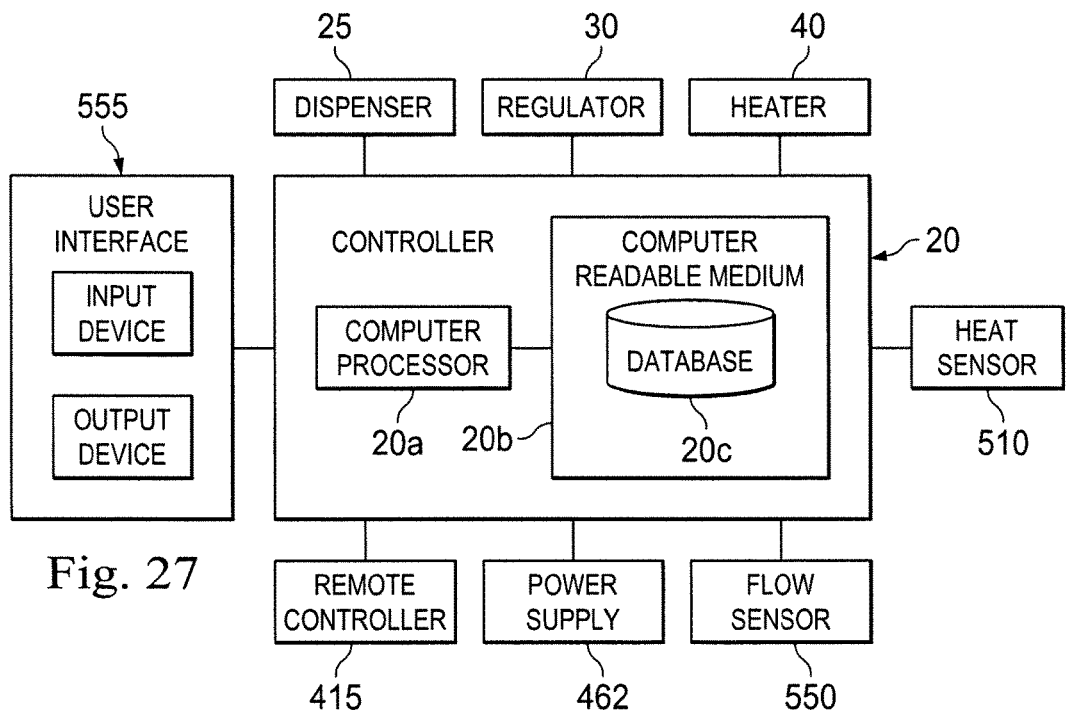
FIG. 27 is a diagrammatic illustration of the system of FIG. 19, according to an embodiment of the present disclosure.

FIG. 27 is a diagrammatic illustration of the system 400. The controller 20 is operably coupled to the power supply 462, the flow sensor 550, the heat sensor 510, the heater 40, the regulator 30, the dispenser 25, a user interface 555, and the remote controller 415. The controller 20 receives inputs, instructions, information, and/or data from the heat sensor 510, the flow sensor 550, and the user interface 555. The user interface 555 includes one or more input devices, such as the input buttons 445, the graphical user interface 450, and the remote controller 415, each of which is operably coupled to the controller 20. Thus, the controller 20 receives inputs, instructions, information, and/or data any one of the input buttons 445, the graphical user interface 450, and the remote controller 414. The user interface 555 also includes an output device, such as the graphical user interface 450, which is also operably coupled to the controller 20. Using the received inputs, information, and/or data, the controller 20 controls the operation of the dispenser 25, the regulator 30, the heater 40, and the user interface 555. In an exemplary embodiment, the controller 20 includes the computer processor 20a and the computer readable medium 20b operably coupled thereto. Instructions accessible to, and executable by, the computer processor 20a are stored on the computer readable medium 20b. The database 20c is also stored in the computer readable medium 20b. In one embodiment, the power supply 462 is a battery although other types of power supplies are contemplated here.

Figure 28:
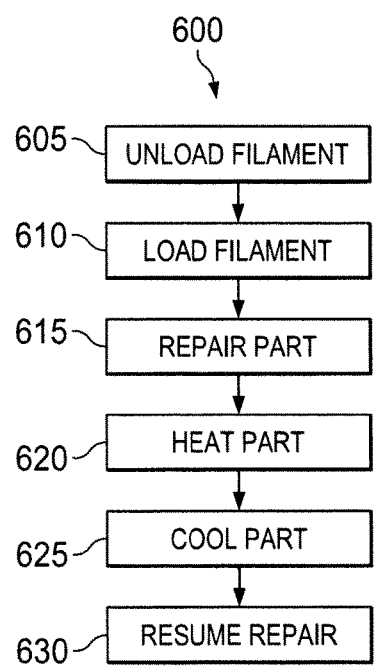
FIG. 28 is a flow chart illustration of a method of operating the system of FIG. 19, according to an exemplary embodiment of the present disclosure.

In one or more exemplary embodiments, as illustrated in FIG. 28 with continuing reference to FIGS. 19-27, a method of operating the system 400 is generally referred to by the reference numeral 600. In several exemplary embodiments, the method 600 includes unloading filament from the repair system 400 at step 605; loading filament in the repair system 400 at step 610; repairing a part using the system 400 at step 615; heating the part using the system 400 at step 620; cooling the part using the system 400 at step 625; and resuming the repair at step 630.

Figure 29:
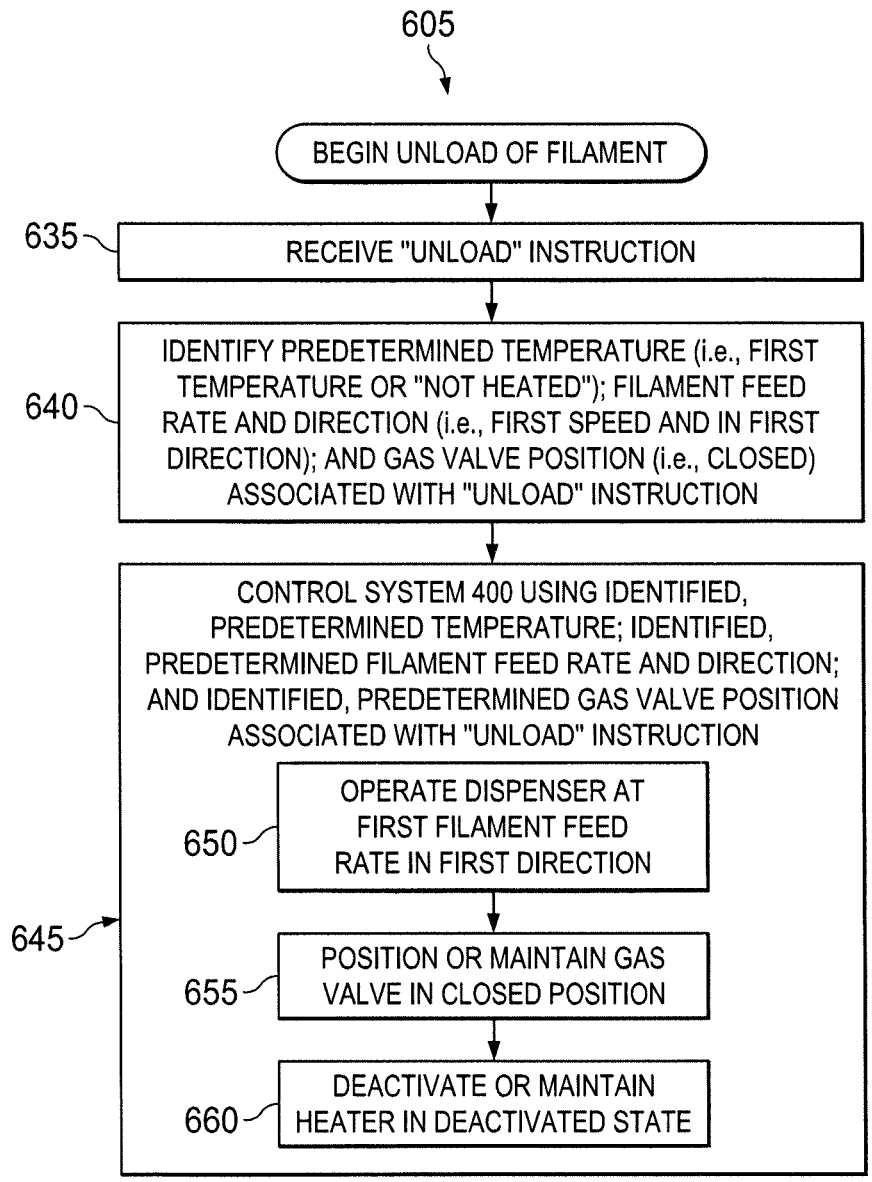
FIG. 29 is a flow chart illustration of a step of the method of FIG. 28, according to an exemplary embodiment of the present disclosure.

At the step 605, the filament is unloaded from the repair system 400. Referring back to FIG. 21, the filament is generally stored on the spool 77, with one end of the filament having been fed onto or over a filament wheel 25a that is coupled to a stepper motor 25b, which is or forms a portion of the dispenser 25. The rotation direction of the filament wheel 25a determines whether the filament will be conveyed in a first direction that is away from the conduit 60 and away from the inlet 65b of the tip 65, or in a second direction that is opposite the first direction and is through the conduit 60 and towards the inlet 65b of the tip 65. The speed of rotation of the filament wheel 25a determines the feed rate at which the filament will be conveyed to the inlet 65b of the tip 65. When rotated in the second direction that is towards the inlet 65b, the filament is pushed, by the dispenser 25, through the conduit 60, the interior passageway 472a of the housing 472, and the interior passageway 65a of the extruder tip 65. When the exterior of the tip 65 is heated, the filament becomes a fluidic thermoplastic material that then exits the tip outlet 65c. Generally, after a repair is completed, the exterior of the tip 65 is cooled and any fluidic thermoplastic material that is accommodated in the passageway 65a of the tip 65 is also cooled and transforms back into a solid thermoplastic material. Thus, the solid thermoplastic material 70 and filament extend from within the passageway 65a of the tip, through the passageway 472a, through the conduit 60, through or over the dispenser 25, and is wound around the spool 77. Often, the solid thermoplastic material 70 and filament need to be removed or unloaded from the system 400 and replaced with another type of filament. To unload the solid thermoplastic material 70 and filament from the system 400, the conduit 60 is decoupled or detached from the housing 472 via the quick connection 485, thereby exposing the filament that extends within the passage 472a. The portion of the thermoplastic filament that extends within the housing 472 can be severed from the remainder of the filament that extends within the conduit 60. An "unload" instruction can be input into the user interface 555 via the button 445 and/or the graphical user interface 450. Referring now to the FIG. 29, the step 605 includes receiving the "unload" instruction at step 635; identifying: a predetermined temperature (i.e., a first temperature or "not heated"), a filament feed rate and direction (i.e., first feed rate and in the first direction); and a gas valve position (i.e., closed position) that are associated with the unload instruction at step 640; and controlling the system 400 using the identified predetermined temperature, the identified predetermined filament feed rate and direction, and the identified predetermined gas valve position associated with the unload instruction at step 645.

At the step 635, the "unload" instruction is received by the system 400. As noted above, the "unload' instruction can be received at the controller 20 during or after the unload instruction is input via one of the buttons 445 and/or the graphical user interface 450. In some instances, the unload instruction can also be received via a single depression or a series of pedal depressions of the remote controller 415.

At the step 640, the controller 20 identifies the predetermined temperature (i.e., a first temperature or "not heated"), the filament feed rate and direction (i.e., first feed rate and in the first direction), and the gas valve position (i.e., closed position) that are associated with the unload instruction. In an exemplary embodiment, data relating to the predetermined temperature, filament feed rate and direction, and gas valve position associated with a variety of instructions is stored in the database 20c of the controller 20.

At the step 645, the controller 20 controls the system 400 using the identified predetermined temperature (i.e., a first temperature or "not heated"), the identified predetermined filament feed rate and direction (i.e., first feed rate and in the first direction), and the identified predetermined gas valve position (i.e., closed position) that are associated with the unload instruction. In an exemplary embodiment, the step 645 includes the steps of operating the dispenser at the first filament feed rate and in the first direction at step 650; positioning or maintaining the gas valve in a closed position at step 655; and deactivating or maintaining the heater 40 in a deactivated state at step 660. At the step 650, the controller 20 operates the filament wheel 25a of the dispenser 25 at the first filament feed rate in the first direction, or in the direction away from the inlet 65b of the tip 65. That is, the filament wheel 25a pulls the filament through the conduit 60 in a direction away from the handheld device 410 to clear the filament from the conduit 60. As the filament has been severed near the quick connection 485, the severed end is also capable of being pulled back towards the filament wheel 25a and away from the inlet 65b of the tip 65 and through the conduit 60. As the identified predetermined gas valve position is the closed position, the controller 20 positions or maintains the gas valve, or regulator 30, in a closed position such that the gas source 420 is fluidically isolated from the handheld device 410. Moreover, as the identified predetermined temperature is a first temperature that is an ambient temperature or "not heated", the heater 40 is deactivated or maintained in the deactivated state at step 660 such that no significant amount of heat is transferred to the tip 65. During the step 605, the system 400 generally rewinds the filament onto the spool 77.

After the filament has been unloaded in the step 605, another filament can be loaded into the system at step 610.

Referring back to FIG. 28, filament is loaded in the system 400 at the step 610. In some embodiments, and referring to FIG. 30, the step 610 includes receiving the "reload" instruction at step 661, identifying the predetermined temperature (i.e., a second temperature), the filament feed rate and direction (i.e., second feed rate and in the second direction), and the gas valve position (i.e., open position) that are associated with the load instruction at step 665; and controlling the system 400 using the identified, predetermined temperature; the identified, predetermined filament feed rate and direction; and the identified predetermined gas valve position that are associated with the unload instruction at step 670.

The step 661 of receiving the reload instruction is substantially similar to the step 635 except that instead of receiving the "unload" instruction, the "reload" instruction is received. Thus, details relating to the step 661 will not be repeated here.

The step 665 of identifying: the predetermined temperature (i.e., a second temperature), the filament feed rate and direction (i.e., second feed rate and in the second direction), and the gas valve position (i.e., open position) that are associated with the load instruction is substantially similar to the step 640 except that the predetermined temperature associated with the load instruction is the second temperature, the filament feed rate and direction is the second feed rate that is different from the first feed rate and the second direction that is opposite from the first direction, and the gas valve position is an open position. Thus, details relating to step 665 will not be repeated here.

At the step 670, the controller 20 controls the system 400 using the identified, predetermined temperature; the identified, predetermined filament feed rate and direction; and the identified, predetermined gas valve position that are associated with the unload instruction. The step 670 includes operating the dispenser 25 at the second filament rate in the second direction at step 675, opening the gas valve or maintaining the gas valve in an open position at step 680, and activating the heater 40 to reach and/or maintain the second temperature at step 685.

At the step 675, the controller 20 rotates the filament wheel 25a at a speed that correlates to the second feed rate and in the second direction such that the filament is being pushed through the conduit 60 towards the inlet 65b of the tip 65.

At the step 680, the controller 20 opens the gas valve or maintains the gas valve in an open state to place the gas source 420 in fluid communication with the annuli 490 and 495 via the conduit 507, the passageways 551 and 545, and the conduit 90. Generally, at the step 680, the controller 20 allows a nitrogen gas to enter the conduit 90, which extends from the regulator 30 to the body 465 of the handheld device 410. As the conduit 90 is fluidically coupled to the interior passageway of 545 of the housing 530, the gas flows through the interior passageway 545 and over or through the flow sensor 550, through the passageway 551 and the conduit 507, and into the annuli 490 and 495. When the heater 40 is activated, the gas is heated as it passes through the passageway 551 or over the heater 40.

At the step 685, the controller 20 activates the heater 40 such that the gas reaches and/or maintains the second temperature. The step 685 includes receiving data from the heat or temperature sensor 510 at step 690, determining an actual temperature of the gas from the data received from the temperature sensor 510 at step 695, comparing the actual temperature with the second temperature at step 700; controlling the heater 40 based on the comparison between the actual temperature of the gas and the second temperature at step 705, receiving data from the gas flow sensor 550 at step 710, identifying an actual gas flow rate based on the received data from the gas flow sensor 550 at step 715, comparing the actual gas flow rate with a predetermined minimum gas flow rate at step 720, and deactivating the heater 40 if the actual gas flow rate is less than the predetermined minimum flow rate at step 725.

In one embodiment, the controller 20, the temperature sensor 510, and the heater 40 form a temperature feedback control loop that uses a predetermined reference temperature, or the identified, predetermined temperature (e.g., the second temperature) as an input for the feedback control loop and the actual temperature as the feedback for the feedback control loop. The steps of 690, 695, 700, and 705 detail the activities of the feedback control loop when reaching or maintaining the second temperature. In some instances, requiring a predetermined minimum gas flow rate through the passageway 545 and/or across/through the heater 40 prevents or at least discourages the overheating of the heater 40 and/or surrounding elements. Thus, if an actual gas flow rate of the gas (as sensed by the gas flow sensor 550 and determined by the controller 20) is less than the predetermined minimum gas flow rate, the heater 40 is deactivated to prevent further heat generation. The steps 710, 715, 720, and 725 detail the activities of the controller 20 when determining whether the actual gas flow rate of the gas is less than the predetermined minimum flow rate and the deactivation of the heater 40 when it does fall below the predetermined minimum flow rate. During the step 670, the filament loaded in the system 400 is conveyed into the passageway 65a of the tip 65, and as the passageway 65a of the tip is heated by the heated gas, the filament is also heated to the second temperature such that the filament becomes a fluidic thermoplastic material. Any previously used thermoplastic material that was accommodated within the passageway 65a of the tip 65 is flushed out by new fluidic thermoplastic material. The second feed rate may be higher than a feed rate associated with a repair, as one purpose of the step 610 is to quickly flush out the previously used thermoplastic material and prepare the system 400 to begin a repair process using the recently loaded filament.

Referring back to FIG. 28, the system 400 is operated to perform a repair process at the step 615. In some instances and referring to FIGS. 31A and 31B, the step 615 includes receiving "repair setting" inputs at step 730; identifying a predetermined temperature, a predetermined filament feed rate and direction, and a predetermined gas valve position using the received "repair settings" inputs at step 735; controlling the system 400 using the identified, predetermined temperature, the identified, predetermined filament feed rate and direction, and the identified, predetermined gas valve position that are associated with the received "repair setting" inputs at step 740.

The step 730 of receiving one or more "repair setting" inputs includes receiving one or more of the following: an input indicating material(s) of which the solid thermoplastic material 70 is/are composed at step 745, an input parameter indicating a shape of the tip outlet of the first extruder tip at step 750; and an input parameter indicating a type of repair to be performed by the repair system 400 at step 755. The method of receiving each of the inputs in the steps 745, 750, and 755 is substantially similar to the step 635 except that instead of receiving the "unload" instruction as in the step 635, an input indicating material(s) of which the solid thermoplastic material is/are composed, such as polyethylene ("PE"), polypropylene ("PP") and the like, is received at step 745, an input parameter indicating a shape of the tip outlet of the tip 65, such as a ribbon tip, a wide ribbon tip, a draw tip, and the like, is received at step 750, and an input parameter indicating a type of repair to be performed by the repair system 400, such as a melt, a draw, and the like, is received at step 755. Thus, details relating to the steps 745, 750, and 755 will not be repeated here. In an exemplary embodiment, the input parameter indicating materials(s) of which the solid thermoplastic material is/are composed includes an input parameter indicating the specific type of filament used. For example, the input received during the step 745 may identify a type of plastic forming the filament and the cross-sectional shape or cross-sectional area of the filament. In an exemplary embodiment, the type of repair identified as a "melt" repair requires a higher feed rate of the filament and a higher predetermined temperature such that a large amount of molten fluidic thermoplastic material is dispensed from the tip outlet 65c. In an exemplary embodiment, the type of repair identified a "draw" repair requires a lower feed rate of the filament than the "melt" repair and a lower predetermined temperature than the "melt" repair such that a small of fluidic material is dispensed from the tip outlet 65c at a temperature slightly above to the melting temperature. In some embodiments, the "melt" type of repair is associated with a level 2 or level 3 repair and a "draw" type of repair is associated with a level 1 repair.

The step 735 of identifying the predetermined temperature, the predetermined filament feed rate and direction, and the predetermined gas valve position associated with the received "repair setting" inputs is substantially similar to the step 640 except that the controller 20 identifies the predetermined temperature, the predetermined filament feed rate and direction, and the predetermined gas valve position that are associated with the received "repair settings" instead of the received "unload" instruction. In an exemplary embodiment, data relating to the predetermined temperature; predetermined filament feed rate and direction; and the predetermined gas valve position associated with the received "repair settings" is stored in the database 20c of the controller 20. As illustrated in FIG. 32, a look-up table 797 or the like may be stored in the database 20c of the controller 20. The look-up table 797 includes a plurality of outputs 797a, with each output including a gas valve position, a temperature, and a filament feed rate in mm/sec. Each of the outputs 797a is predetermined and associated with a combination of the following: the input for type of repair 797b; the input for type of thermoplastic material 797c; and the input for the type of tip 797d. Generally, the input for type of repair 797b is received at the step 755, the input for the type of thermoplastic material 797c is received at the step 745, and the input for the type of tip 797d is received at the step 750. While the filament feed rate of the output 797a in FIG. 32 is represented as mm/sec, which is a length of the filament conveyed over a period of time, the feed rate may also be represented as a rotation of the filament wheel 25a over a period of time or unit of volume over time. Moreover, while the temperature output depicted in FIG. 32 is shown as a single temperature, the temperature output may also include a temperature range. Thus, the first temperature, the second temperature, and the predetermined temperatures include a range of temperatures, in some embodiments.

Referring back to FIGS. 31A-31B, the controller 20 controls the system 400 using the identified, predetermined temperature; the identified, predetermined filament feed rate and direction; and identified, predetermined gas valve position associated with the received "repair setting" inputs at step 740. The step 740 includes positioning or maintaining the gas valve in the identified, predetermined gas valve position at step 760; activating the heater 40 to reach and/or maintain the identified, predetermined temperature at step 765; and operating the dispenser 25 to convey the filament at the identified, predetermined feed rate and direction upon one or both of: the controller 20 determining if the actual temperature exceeds a minimum operating temperature and receipt of a "start" instruction" from the remote controller 415, at step 770.

At step 760, the controller 20 positions or maintains the gas valve in the identified, predetermined gas valve position, which is the open position. As the step 760 is substantially similar to the step 680, additional details regarding the step 760 will not be provided here.

At the step 765, the controller 20 activates the heater 40 such that the gas reaches and/or is maintained at the identified, predetermined temperature. The step 765 includes the step 690, the step 695, comparing the actual temperature with the identified, predetermined temperature at step 775; controlling the heater 40 based on the comparison between the actual temperature of the gas and the identified, predetermined temperature at step 780, and the steps 710, 715, 720, and 725. Generally, the step 765 is substantially similar to the step 685 except that the temperature of the gas that is being reached and/or maintains is the identified, predetermined temperature identified in the step 735 instead of the second temperature identified in the step 665. As the steps 775 and 780 are substantially similar to the steps 700 and 705 except for the differences noted above, additional details regarding the steps 775 and 780 will not be provided here.

During the step 770, the controller 20 operates the dispenser 25 at the identified, predetermined filament speed and the direction upon one or both of: the controller 20 determining that the actual temperature has exceeded a minimum operating temperature at step 785; and receipt of a "start" instruction from the remote controller 415 at the step 790. Generally, the extruder tip 65 is heated to a minimum operating temperature prior to the filament being conveyed into the inlet 65b at the identified, predetermined feed rate. Thus, the controller 20 monitors the actual temperature of the heated gas to determine if the actual temperature is equal to or exceeds the minimum operating temperature. In some instances, the controller 20 operates the filament wheel 25a to convey the filament at the identified, predetermined filament speed rate and direction upon or after the gas reaches or exceeds the minimum operating temperature. In other instances, the minimum operating temperature must be exceeded, and a "start" instruction from the remote controller 415 must be received by the controller 20. Determining whether the actual temperature is equal to or exceeds the minimum operating temperature at step 785 includes the steps 690 and 695 and comparing the actual temperature with the minimum operating temperature at step 795. At the step 790, the "start" instruction from the remote controller 415 may include a depression or a series of depressions of the pedal. In some embodiments, the minimum operating temperature is the identified, predetermined temperature.

Figure 33:
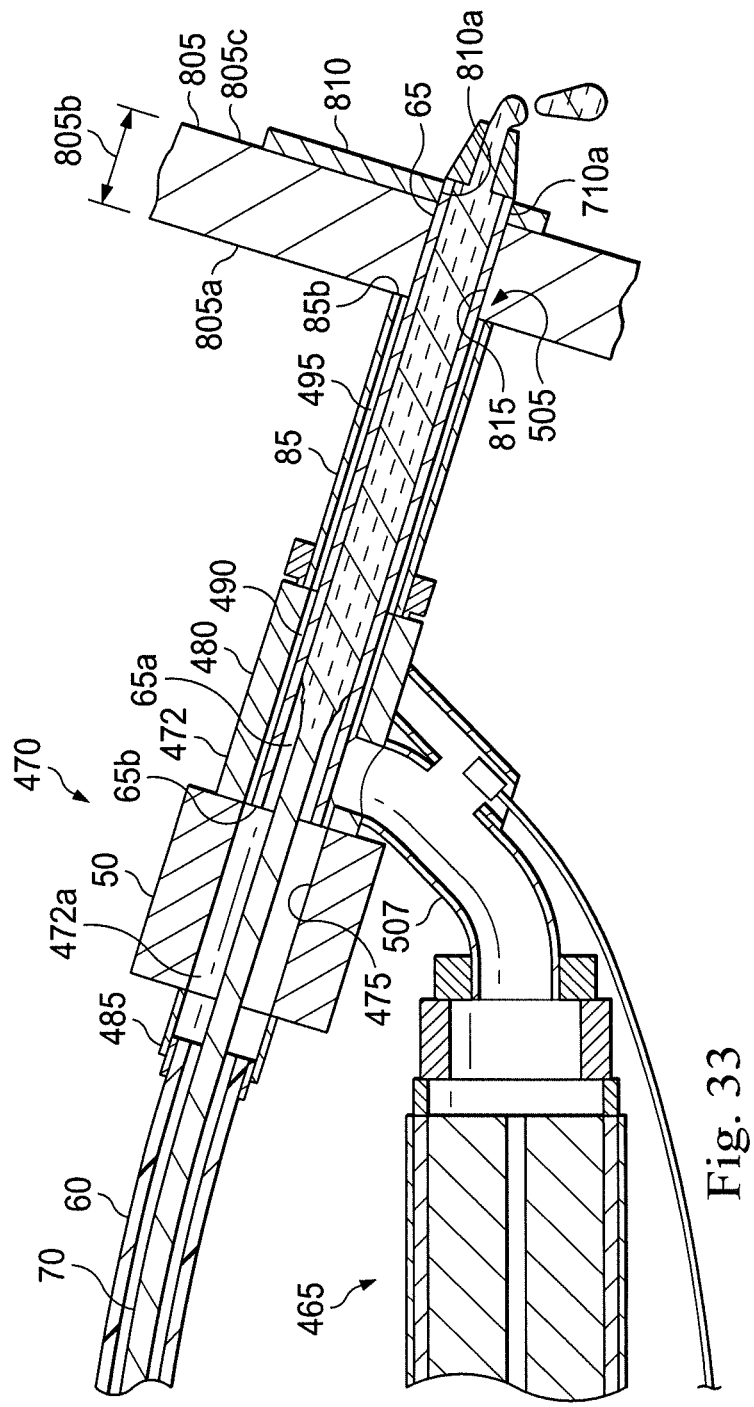
FIG. 33 is a sectional view of a portion of the handheld device of FIG. 19 and a part during a step of the method of FIG. 28, according to exemplary embodiment of the present disclosure.
Figure 34:
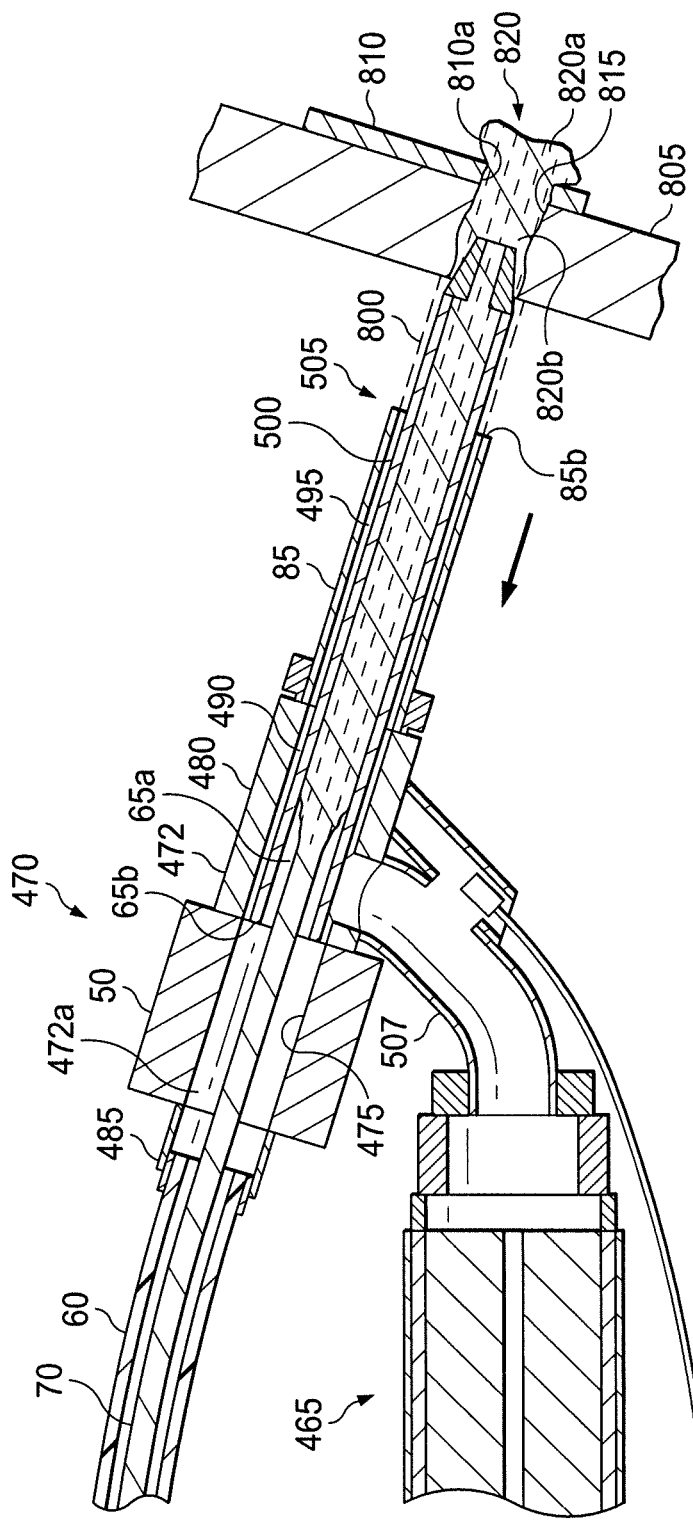
FIG. 34 is a sectional view of a portion of the handheld device of FIG. 19 and the part during another step of the method of FIG. 28, according to exemplary embodiment of the present disclosure.
Figure 35:
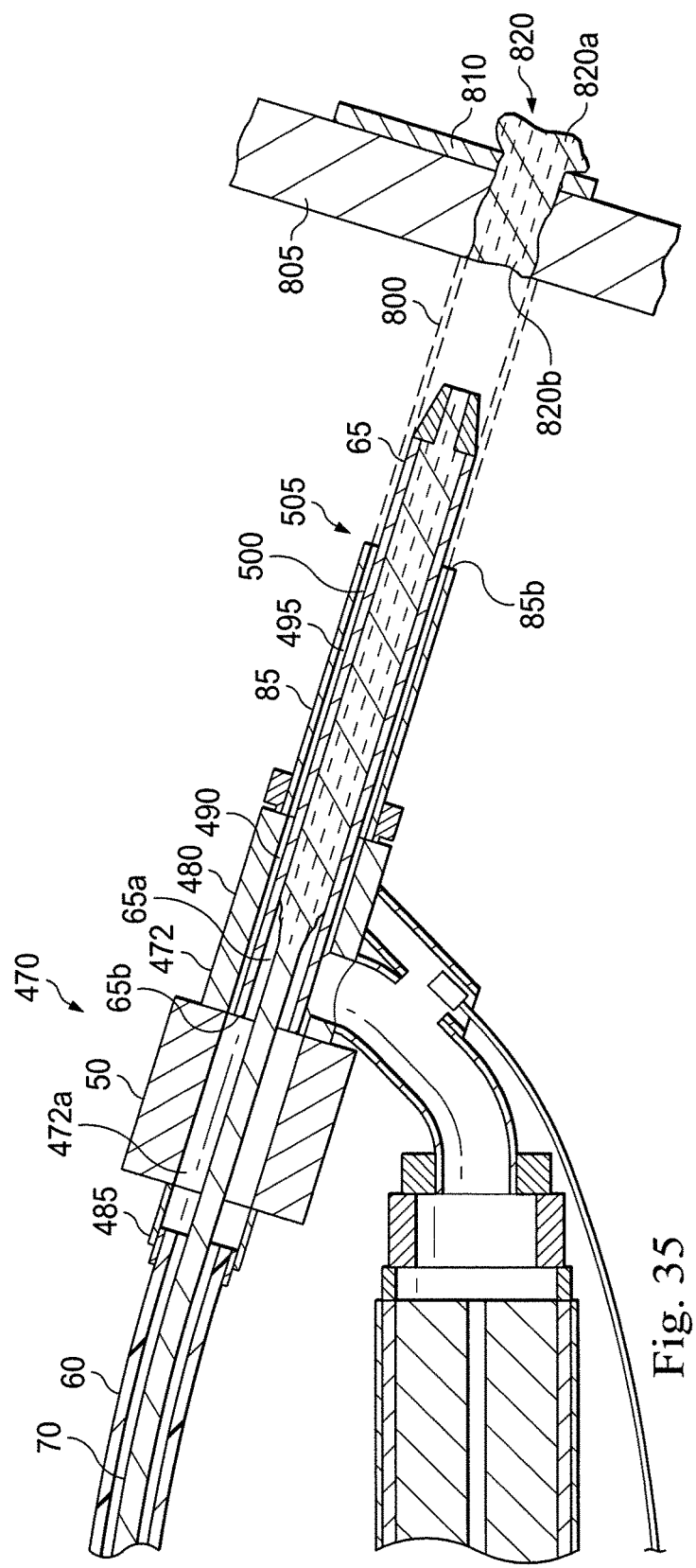
FIG. 35 is a sectional view of a portion of the handheld device of FIG. 19 and the part during yet another step of the method of FIG. 28, according to exemplary embodiment of the present disclosure.

During the step 740, and as illustrated in FIGS. 33-35, the fluidic thermoplastic material exits, or is dispensed from, the tip outlet 65c of the tip 65. Moreover, the heated gas that heats the extruder tip 65 extends in a skirt-shaped gas curtain 800 from the annulus 495 and towards the tip outlet 65c of the tip 65. The skirt-shaped gas curtain 800 is a hollow cylindrical shape, a ring shape, or any shape having a cross-section that corresponds to the annulus 495 and a length. In some embodiments, the skirt-shaped gas curtain 800 surrounds the entire circumference of the tip 65 while in other embodiments, the skirt-shaped gas curtain 800 only surrounds a portion of the circumference of the tip 65. In some embodiments, the skirt-shaped gas curtain 800 protects the thermoplastic material 70 that is exiting or being dispensed from the tip outlet 65c from debris. The system 400 can be operated to attach a first part 805 to a second part 810 by riveting the first part 805 to the second part 810. Specifically, when the extruder tip 65 is heated and the heated gas is exiting the annulus 495 to form the skirt-shaped gas curtain 800, the heated skirt-shaped gas curtain 800 contacts a first surface 805a of the first part 805 to heat a portion of the first part 805. The heated extruder tip 65 may also then contact the first surface 805a of the part 805. When the first part 805 is composed of a thermoplastic material, the heated extruder tip 65 and the heated skirt-shaped gas curtain 800 melt or transform the previously hardened thermoplastic material of the part 805 to a fluidic or at least softer state. When pressure is applied to the tip 65 in a first direction towards the part 805, the tip 65 punctures or is inserted through a thickness 805b of the first part that is defined between the first surface 805a and an opposing a second surface 805c of the part 805 to form a passage 815 through the part 805. The tip 65 continues to extend in the first direction, while the tip 65 is accommodated in the passage 815 of the part 805, through an opening 810a of the part 810. However, if no opening 810a exists in the part 810, then the tip 65 can heat and puncture the part 810 in a similar manner to the part 805. Regardless, the tip 65 continues to extend towards and through the part 805 until the first surface 805a contacts the shoulder 505 formed in the part by the end surface 85b of the nozzle 85, such that the shoulder 505 stops the forward movement of the extruder tip 65 in the first direction relative to the part 805. After a portion of the tip 65 extends through the parts 805 and 810, the dispenser 25 activates the filament wheel 25a such that the fluidic thermoplastic material 70 begins to exit the tip outlet 65c. However, in some embodiments, the filament wheel 25a of the dispenser is conveying the thermoplastic material 70 at a rate such that fluidic thermoplastic material 70 exits the opening of the tip outlet 65c prior to and during the puncturing of the parts 805 and 810. Regardless, the tip 65 is then moved in a second direction that is opposite the first direction to remove the tip 65 from the parts 805 and 810 while fluidic thermoplastic material 70 exits the tip outlet 65c. As illustrated in FIGS. 34-35, this results in the fluidic thermoplastic material 70 being accommodated in the passage 815 of the part 805 and the opening 810a of the part 810. The fluidic thermoplastic material 70 applied to the parts 805 and 810 form a connector 820. In some embodiments, the connector 820 has a head portion 820a that extends beyond the opening 810a and the passage 815 and that is integral with a body portion 820b, which extends within one of the opening 810a and the passage 815. The solidification of this fluidic thermoplastic material, or the connector 820, rivets the part 805 to the part 810. The cooling of the connector 820 solidifies the fluidic thermoplastic material to form a rivet-like coupling of the part 805 to the part 810. In some embodiments, the part 810 is the connector tab 225 and the opening 810a is one of the holes 255 or the part 810 is the attachment part 270 and the opening 810a is one of the holes 285.

Figure 36:
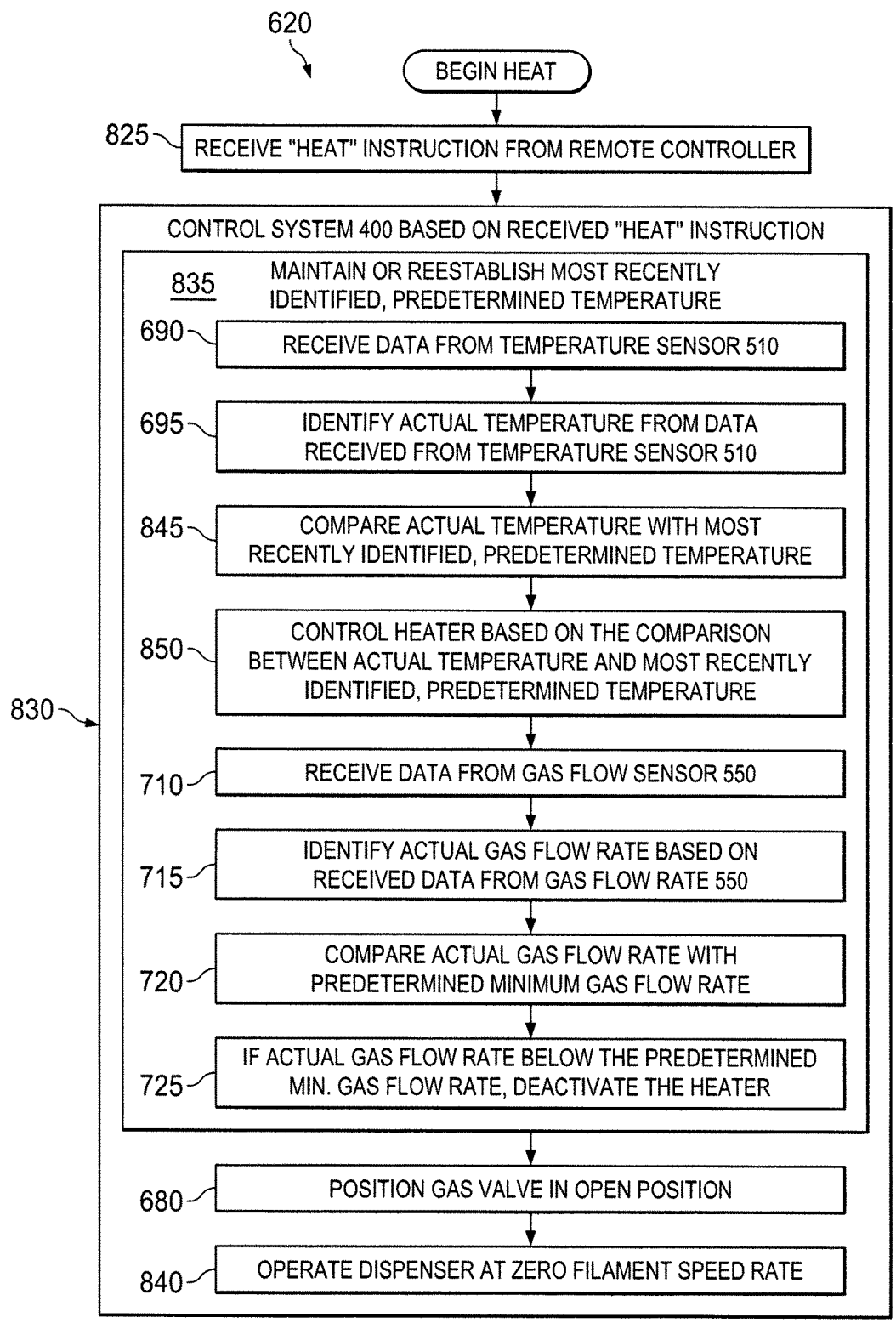
FIG. 36 is a flow chart illustration of yet another step of the method of FIG. 28, according to an exemplary embodiment of the present disclosure.

Referring back to FIGS. 28 and 36, the step 620 includes heating a part using the repair system 400. The step 620 includes receiving a "heat" instruction at step 825, and controlling the system 400 based on the received "heat" instruction at step 830.

The step 825 of receiving the heat instruction is substantially similar to the step 635 except that instead of receiving the "unload" instruction, the "heat" instruction is received. Thus, details relating to the step 825 will not be repeated here.

The step 830 of the controller 20 controlling the system 400 based on the heat instruction includes maintaining or reestablishing the most recently identified, predetermined temperature at step 835, the step 680, and deactivating or maintain the filament wheel 25a such that no filament is conveyed towards the tip 65 at step 840.

The step of reaching and/or maintaining the most recently identified, predetermined temperature at step 835 is substantially similar to the step 765 except that instead of the identified, predetermined temperature being used in the step 765, the most recently identified, predetermined temperature is reached and/or maintained at the step 835. That is, the controller 20 determines the most recently identified, predetermined temperature, which is then used as the input for the feedback control loop. The step 835 includes the steps 690, 695, 710, 715, 720, and 725; comparing the actual temperature with the most recently identified, predetermined second temperature at step 845; and controlling the heater 40 based on the comparison between the actual temperature of the gas and the most recently identified, predetermined second temperature at step 850. As the steps 845 and 850 are substantially similar to the steps 775 and 780 except for the differences noted above, additional details regarding the steps 845 and 850 will not be provided here.

At the step 840, the filament wheel 25a is operated at a speed and rotation such that no or very little filament is conveyed to the inlet 65b of the tip 65. The speed may be zero mm/s or a negligible speed.

During the step 620, the skirt-shaped gas curtain 800 is heated and extends from the annulus 495 in the direction towards the tip outlet 65c. The heated skirt-shaped gas curtain 800 heats the part 810 and/or protects a portion of the part 810 from debris, such as airborne debris. The protected portion of the part 810 corresponds to at least a cross-sectional area of the skirt-shaped gas curtain 800.

Figure 37:
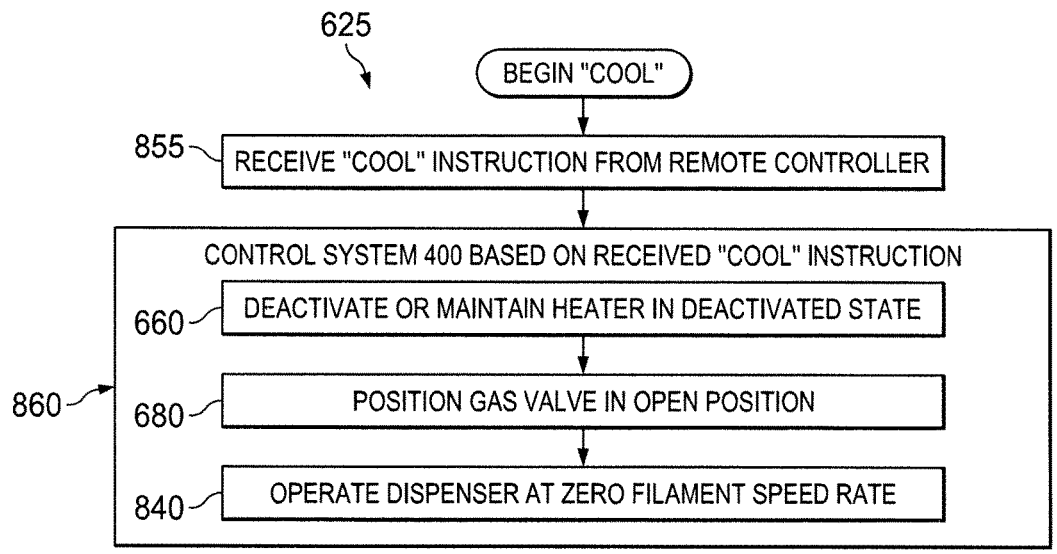
FIG. 37 is a flow chart illustration of yet another step of the method of FIG. 28, according to an exemplary embodiment of the present disclosure.

Referring back to FIGS. 28 and 37, the step 625 includes cooling a part using the repair system 400. The step 620 includes receiving a "cool" instruction at step 855, and controlling the system 400 based on the received "cool" instruction at step 860.

The step 855 of receiving the cool instruction is substantially similar to the step 635 except that instead of receiving the "unload" instruction, the "cool" instruction is received. Thus, details relating to the step 855 will not be repeated here.

The step 860 of the controller 20 controlling the system 400 based on the cool instruction includes the steps 660, 680, and 840. Details relating to these steps will not be repeated here. In one embodiment, the steps 660, 680, and 840 occur simultaneously such that the skirt-shaped curtain of gas is unheated. In some embodiments, cooling the first part 805 and the connector 820 using the unheated skirt-shaped curtain of gas protects the parts 805, 810, and the connector 820 from airborne or non-airborne debris.

Figure 38:
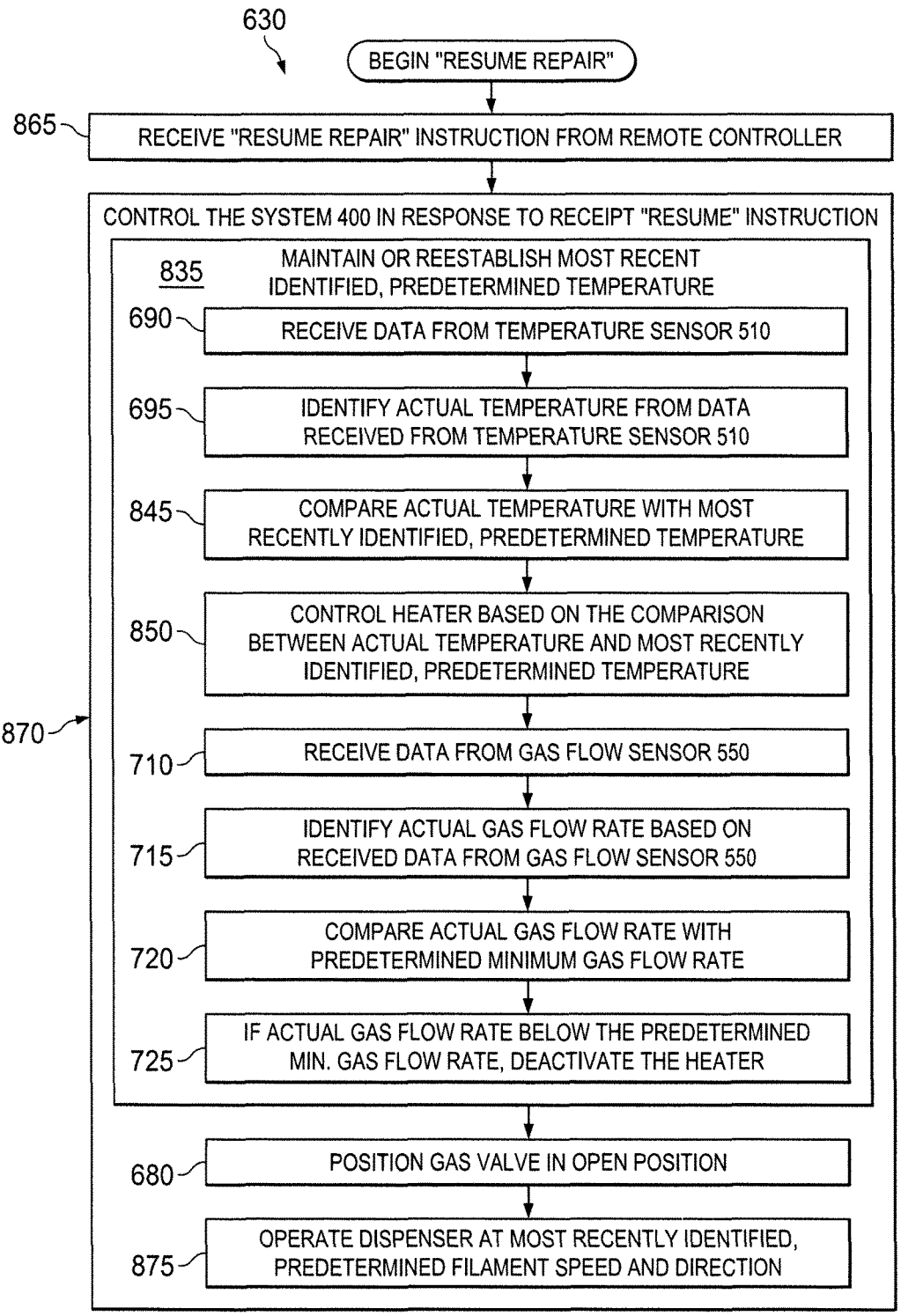
FIG. 38 is a flow chart illustration of yet another step of the method of FIG. 28, according to an exemplary embodiment of the present disclosure.

Referring back to FIG. 28 and to FIG. 38, the step 630 includes resuming a repair using the repair system 400. The step 630 includes receiving a "resume repair" instruction at step 865, and controlling the system 400 based on the received "resume repair" instruction at step 870.

The step 865 of receiving the "resume repair" instruction is substantially similar to the step 635 except that instead of receiving the "unload" instruction, the "resume repair" instruction is received. Thus, details relating to the step 865 will not be repeated here.

The step 870 of the controller 20 controlling the system 400 based on the resume repair instruction includes the steps 835 and 680, and operating the dispenser 25 at the most recently identified, predetermined filament speed and direction at step 875. Details relating to the steps 835 and 680 will not be repeated here. The step 875 of operating the dispenser 25 at the most recently identified, predetermined filament speed and direction is substantially similar to the step 770 except that instead of operating the dispenser at the identified, predetermined filament speed rate and direction that was identified at the step 735, the controller 20 determines the most recently identified, predetermined filament speed and direction and then operates the dispenser 25 using the most recently identified predetermined filament speed and direction.

The system 400 can be used in the method 100 and can be used similarly to the system 10. The system 400 may be altered in a variety of ways. In some embodiments, the gas flow is increased as the feed rate increases while the controller 20 maintains a predetermined temperature. In an exemplary embodiment, the system 400 also includes a second dispenser operably coupled to each of the spool 77 and the controller 20 such that when the controller 20 conveys the filament in the first direction, the controller 20 also controls the second dispenser to rotate in a similar direction to "rewind" the filament onto the spool 77. Moreover and in some embodiments, during the step 650, the dispenser 25 is not operated. Instead, the second dispenser is operated to rotate the spool 77 thereby conveying the filament at the first filament feed rate in the first direction. In other embodiments, the system 400 also includes a second temperature sensor that senses or monitors a temperature of the tip 65. In other exemplary embodiments, the system 400 has Wi-Fi capability and transmits data relating to the use of the system 400 to a remote computer system over a network, such as the internet. In some embodiments, the regulator 30 is a gated solenoid that controls the pressure and flow of the gas from the gas source 420. In an exemplary embodiment, the thermoplastic material 70 is the filament while in a solid state and is a fluidic thermoplastic material once heated to or above a melt temperature or melting point. In some embodiments, a repair that is needed is a repair that is recommended or otherwise selected by a user or an automotive specialist.

Use of the system 400 and/or the method 600 allows for a consistent application of the fluidic thermoplastic material 70 to the part, such as the part 75, 805, or 810. Use of the system 400 and/or the method 600 avoids a trial-and-error approach by the user or an automotive specialist to heat the thermoplastic material 70 to the predetermined temperature and maintain that temperature as necessary during the repair of the part, such as the part 75, 805, or 810. Through use of the remote controller 415, the automotive specialist can easily stop, start, or otherwise control the flow of fluidic thermoplastic material 70 dispensed from the extruder tip 65. The skirt-shaped curtain of gas 800 prevents or at least discourages exposing the fluidic thermoplastic material 70 and/or the parts being repaired to oxygen or other impurities. Reducing or avoiding the exposure of the fluidic thermoplastic material 70 to the oxygen or other impurities strengths a bond formed between the fluidic thermoplastic material 70 and the parts being repaired.

Figure 39:
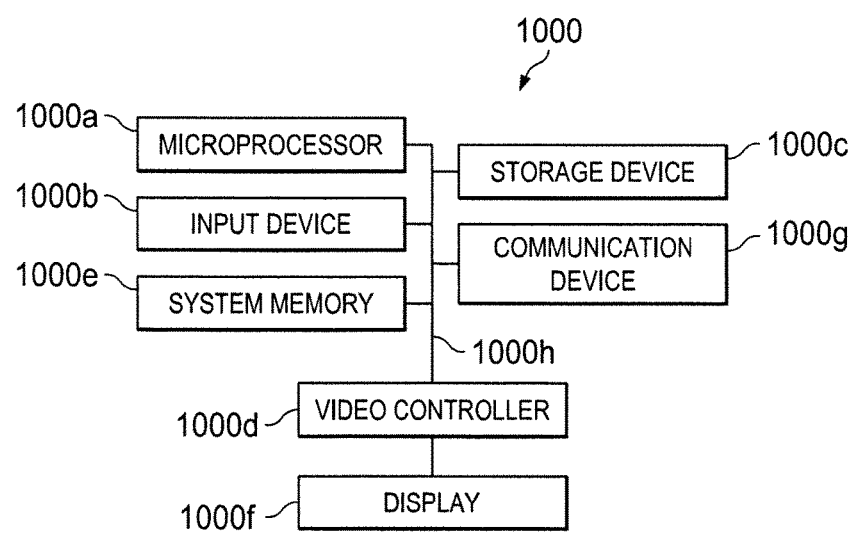
FIG. 39 is a diagrammatic illustration of a node for implementing one or more exemplary embodiments of the present disclosure, according to an exemplary embodiment.

In one or more exemplary embodiments, as illustrated in FIG. 39 with continuing reference to FIGS. 1, 2, 3A, 3B, 4-30, 31A, 31B, and 32-38, an illustrative computing device 1000 for implementing one or more embodiments of one or more of the above-described networks, elements, methods and/or steps, and/or any combination thereof, is depicted. The computing device 1000 includes a microprocessor 1000a, an input device 1000b, a storage device 1000c, a video controller 1000d, a system memory 1000e, a display 1000f, and a communication device 1000g all interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer-readable medium that may contain executable instructions. In several exemplary embodiments, the communication device 1000g may include a modem, network card, or any other device to enable the computing device to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, the one or more computers 305, the printer 310, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 305, and the printer 310 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a non-transitory computer readable medium may be executed by one or more processors to cause the one or more processors to carry out or implement in whole or in part the above-described operation of each of the above-described exemplary embodiments of the systems 10 and 400, the methods 100 and 600, and/or any combination thereof. In several exemplary embodiments, such a processor may include the microprocessor 1000*a*, one or more components of the controller 20, the controller 45, the processor 20*a*, and/or any combination thereof, and such a non-transitory computer readable medium may include the storage device 1000*c*, the system memory 1000*e*, one or more components of the controller 45, one or more components of the controller 20 such as, for example, the computer readable medium 20*b*, and/or may be distributed among one or more components of the system 10. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A repair system has been described that includes a hand-held device including: a first extruder tip having an interior passageway extending between an inlet and a tip outlet, wherein the inlet is configured to receive a solid thermoplastic material and the tip outlet is configured to dispense a fluidic thermoplastic material; a nozzle surrounding the first extruder tip to form an annulus between an interior surface of the nozzle and an exterior surface of the first extruder tip; and a heater that is configured to heat the interior passageway of the first extruder tip such that the solid thermoplastic material becomes the fluidic thermoplastic material. In an exemplary embodiment, the nozzle is a tubular forming a passageway and has an end surface; wherein at least a portion of the first extruder tip extends within the passageway of the nozzle and another portion of the first extruder tip extends beyond the end surface of the nozzle such that the tip outlet is spaced from the end surface of the nozzle; wherein the exterior surface of the first extruder tip and the end surface of the nozzle define a shoulder; and wherein the end surface of the nozzle is radially spaced from the exterior surface of the first extruder tip by the annulus. In an exemplary embodiment, the system further includes a gas source in fluid communication with the annulus such that a skirt-shaped curtain of gas extends from the annulus and in a direction towards the tip outlet of the first extruder tip. In an exemplary embodiment, the skirt-shaped curtain of gas surrounds the fluidic thermoplastic material as it is dispensed from the tip outlet of the first extruder tip to protect the fluidic thermoplastic material from debris. In an exemplary embodiment, the heater is configured to heat a gas to heat the interior passageway of the first extruder tip; wherein the repair system further includes: a controller that is in communication with the heater and that is configured to identify a predetermined reference temperature; and a temperature sensor that is in communication with the controller and that is configured to sense an actual temperature of the heated gas; and wherein the controller, the temperature sensor, and the heater form a temperature feedback control loop that uses the predetermined reference temperature as an input for the feedback control loop and the actual temperature as a feedback for the feedback control loop. In an exemplary embodiment, the system further includes a dispenser that is in communication with the controller and that is configured to convey the solid thermoplastic material to the inlet of the first extruder tip at a predetermined feed rate; wherein the controller includes: a processor; and a computer readable medium operably coupled to the processor, the computer readable medium including a plurality of instructions stored therein and executable by at least the processor, the plurality of instructions including: instructions for receiving one or more input parameters; instructions for selecting the predetermined reference temperature to which the solid thermoplastic material is heated based on the one or more input parameters; instructions for selecting the predetermined feed rate at which the solid thermoplastic material is to be conveyed to the inlet of the first extruder tip based on the one or more input parameters; instructions for activating the heater to heat the solid thermoplastic material to the predetermined reference temperature; and instructions for activating the dispenser to convey the solid thermoplastic material to the inlet of the first extruder tip at the predetermined feed rate. In an exemplary embodiment, the one or more input parameters includes a first input parameter indicating material(s) of which the solid thermoplastic material is/are composed. In an exemplary embodiment, the one or more input parameters includes a second input parameter indicating a shape of the tip outlet of the first extruder tip. In an exemplary embodiment, the one or more input parameters includes a third input parameter indicating a type of repair to be performed by the repair system. In an exemplary embodiment, the handheld device includes a housing to which the first extruder tip is detachably coupled; wherein the repair system further includes a second extruder tip configured to be detachably coupled to the housing of the handheld device; and wherein the second extruder tip is different from the first from the first extruder tip.

A method of repairing a first automotive part has been described and includes providing a connector tab; and attaching the connector tab to the first automotive part, including applying a fluidic thermoplastic material to the connector tab and/or the first automotive part; wherein the connector tab includes: a retainer portion sized to attach to the first automotive part, wherein the retainer portion has a plurality of holes formed therethrough, and wherein the plurality of holes is configured to receive the fluidic thermoplastic material to secure the retainer portion to the first automotive part; and a coupler portion defining a shape corresponding to a portion of the first automotive part, wherein the coupler portion forms a coupler, which is configured to operably engage another coupler of a second automotive part. In an exemplary embodiment, at least a portion of the connector tab is manufactured by using an additive manufacturing process. In an exemplary embodiment, a shoulder is formed within a body of the connector tab at an intersection of the retainer portion and the coupler portion. In an exemplary embodiment, the method also includes engaging the shoulder of the connector tab with a corresponding edge of the first automotive part to position the connector tab relative to the first automotive part. In an exemplary embodiment, the coupler portion has a hole formed therethrough and the hole is the coupler. In an exemplary embodiment, the method also includes printing the connector tab. In an exemplary embodiment, the method also includes allowing the fluidic thermoplastic material that is applied to the connector tab and/or the first automotive part to cool and thereby transform the first automotive part to a repaired first automotive part; and coupling the coupler of the repaired first automotive part to the another coupler of the second automotive part. In an exemplary embodiment, the fluidic thermoplastic material is applied using an automotive repair system; and the automotive repair system includes: a handheld device including: a conduit configured to convey a solid thermoplastic material; a heater configured to apply heat to the solid thermoplastic material such that the solid thermoplastic material becomes the fluidic thermoplastic material; and an extruder tip fluidically coupled to the conduit and configured to apply the fluidic thermoplastic material to the first automotive part; a controller in communication with the heater; and a dispenser configured to control a feed rate at which the solid thermoplastic material is conveyed to the extruder tip, wherein the dispenser is in communication with the controller.

A connector tab for repair of a first automotive part has been described and includes a retainer portion sized to attach to the first automotive part, wherein the retainer portion has a plurality of holes formed therethrough, and wherein the plurality of holes is configured to receive a thermoplastic material to secure the retainer portion to the first automotive part; and a coupler portion defining a shape corresponding to a portion of the first automotive part, wherein the coupler portion forms a coupler, which is configured to operably engage another coupler of a second automotive part. In an exemplary embodiment, at least a portion of the connector tab is manufactured by using an additive manufacturing process. In an exemplary embodiment, a shoulder is formed within a body of the connector tab at an intersection of the retainer portion and the coupler portion. In an exemplary embodiment, the coupler portion has a hole formed therethrough and the hole is the coupler.

A method of repairing a first automotive part has been described and includes determining that one of a first level of repair, a second level of repair, and a third level of repair is needed to repair the first automotive part; if the first level of repair is needed, then: controlling an automotive repair system based on a first set of input parameters; and applying a fluidic thermoplastic material to the first automotive part, wherein the fluidic thermoplastic material is applied using the automotive repair system as controlled based on the first set of input parameters; if the second level of repair is needed, then: controlling the automotive repair system based on a second set of input parameters; and applying the fluidic thermoplastic material to a connector tab and the first automotive part to attach the connector tab to the first automotive part, wherein the fluidic thermoplastic material is applied using the automotive repair system as controlled based on the second set of input parameters; and if the third level of repair is needed, then: identifying a restorable portion of the first automotive part; creating an attachment part that includes the restorable portion of the first automotive part and a first retainer portion; controlling the automotive repair system based on a third set of input parameters; and applying the fluidic thermoplastic material to the first retainer portion and the first automotive part to attach the restorable portion to the first automotive part, wherein the fluidic thermoplastic material is applied using the automotive repair system as controlled based on the third set of input parameters. In an exemplary embodiment, each of the first set of input parameters, the second set of input parameters, and the third set of input parameters includes: a first input parameter indicating material(s) of which the fluidic thermoplastic material is composed; and a second input parameter indicating that one of the first level of repair, the second level of repair, and the third level of repair is needed to repair the first automotive part. In an exemplary embodiment, creating the attachment part that includes the restorable portion of the first automotive part and the first retainer portion includes printing the attachment part. In an exemplary embodiment, creating the attachment part that includes the restorable portion of the first automotive part and the first retainer portion includes: accessing, using a computer system, an electronic model of the first automotive part; identifying the restorable portion of the electronic model of the first automotive part; determining that the restorable portion of the electronic model of the first automotive part satisfies one or more business rules; isolating, using the computer system, the restorable portion of the electronic model for printing; adding, using the computer system, a first retainer portion model to the restorable portion of the electronic model thereby creating a model of the attachment part; and printing the attachment part based on the model of the attachment part. In an exemplary embodiment, the automotive repair system includes: a handheld device including: a conduit configured to convey a solid thermoplastic material; a heater configured to apply heat to the solid thermoplastic material such that the solid thermoplastic material becomes the fluidic thermoplastic material; and an extruder tip fluidically coupled to the conduit and configured to apply the fluidic thermoplastic material to the first automotive part; a controller in communication with the heater; and a dispenser configured to control a feed rate at which the solid thermoplastic material is conveyed to the extruder tip, wherein the dispenser is in communication with the controller. In an exemplary embodiment, the first set of input parameters includes: a first input parameter indicating the solid thermoplastic material is either one of a polypropylene material and a polyethylene material; and a second input parameter indicating that the first level of repair is needed; wherein controlling the automotive repair system based on the first set of input parameters includes: conveying the solid fluidic thermoplastic material through the conduit and to extruder tip; heating the solid thermoplastic material until the solid thermoplastic material becomes the fluidic thermoplastic material; and applying the fluidic thermoplastic material to the first automotive part such that the fluidic thermoplastic material cools to become a hardened material, wherein the hardened material replaces a missing portion of the first automotive part. In an exemplary embodiment, the connector tab includes: a second retainer portion sized to attach to the first automotive part, wherein the second retainer portion has a plurality of holes formed therethrough, and wherein the plurality of holes is configured to receive the fluidic thermoplastic material to secure the second retainer portion to the first automotive part; and a coupler portion defining a shape corresponding to a portion of the first automotive part, wherein the coupler portion forms a coupler, which is configured to operably engage another coupler of a second automotive part. In an exemplary embodiment, at least a portion of the connector tab is manufactured by using an additive manufacturing process. In an exemplary embodiment, a shoulder is formed within a body of the connector tab at an intersection of the second retainer portion and the coupler portion. In an exemplary embodiment, the method also includes engaging the shoulder of the connector tab with a corresponding edge of the first automotive part to position the connector tab relative to the first automotive part.

A method of printing an attachment part customized for a damaged automotive part has been described and includes accessing, using a computer system, an electronic model of the damaged automotive part; identifying a restorable portion of the electronic model of the damaged automotive part; isolating, using the computer system, the restorable portion of the electronic model for printing; adding, using the computer system, a retainer portion model to the restorable portion of the electronic model thereby creating a model of the attachment part customized for the damaged automotive part; and printing the attachment part based on the model of the attachment part, the printed attachment part including a printed restorable portion and a printed retainer portion connected thereto. In an exemplary embodiment, the printed retainer portion of the printed attachment part is sized to attach to the damaged automotive part, wherein the printed retainer portion of the printed attachment part has a plurality of holes formed therethrough, and wherein the plurality of holes is configured to receive a fluidic thermoplastic material to secure the printed retainer portion to the damaged automotive part. In an exemplary embodiment, the method also includes determining whether the restorable portion of the electronic model of the damaged automotive part satisfies one or more business rules.

A repair system has been described that includes a handheld device including: a first extruder tip having an interior passageway extending between an inlet and a tip outlet, wherein the inlet is configured to receive a solid thermoplastic material and the tip outlet is configured to dispense a fluidic thermoplastic material; a nozzle surrounding the first extruder tip to form an annulus between an interior surface of the nozzle and an exterior surface of the first extruder tip; and a heater that is configured to heat the interior passageway of the first extruder tip such that the solid thermoplastic material becomes the fluidic thermoplastic material. In an exemplary embodiment, the nozzle is a tubular forming a passageway and has an end surface; wherein at least a portion of the first extruder tip extends within the passageway of the nozzle and another portion of the first extruder tip extends beyond the end surface of the nozzle such that the tip outlet is spaced from the end surface of the nozzle; wherein the exterior surface of the first extruder tip and the end surface of the nozzle define a shoulder; and wherein the end surface of the nozzle is radially spaced from the exterior surface of the first extruder tip by the annulus. In an exemplary embodiment, the system further includes a gas source in fluid communication with the annulus such that a skirt-shaped curtain of gas extends from the annulus and in a direction towards the tip outlet of the first extruder tip. In an exemplary embodiment, the skirt-shaped curtain of gas surrounds the fluidic thermoplastic material as it is dispensed from the tip outlet of the first extruder tip to protect the fluidic thermoplastic material from debris. In an exemplary embodiment, the heater is configured to heat a gas to heat the interior passageway of the first extruder tip; wherein the repair system further includes: a controller that is in communication with the heater and that is configured to identify a predetermined reference temperature; and a temperature sensor that is in communication with the controller and that is configured to sense an actual temperature of the heated gas; and wherein the controller, the temperature sensor, and the heater form a temperature feedback control loop that uses the predetermined reference temperature as an input for the feedback control loop and the actual temperature as a feedback for the feedback control loop. In an exemplary embodiment, the system further includes a dispenser that is in communication with the controller and that is configured to convey the solid thermoplastic material to the inlet of the first extruder tip at a predetermined feed rate; wherein the controller includes: a processor; and a computer readable medium operably coupled to the processor, the computer readable medium including a plurality of instructions stored therein and executable by at least the processor, the plurality of instructions including: instructions for receiving one or more input parameters; instructions for selecting the predetermined reference temperature to which the solid thermoplastic material is heated based on the one or more input parameters; instructions for selecting the predetermined feed rate at which the solid thermoplastic material is to be conveyed to the inlet of the first extruder tip based on the one or more input parameters; instructions for activating the heater to heat the solid thermoplastic material to the predetermined reference temperature; and instructions for activating the dispenser to convey the solid thermoplastic material to the inlet of the first extruder tip at the predetermined feed rate. In an exemplary embodiment, the one or more input parameters includes a first input parameter indicating material(s) of which the solid thermoplastic material is/are composed. In an exemplary embodiment, the one or more input parameters includes a second input parameter indicating a shape of the tip outlet of the first extruder tip. In an exemplary embodiment, the one or more input parameters includes a third input parameter indicating a type of repair to be performed by the repair system. In an exemplary embodiment, the handheld device includes a housing to which the first extruder tip is detachably coupled; wherein the repair system further includes a second extruder tip configured to be detachably coupled to the housing of the handheld device; and wherein the second extruder tip is different from the first from the first extruder tip.

A repair apparatus has been described that includes a non-transitory computer readable medium; and a plurality of instructions stored on the non-transitory computer readable medium and executable by one or more processors, the plurality of instructions including: instructions that cause the one or more processors to receive one or more repair setting inputs; wherein the one or more repair setting inputs includes one or more of the following: a first repair setting indicating material(s) of which a thermoplastic material is/are composed; a second repair setting indicating a shape of a tip outlet of a extruder tip of a handheld device; and a third repair setting indicating a type of repair to be performed using the handheld device; instructions that cause the one or more processors, during or after receiving the one or more repair setting inputs, to: identify a predetermined temperature to which the thermoplastic material is heated based on the one or more repair setting inputs; identify a first predetermined feed rate at which the thermoplastic material is to be conveyed in a first direction that is towards the extruder tip of the handheld device, wherein the extruder tip is configured to apply the thermoplastic material to a part, and wherein the first predetermined feed rate is based on the one or more repair setting inputs; activate a heater of the handheld device that is in communication with the one or more processors to heat the thermoplastic material to the predetermined temperature; and activate a dispenser that is in communication with the one or more processors to convey, at the first predetermined feed rate, the thermoplastic material in the first direction. In an exemplary embodiment, the instructions that cause the one or more processors to activate the heater to heat the thermoplastic material to the predetermined temperature includes instructions that cause the one or more processors to: receive data from a temperature sensor; determine an actual temperature from the data received from the temperature sensor; determine a temperature difference between the actual temperature and the predetermined temperature; and control the heater based on the temperature difference between the actual temperature and the predetermined temperature. In an exemplary embodiment, the plurality of instructions stored on the non-transitory computer readable medium and executable by one or more processors, further includes instructions to: receive a begin instruction from a pedal controller that is in communication with the processor; and determine if the actual temperature exceeds a minimum predetermined temperature; and wherein the instructions that cause the one or more processors to activate the dispenser to convey the thermoplastic material in the direction towards the extruder tip and at the first predetermined feed rate are executed during or after: the one or more processors determine that the actual temperature exceeds the minimum predetermined temperature; and the one or more processors receives the begin instruction from the pedal controller. In an exemplary embodiment, the plurality of instructions stored on the non-transitory computer readable medium and executable by one or more processors, further includes instructions to: receive gas flow data from a gas flow sensor located in the handheld device; identify an actual gas flow rate based on the received data from the gas flow sensor; determine if the actual gas flow rate is less than a predetermined minimum gas flow rate; and deactivate the heater if the actual gas flow rate is less than the predetermined minimum gas flow rate. In an exemplary embodiment, the instructions further include: instructions that cause the one or more processors to receive an unload instruction; instructions that cause the one or more processors, during or after receiving the unload instruction, to simultaneously: maintain the heater in a deactivated state; and activate the dispenser to convey, at a second predetermined feed rate that is different from the first predetermined feed rate, the thermoplastic material in a second direction that is opposite to the first direction. In an exemplary embodiment, the instructions further include: instructions that cause the one or more processors to receive a reload instruction; instructions that cause the one or more processors, during or after receiving the reload instruction, to: receive gas flow data from a gas flow sensor located in the handheld device; identify an actual gas flow rate based on the received data from the gas flow sensor; determine if the actual gas flow rate is equal to or greater than a predetermined minimum gas flow rate; activate the heater upon determination that the actual gas flow rate is equal to or greater than the predetermined minimum gas flow rate; receive data from a temperature sensor; determine an actual temperature from the data received from the temperature sensor; determine a temperature difference between the actual temperature and the predetermined temperature; control the heater based on the temperature difference between the actual temperature and the predetermined temperature; and activate the dispenser to convey, at a third predetermined feed rate that is different from the first predetermined feed rate, the thermoplastic material in the first direction. In an exemplary embodiment, the instructions further include: instructions that cause the one or more processors to receive a cool instruction; instructions that cause the one or more processors, during or after receiving the cool instruction, to: maintain the heater in a deactivated state such that the heater is not heating the thermoplastic material; place a gas source in fluid communication with the heater; and maintain the dispenser in a deactivated state such that the thermoplastic material is not being conveyed in the first direction. In an exemplary embodiment, the instructions further include: instructions that cause the one or more processors to receive a heat instruction; instructions that cause the one or more processors, during or after receiving the heat instruction, to: maintain the dispenser in a deactivated state such that the thermoplastic material is not being conveyed in the first direction: place a gas source in fluid communication with the heater; receive gas flow data from a gas flow sensor located in the handheld device; identify an actual gas flow rate based on the received data from the gas flow sensor; determine if the actual gas flow rate is equal to or greater than a predetermined minimum gas flow rate; activate the heater upon determination that the actual gas flow rate is equal to or greater than the predetermined minimum gas flow rate; receive data from a temperature sensor; determine an actual temperature from the data received from the temperature sensor; determine a temperature difference between the actual temperature and the predetermined temperature; and control the heater based on the temperature difference between the actual temperature and the predetermined temperature.

A method of operating a repair system has been described that includes providing a handheld device including an extruder tip having an interior passageway extending between an inlet and a tip outlet, conveying a solid thermoplastic material into the inlet and towards the tip outlet; heating the solid thermoplastic material as the solid thermoplastic material is conveyed through the interior passageway such that a fluidic thermoplastic material exits the tip outlet of the extruder tip; and surrounding the tip outlet of the extruder tip with a skirt-shaped curtain of gas. In an exemplary embodiment, the method further includes positioning the extruder tip within a passageway of a tubular nozzle to form an annulus defined by the exterior surface of the extruder tip and an interior surface of the nozzle. In an exemplary embodiment, surrounding the tip outlet of the extruder tip with the skirt-shaped curtain of gas includes forcing a gas through the annulus in a direction away from the inlet and towards the tip outlet of the extruder tip. In an exemplary embodiment, positioning the extruder tip within the passageway of the tubular nozzle to form the annulus further includes positioning the extruder tip longitudinally relative to the nozzle such that the tip outlet of the extruder tip extends beyond an end surface of the nozzle by a first offset dimension. In an exemplary embodiment, the exterior surface of the extruder tip and the end surface of the nozzle define a shoulder; and wherein the end surface of the nozzle is radially spaced from the exterior surface of the extruder tip by the annulus. In an exemplary embodiment, heating the thermoplastic material as the thermoplastic material is conveyed through the passageway includes passing a heated gas through the annulus. In an exemplary embodiment, the skirt-shaped curtain of gas is when a heater located in the handheld device is activated; wherein the first offset dimension defined between the tip outlet the extruder tip and the end surface of the nozzle is greater than a thickness of a first part; wherein the thickness of the first part is a dimension defined by a first surface and an opposing second surface of the first part; and wherein the method further includes coupling the first part to a second part that has an opening formed through the second part; wherein coupling the first part to the second part includes: inserting, in a first direction, the extruder tip through the first surface and the opposing second surface of the first part to form a passageway in the first part; inserting, in the first direction, the extruder tip through the opening of the second part while the extruder tip extends within the passageway of the first part; and conveying the fluidic thermoplastic material through the tip outlet of the extruder tip while moving the extruder tip in a second direction that is opposite the first direction such that the fluidic thermoplastic material is accommodated in the opening of the second part and the passageway of the first part. In an exemplary embodiment, the skirt-shaped curtain of gas is unheated when the heater located in the handheld device is in a deactivated state; wherein the method further includes: maintaining the heater in the deactivated state; and cooling the first part and the fluidic thermoplastic material accommodated in the opening of the second part and the passageway of the first part using the unheated skirt-shaped curtain of gas. In an exemplary embodiment, cooling the part and the fluidic thermoplastic material accommodated in the opening of the second part and the passageway of the first part using the unheated skirt-shaped curtain of gas protects the fluidic thermoplastic material that is accommodated in the opening of the second part and the passageway of the first part from debris In an exemplary embodiment, the method also includes contacting the shoulder with the first surface of the first part to stop the insertion of the extruder tip through the first surface and the opposing second surface of the first part in the first direction. In an exemplary embodiment, cooling the first part and the fluidic thermoplastic material that is accommodated in the opening of the second part and the passageway of the first part using the unheated skirt-shaped curtain of gas rivets the first part to the second part to couple the first part to the second part. In an exemplary embodiment, the solid thermoplastic material is conveyed, by a dispenser, into the inlet of the extruder tip towards tip outlet of the extruder tip at a predetermined feed rate; wherein, as the solid thermoplastic material is conveyed through the passageway, the solid thermoplastic material is heated to a predetermined temperature such that the solid thermoplastic material becomes the fluidic thermoplastic material, using a heater that forms a portion of the handheld device; wherein the method further includes: receiving, using a controller that forms a portion of the repair system and that is in communication with the heater and the dispenser, one or more repair setting inputs; identifying, using the controller and based on the one or more repair setting inputs, the predetermined feed rate and the predetermined temperature; controlling, using the controller, the heater to heat the thermoplastic material to the predetermined temperature; and controlling, using the controller, the dispenser to feed the thermoplastic material at the predetermined feed rate.

A repair system has been described that includes a handheld device including: a first extruder tip having an interior passageway extending between an inlet and a tip outlet, wherein the inlet is configured to receive a solid thermoplastic material and the tip outlet is configured to dispense a fluidic thermoplastic material; a nozzle surrounding the first extruder tip to form an annulus between an interior surface of the nozzle and an exterior surface of the first extruder tip; and a heater that is configured to heat the interior passageway of the first extruder tip such that the solid thermoplastic material becomes the fluidic thermoplastic material. In an exemplary embodiment, the nozzle is a tubular forming a passageway and has an end surface; wherein at least a portion of the first extruder tip extends within the passageway of the nozzle and another portion of the first extruder tip extends beyond the end surface of the nozzle such that the tip outlet is spaced from the end surface of the nozzle; wherein the exterior surface of the first extruder tip and the end surface of the nozzle define a shoulder; and wherein the end surface of the nozzle is radially spaced from the exterior surface of the first extruder tip by the annulus. In an exemplary embodiment, the system further includes a gas source in fluid communication with the annulus such that a skirt-shaped curtain of gas extends from the annulus and in a direction towards the tip outlet of the first extruder tip. In an exemplary embodiment, the skirt-shaped curtain of gas surrounds the fluidic thermoplastic material as it is dispensed from the tip outlet of the first extruder tip to protect the fluidic thermoplastic material from debris. In an exemplary embodiment, the heater is configured to heat a gas to heat the interior passageway of the first extruder tip; wherein the repair system further includes: a controller that is in communication with the heater and that is configured to identify a predetermined reference temperature; and a temperature sensor that is in communication with the controller and that is configured to sense an actual temperature of the heated gas; and wherein the controller, the temperature sensor, and the heater form a temperature feedback control loop that uses the predetermined reference temperature as an input for the feedback control loop and the actual temperature as a feedback for the feedback control loop. In an exemplary embodiment, the system further includes a dispenser that is in communication with the controller and that is configured to convey the solid thermoplastic material to the inlet of the first extruder tip at a predetermined feed rate; wherein the controller includes: a processor; and a computer readable medium operably coupled to the processor, the computer readable medium including a plurality of instructions stored therein and executable by at least the processor, the plurality of instructions including: instructions for receiving one or more input parameters; instructions for selecting the predetermined reference temperature to which the solid thermoplastic material is heated based on the one or more input parameters; instructions for selecting the predetermined feed rate at which the solid thermoplastic material is to be conveyed to the inlet of the first extruder tip based on the one or more input parameters; instructions for activating the heater to heat the solid thermoplastic material to the predetermined reference temperature; and instructions for activating the dispenser to convey the solid thermoplastic material to the inlet of the first extruder tip at the predetermined feed rate. In an exemplary embodiment, the one or more input parameters includes a first input parameter indicating material(s) of which the solid thermoplastic material is/are composed. In an exemplary embodiment, the one or more input parameters includes a second input parameter indicating a shape of the tip outlet of the first extruder tip. In an exemplary embodiment, the one or more input parameters includes a third input parameter indicating a type of repair to be performed by the repair system. In an exemplary embodiment, the handheld device includes a housing to which the first extruder tip is detachably coupled; wherein the repair system further includes a second extruder tip configured to be detachably coupled to the housing of the handheld device; and wherein the second extruder tip is different from the first from the first extruder tip.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

What is claimed is:

1. A repair system, comprising:
   a handheld device comprising:
      a head portion comprising:
         a first housing having a first interior passageway;
         a first extruder tip having a second interior passageway extending between an inlet and a tip outlet, wherein the inlet is configured to receive a solid thermoplastic material and the tip outlet is configured to dispense a fluidic thermoplastic material; wherein at least a portion of the first extruder tip extends within the first interior passageway; and
         a nozzle surrounding the first extruder tip to form an annulus between an interior surface of the nozzle and an exterior surface of the first extruder tip;
      a body portion spaced from the head portion, wherein the body portion comprises:
         a second housing having a third interior passageway; and
         a heater that at least partially extends within the third interior passageway and that is configured to heat a gas within the third interior passageway; and
      a conduit extending between the head portion and the body portion; wherein the conduit is in fluid communication with the third interior passageway, the first interior passageway, and the annulus; and wherein the third interior passageway, the conduit, the first interior passageway, and the annulus are configured such that the heated gas is capable of flowing from the third interior passageway and into the conduit, the first interior passageway, and the annulus to heat the solid thermoplastic material within the first extruder tip.

2. The repair system of claim 1,
   wherein the nozzle is a tubular that defines an end surface;
   wherein at least a portion of the first extruder tip extends within the nozzle and another portion of the first extruder tip extends beyond the end surface of the nozzle such that the tip outlet is spaced from the end surface of the nozzle;
   wherein the exterior surface of the first extruder tip and the end surface of the nozzle define a shoulder; and wherein the end surface of the nozzle is radially spaced from the exterior surface of the first extruder tip by the annulus.

3. The repair system of claim 1, further comprising a gas source in fluid communication with the third interior passageway, the conduit, the first interior passageway, and the annulus such that a skirt-shaped curtain of gas is capable of extending from the annulus and in a direction towards the tip outlet of the first extruder tip.

4. The repair system of claim 3, wherein, the skirt-shaped curtain of gas surrounds the fluidic thermoplastic material as it is dispensed from the tip outlet of the first extruder tip to protect the fluidic thermoplastic material from debris.

5. The repair system of claim 1,
wherein the repair system further comprises:
  a controller that is in communication with the heater and that is configured to identify a predetermined reference temperature; and
  a temperature sensor that is in communication with the controller and that is configured to sense an actual temperature of the heated gas; and
wherein the controller, the temperature sensor, and the heater form a temperature feedback control loop that uses the predetermined reference temperature as an input for the feedback control loop and the actual temperature as a feedback for the feedback control loop.

6. The repair system of claim 1, wherein the first extruder tip is detachably coupled to the first housing; wherein the repair system further comprises a second extruder tip configured to be detachably coupled to the first housing of the handheld device; and wherein the second extruder tip is different from the first extruder tip.

7. The repair system of claim 1, further comprising:
a source of nitrogen gas in fluid communication with the third interior passageway, the conduit, the first interior passageway, and the annulus; and
a gas flow sensor positioned within the third interior passageway.

8. A repair system, comprising:
a handheld device comprising:
  a first extruder tip having an interior passageway extending between an inlet and a tip outlet, wherein the inlet is configured to receive a solid thermoplastic material and the tip outlet is configured to dispense a fluidic thermoplastic material;
  a nozzle surrounding the first extruder tip to form an annulus between an interior surface of the nozzle and an exterior surface of the first extruder tip; and
  a heater that is configured to heat the interior passageway of the first extruder tip such that the solid thermoplastic material becomes the fluidic thermoplastic material;
  wherein the heater is configured to heat a gas to heat the interior passageway of the first extruder tip;
a controller that is in communication with the heater and that is configured to identify a predetermined reference temperature;
a temperature sensor that is in communication with the controller and that is configured to sense an actual temperature of the heated gas;
  wherein the controller, the temperature sensor, and the heater form a temperature feedback control loop that uses the predetermined reference temperature as an input for the feedback control loop and the actual temperature as a feedback for the feedback control loop; and a dispenser that is in communication with the controller and that is configured to convey the solid thermoplastic material to the inlet of the first extruder tip at a predetermined feed rate;
wherein the controller comprises:
  a processor; and
  a computer readable medium operably coupled to the processor, the computer readable medium comprising a plurality of instructions stored therein and executable by at least the processor, the plurality of instructions comprising:
    instructions for receiving one or more input parameters;
    instructions for selecting the predetermined reference temperature to which the solid thermoplastic material is heated based on the one or more input parameters;
    instructions for selecting the predetermined feed rate at which the solid thermoplastic material is to be conveyed to the inlet of the first extruder tip based on the one or more input parameters;
    instructions for activating the heater to heat the solid thermoplastic material to the predetermined reference temperature; and
    instructions for activating the dispenser to convey the solid thermoplastic material to the inlet of the first extruder tip at the predetermined feed rate.

9. The repair system of claim 8, wherein the one or more input parameters comprises a first input parameter indicating material(s) of which the solid thermoplastic material is/are composed.

10. The repair system of claim 9, wherein the one or more input parameters further comprises a second input parameter indicating a shape of the tip outlet of the first extruder tip.

11. The repair system of claim 10, wherein the one or more input parameters further comprises a third input parameter indicating a type of repair to be performed by the repair system.

12. The repair system of claim 9, wherein the one or more input parameters further comprises a third input parameter indicating a type of repair to be performed by the repair system.

13. The repair system of claim 8, wherein the one or more input parameters comprises a second input parameter indicating a shape of the tip outlet of the first extruder tip.

14. The repair system of claim 13, wherein the one or more input parameters further comprises a third input parameter indicating a type of repair to be performed by the repair system.

15. The repair system of claim 8, wherein the one or more input parameters comprises a third input parameter indicating a type of repair to be performed by the repair system.

16. The repair system of claim 8,
wherein the nozzle is a tubular defining an end surface;
wherein at least a portion of the first extruder tip extends within the nozzle and another portion of the first extruder tip extends beyond the end surface of the nozzle such that the tip outlet is spaced from the end surface of the nozzle;
wherein the exterior surface of the first extruder tip and the end surface of the nozzle define a shoulder; and
wherein the end surface of the nozzle is radially spaced from the exterior surface of the first extruder tip by the annulus.

17. The repair system of claim 8, further comprising a gas source in fluid communication with the annulus such that a skirt-shaped curtain of gas is capable of extending from the annulus and in a direction towards the tip outlet of the first extruder tip.

18. The repair system of claim 17, wherein the skirt-shaped curtain of gas surrounds the fluidic thermoplastic material as it is dispensed from the tip outlet of the first extruder tip to protect the fluidic thermoplastic material from debris.

19. The repair system of claim 8, wherein the handheld device comprises a housing to which the first extruder tip is detachably coupled; wherein the repair system further comprises a second extruder tip configured to be detachably coupled to the housing of the handheld device; and wherein the second extruder tip is different from the first extruder tip.

20. A repair apparatus, comprising:
a non-transitory computer readable medium; and
a plurality of instructions stored on the non-transitory computer readable medium and executable by one or more processors, the plurality of instructions comprising:
  instructions that cause the one or more processors to receive one or more repair setting inputs;
    wherein the one or more repair setting inputs comprises one or more of the following:
      a first repair setting indicating material(s) of which a thermoplastic material is/are composed;
      a second repair setting indicating a shape of a tip outlet of a extruder tip of a handheld device; and
      a third repair setting indicating a type of repair to be performed using the handheld device;
  instructions that cause the one or more processors, during or after receiving the one or more repair setting inputs, to:
    identify a predetermined temperature to which the thermoplastic material is heated based on the one or more repair setting inputs;
    identify a first predetermined feed rate at which the thermoplastic material is to be conveyed in a first direction that is towards the extruder tip of the handheld device, wherein the extruder tip is configured to apply the thermoplastic material to a part, and wherein the first predetermined feed rate is based on the one or more repair setting inputs;
    activate a heater of the handheld device that is in communication with the one or more processors to heat the thermoplastic material to the predetermined temperature; and
    activate a dispenser that is in communication with the one or more processors to convey, at the first predetermined feed rate, the thermoplastic material in the first direction.

21. The apparatus of claim 20, wherein the instructions that cause the one or more processors to activate the heater to heat the thermoplastic material to the predetermined temperature comprises instructions that cause the one or more processors to:
receive data from a temperature sensor;
determine an actual temperature from the data received from the temperature sensor;
determine a temperature difference between the actual temperature and the predetermined temperature; and
control the heater based on the temperature difference between the actual temperature and the predetermined temperature.

22. The apparatus of claim 21,
wherein the plurality of instructions stored on the non-transitory computer readable medium and executable by one or more processors, further comprises instructions to:
  receive a begin instruction from a pedal controller that is in communication with the processor; and
  determine if the actual temperature exceeds a minimum predetermined temperature; and
wherein the instructions that cause the one or more processors to activate the dispenser to convey the thermoplastic material in the direction towards the extruder tip and at the first predetermined feed rate are executed during or after:
  the one or more processors determine that the actual temperature exceeds the minimum predetermined temperature; and
  the one or more processors receives the begin instruction from the pedal controller.

23. The apparatus of claim 21, wherein the plurality of instructions stored on the non-transitory computer readable medium and executable by one or more processors, further comprises instructions to:
receive gas flow data from a gas flow sensor located in the handheld device;
identify an actual gas flow rate based on the received data from the gas flow sensor;
determine if the actual gas flow rate is less than a predetermined minimum gas flow rate; and
deactivate the heater if the actual gas flow rate is less than the predetermined minimum gas flow rate.

24. The apparatus of claim 20, wherein the instructions further comprise:
instructions that cause the one or more processors to receive an unload instruction;
instructions that cause the one or more processors, during or after receiving the unload instruction, to:
  maintain the heater in a deactivated state such that the heater is not heating the thermoplastic material; and
  activate the dispenser to convey, at a second predetermined feed rate that is different from the first predetermined feed rate, the thermoplastic material in a second direction that is opposite to the first direction.

25. The apparatus of claim 20, wherein the instructions further comprise:
instructions that cause the one or more processors to receive a reload instruction;
instructions that cause the one or more processors, during or after receiving the reload instruction, to:
  receive gas flow data from a gas flow sensor located in the handheld device;
  identify an actual gas flow rate based on the received data from the gas flow sensor;
  determine if the actual gas flow rate is equal to or greater than a predetermined minimum gas flow rate;
  activate the heater upon determination that the actual gas flow rate is equal to or greater than the predetermined minimum gas flow rate;
  receive data from a temperature sensor;
  determine an actual temperature from the data received from the temperature sensor;
  determine a temperature difference between the actual temperature and the predetermined temperature;
  control the heater based on the temperature difference between the actual temperature and the predetermined temperature; and activate the dispenser to convey, at a third predetermined feed rate that is different from the first predetermined feed rate, the thermoplastic material in the first direction.

26. The apparatus of claim 20, wherein the instructions further comprise:
   instructions that cause the one or more processors to receive a cool instruction;
   instructions that cause the one or more processors, during or after receiving the cool instruction, to:
      maintain the heater in a deactivated state such that the heater is not heating the thermoplastic material;
      place a gas source in fluid communication with the heater; and
      maintain the dispenser in a deactivated state such that the thermoplastic material is not being conveyed in the first direction.

27. The apparatus of claim 20, wherein the instructions further comprise:
   instructions that cause the one or more processors to receive a heat instruction;
   instructions that cause the one or more processors, during or after receiving the heat instruction, to:
      maintain the dispenser in a deactivated state such that the thermoplastic material is not being conveyed in the first direction;
      place a gas source in fluid communication with the heater;
      receive gas flow data from a gas flow sensor located in the handheld device;
      identify an actual gas flow rate based on the received data from the gas flow sensor;
      determine if the actual gas flow rate is equal to or greater than a predetermined minimum gas flow rate;
      activate the heater upon determination that the actual gas flow rate is equal to or greater than the predetermined minimum gas flow rate;
      receive data from a temperature sensor;
      determine an actual temperature from the data received from the temperature sensor;
      determine a temperature difference between the actual temperature and the predetermined temperature; and
      control the heater based on the temperature difference between the actual temperature and the predetermined temperature.

28. The apparatus of claim 20, wherein the one or more repair setting inputs comprises the first repair setting indicating material(s) of which the thermoplastic material is/are composed.

29. The apparatus of claim 20, wherein the one or more repair setting inputs comprises the second repair setting indicating the shape of the tip outlet of the extruder tip of the handheld device.

30. The apparatus of claim 20, wherein the one or more repair setting inputs comprises the third repair setting indicating the type of repair to be performed using the handheld device.

31. The apparatus of claim 20, wherein the one or more repair setting inputs comprises:
   the first repair setting indicating material(s) of which the thermoplastic material is/are composed; and
   the second repair setting indicating the shape of the tip outlet of the extruder tip of the handheld device.

32. The apparatus of claim 20, wherein the one or more repair setting inputs comprises:
   the first repair setting indicating material(s) of which the thermoplastic material is/are composed; and
   the third repair setting indicating the type of repair to be performed using the handheld device.

33. The apparatus of claim 20, wherein the one or more repair setting inputs comprises:
   the second repair setting indicating the shape of the tip outlet of the extruder tip of the handheld device; and
   the third repair setting indicating the type of repair to be performed using the handheld device.

34. The apparatus of claim 20, wherein the one or more repair setting inputs comprises:
   the first repair setting indicating material(s) of which the thermoplastic material is/are composed;
   the second repair setting indicating the shape of the tip outlet of the extruder tip of the handheld device; and
   the third repair setting indicating the type of repair to be performed using the handheld device.

35. A repair system, comprising:
   a handheld device comprising:
      a first extruder tip having an interior passageway extending between an inlet and a tip outlet, wherein the inlet is configured to receive a solid thermoplastic material and the tip outlet is configured to dispense a fluidic thermoplastic material;
      a nozzle surrounding the first extruder tip to form an annulus between an interior surface of the nozzle and an exterior surface of the first extruder tip; and
      a heater that is configured to heat the interior passageway of the first extruder tip such that the solid thermoplastic material becomes the fluidic thermoplastic material;
      wherein the heater is configured to heat a gas to heat the interior passageway of the first extruder tip;
   a controller; and
   a dispenser that is in communication with the controller and that is configured to convey the solid thermoplastic material to the inlet of the first extruder tip at a predetermined feed rate;
   wherein the controller comprises:
      a processor; and
      a computer readable medium operably coupled to the processor, the computer readable medium comprising a plurality of instructions stored therein and executable by at least the processor, the plurality of instructions comprising:
         instructions for receiving one or more input parameters;
         instructions for selecting the predetermined feed rate at which the solid thermoplastic material is to be conveyed to the inlet of the first extruder tip based on the one or more input parameters; and
         instructions for activating the dispenser to convey the solid thermoplastic material to the inlet of the first extruder tip at the predetermined feed rate.

36. The repair system of claim 35, wherein the one or more input parameters comprises a first input parameter indicating material(s) of which the solid thermoplastic material is/are composed.

37. The repair system of claim 35, wherein the one or more input parameters comprises a second input parameter indicating a shape of the tip outlet of the first extruder tip.

38. The repair system of claim 35, wherein the one or more input parameters comprises a third input parameter indicating a type of repair to be performed by the repair system.

* * * * *